US011285465B2

United States Patent
Atienza et al.

(10) Patent No.: US 11,285,465 B2
(45) Date of Patent: Mar. 29, 2022

(54) C1,C2-BRIDGED LIGANDS AND CATALYSTS

(71) Applicant: ExxonMobil Chemical Patents Inc., Baytown, TX (US)

(72) Inventors: Crisita Carmen H. Atienza, Houston, TX (US); David A. Cano, Houston, TX (US); Catherine A. Faler, Houston, TX (US); Margaret T. Whalley, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 252 days.

(21) Appl. No.: 16/583,779

(22) Filed: Sep. 26, 2019

(65) Prior Publication Data

US 2020/0101450 A1    Apr. 2, 2020

Related U.S. Application Data

(60) Provisional application No. 62/737,391, filed on Sep. 27, 2018.

(51) Int. Cl.
| | |
|---|---|
| *C07F 7/00* | (2006.01) |
| *C07F 9/00* | (2006.01) |
| *C08F 4/64* | (2006.01) |
| *C08F 4/642* | (2006.01) |
| *C08F 210/16* | (2006.01) |
| *B01J 31/22* | (2006.01) |
| *C08F 4/69* | (2006.01) |

(52) U.S. Cl.
CPC ....... *B01J 31/2217* (2013.01); *C08F 4/64189* (2013.01); *C08F 4/69439* (2013.01); *C08F 210/16* (2013.01); *B01J 2231/125* (2013.01); *B01J 2531/48* (2013.01); *B01J 2531/49* (2013.01); *C08F 2800/20* (2013.01)

(58) Field of Classification Search
CPC .......... C07C 2531/22; C07F 7/00; C07F 9/00; C07F 11/00; C08F 4/64189; C08F 210/16
See application file for complete search history.

(56) References Cited

U.S. PATENT DOCUMENTS

| 5,008,204 | A | 4/1991 | Stehling | 436/85 |
|---|---|---|---|---|
| 5,153,157 | A | 10/1992 | Hlatky et al. | 502/117 |
| 5,447,895 | A | 9/1995 | Marks et al. | 502/117 |
| 5,453,410 | A | 9/1995 | Kolthammer et al. | 502/155 |
| 6,306,658 | B1 | 10/2001 | Turner et al. | 436/37 |
| 6,455,316 | B1 | 9/2002 | Turner et al. | 436/37 |
| 6,489,168 | B1 | 12/2002 | Wang et al. | 436/37 |
| 7,247,687 | B2 | 7/2007 | Cherkasov et al. | 526/161 |
| 7,297,653 | B2 | 11/2007 | Rodriguez | 502/103 |
| 7,799,879 | B2 | 9/2010 | Crowther et al. | 526/134 |
| 8,071,701 | B2 | 12/2011 | Klosin et al. | |
| 8,378,043 | B2 | 2/2013 | Graham et al. | 526/170 |
| 8,576,392 | B2 | 11/2013 | Johnston | 356/237.1 |
| 9,290,503 | B2 | 3/2016 | Gregor | C07D 487/04 |
| 2014/0141228 | A1 | 5/2014 | Fuchs et al. | 428/220 |
| 2016/0280722 | A1 | 9/2016 | Atienza et al. | |
| 2018/0030167 | A1 | 2/2018 | Atienza et al. | |

FOREIGN PATENT DOCUMENTS

| CN | 105061493 | 11/2015 | |
|---|---|---|---|
| EP | 0277003 | 1/1988 | C08F 4/64 |
| EP | 0277004 | 1/1988 | C08F 4/64 |
| EP | 0573120 | 11/1998 | C08F 10/00 |
| EP | 2567987 | 3/2013 | C08F 4/6592 |
| KR | 10-20140129871 | 11/2014 | B01J 31/12 |
| WO | WO1994/007928 | 4/1994 | C08F 10/02 |
| WO | WO1995/014044 | 5/1995 | C08F 4/02 |
| WO | WO2000/009255 | 2/2000 | B01J 19/00 |
| WO | 2002/036638 | 5/2002 | |
| WO | 2003/091262 | 11/2003 | |
| WO | WO2007/130306 | 11/2007 | C07F 7/00 |
| WO | 2014/070502 | 5/2014 | |
| WO | 2015/088819 | 6/2015 | |
| WO | 2018/022279 | 2/2018 | |

OTHER PUBLICATIONS

Tshuva, E. Y. et al. (2000) "Isospecific Living Polymerization of 1-Hexene by a Readily Available Nonmetallocene C2-Symmetrical Zirconium Catalyst," J. Am. Chem. Soc., v.122, pp. 10706-10707.
*Chemical and Engineering News*, v.63(5), p. 27 (1985).
Murphy, V. et al. (2003) "A Fully Integrated High-Throughput Screening Methodology for the Disclovery of New Polyolefin Catalysts: Discovery of a New Class of High Temperature Single-Site Group (IV) Copolymerization Catalysts," *J. Am. Chem. Soc.*, v.125, pp. 4306-4317.
Oliveira, J. V. et al. (2000) "High-Pressure Phase Equilibria for Polypropylene-Hydrocarbon Systems," *Ind. Eng. Chem. Res.*, v.39(12), pp. 4627-4633.
Sampson, J. et al. (2017) "Olefin Polymerization by Dinuclear Zirconium Catralysts Based on Rigid Teraryl Frameworks: Effects on Tacticity and Copolymerization Behavior," *Organometallics*, v.36(10), pp. 1915-1928.
Sun, T. et al. (2001) "Effect of Short Chain Branching on the Coil Dimensions of Polyolefins in Dilute Solution," *Macromolecules*, v.34(19), pp. 6812-6820.
Wild, L. et al. (1982) "Determination of Branching Distributions in Polyethylene and Ethylene Copolymers," *J. Poly. Sci., Poly. Phys. Ed.*, v20, pp. 441-455.

*Primary Examiner* — Caixia Lu

(57) ABSTRACT

The present disclosure provides catalyst compounds including a nonsymmetric bridged amine bis(phenolate), catalyst systems including such, and uses thereof. Catalyst compounds, catalyst systems, and processes of the present disclosure can provide high comonomer content and high molecular weight polymers having narrow Mw/Mn values, contributing to good processability for the polymer itself and for the polymer used in a composition.

36 Claims, No Drawings

C1,C2-BRIDGED LIGANDS AND CATALYSTS

CROSS-REFERENCE TO RELATED APPLICATIONS

This application claims priority to U.S. Provisional Application No. 62/737,391, filed Sep. 27, 2018, the disclosure of which is incorporated herein by reference.

FIELD

The present disclosure provides ligand compounds and catalyst compounds including a nonsymmetric bridged amine bis(phenolate) transition metal complexes, production, and uses thereof.

BACKGROUND

Olefin polymerization catalysts are of great use in industry and polyolefins are widely used commercially because of their robust physical properties. Hence, there is interest in finding new catalyst systems that increase the utility/efficiency of the catalyst and facilitate the production of polymers having improved properties.

Low density polyethylene is generally prepared at high pressure using free radical initiators, or in gas phase processes using Ziegler-Natta or vanadium catalysts. Suitable low density polyethylene has a density in the range of 0.916 g/cm$^3$ to 0.940 g/cm$^3$. Suitable low density polyethylene produced using free radical initiators is known in the industry as "LDPE". LDPE is also known as "branched" or "heterogeneously branched" polyethylene because of the relatively large number of long chain branches extending from the main polymer backbone. Polyethylene in the same density range, e.g., 0.916 g/cm$^3$ to 0.940 g/cm$^3$, which is linear and does not contain long chain branching, is known as "linear low density polyethylene" ("LLDPE") and can be produced by conventional Ziegler-Natta catalysts or with metallocene catalysts. "Linear" means that the polyethylene has few, if any, long chain branches, referred to as a g'$_{vis}$ value of 0.97 or above, such as 0.98 or above. Polyethylenes having still greater density are the high density polyethylenes ("HDPEs"), e.g., polyethylenes having densities greater than 0.940 g/cm$^3$, and are generally prepared with Ziegler-Natta catalysts or chrome catalysts. Very low density polyethylenes ("VLDPEs") can be produced by a number of different processes yielding polyethylenes having a density less than 0.916 g/cm$^3$, such as 0.890 g/cm$^3$ to 0.915 g/cm$^3$ or 0.900 g/cm$^3$ to 0.915 g/cm$^3$.

Polyolefins, such as polyethylene, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight fraction of the composition with the improved processing properties of a low molecular weight fraction of the composition.

Useful polyolefins, such as polyethylene, may have a comonomer, such as hexene, incorporated into the polyethylene backbone. These copolymers provide varying physical properties compared to polyethylene alone and can be produced in a low pressure reactor, utilizing, for example, solution, slurry, or gas phase polymerization processes. Polymerization may take place in the presence of catalyst systems such as those employing a Ziegler-Natta catalyst, a chromium based catalyst, or a metallocene. The comonomer content of a polyolefin (e.g., wt % of comonomer incorporated into a polyolefin backbone) influences the properties of the polyolefin (and composition of the copolymers) and is influenced by the polymerization catalyst.

A copolymer composition, such as a resin, has a composition distribution, which refers to the distribution of comonomer that forms short chain branches along the copolymer backbone. When the amount of short chain branches varies among the copolymer molecules, the composition is said to have a "broad" composition distribution. When the amount of comonomer per 1,000 carbons is similar among the copolymer molecules of different chain lengths, the composition distribution is said to be "narrow".

Like comonomer content, the composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

Polyolefin compositions may have broad composition distributions that include a first polyolefin component having low molecular weight and low comonomer content while a second polyolefin component has a high molecular weight and high comonomer content. Compositions having this broad orthogonal composition distribution in which the comonomer is incorporated predominantly in the high molecular weight chains can provide improved physical properties, for example toughness properties and environmental stress crack resistance (ESCR).

Also, like comonomer content, a composition distribution of a copolymer composition is influenced by the identity of the catalyst used to form the polyolefins of the composition. Ziegler-Natta catalysts and chromium based catalysts generally produce compositions with broad composition distributions, whereas metallocene catalysts typically produce compositions with narrow composition distributions.

Nonetheless, polyolefin compositions formed by catalysts capable of forming high molecular weight polyolefins often also have broad molecular weight distributions, as indicated by high polydispersity indices, and/or the polyolefins are of higher molecular weights (e.g., Mw of 1,500,000) thus often have processing difficulties due to hardness. Furthermore, catalysts capable of forming high molecular weight polyolefins typically have low activity (e.g., amount of desirable polymer produced per a period of time).

There remains a need in the industry to improve the processability and the stability of polymers and on developing new catalysts for polymerization. Thus, there is a need for developing catalysts with a relatively high activity in order to form polyolefins, such as polyethylene, with high molecular weight and narrow molecular weight distribution, and high comonomer content.

References of interest include: Tshuva, E. Y. et al. (2000) *J. Am. Chem. Soc.* v. 122(43), pp. 10706-10707; WO 2002/036638A2; WO 2014/070502A1; WO 2015/088819A1; WO 2018/022279A1; WO 2003/091262; U.S. Pat. No. 8,071,701B2.

SUMMARY

The present disclosure provides ligand compounds and catalyst compounds including a nonsymmetric bridged amine bis(phenolate) transition metal complex, production, and uses thereof. The bridged phenolate ligands are nonsymmetrical due in part to two linking diyl groups that are different lengths.

This invention relates to ligands represented by Formula (I) and/or transition metal complexes represented by Formula (II):

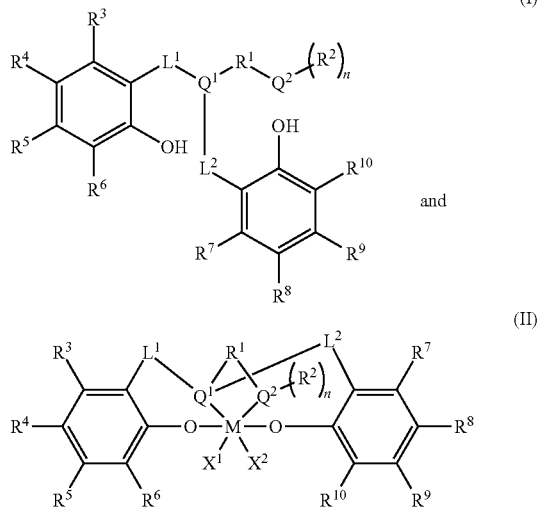

wherein:

M is a Group 4 transition metal;

$Q^1$ is a Group 15 atom;

$Q^2$ is a Group 15 atom or a Group 16 atom, wherein n is 0 if $Q^2$ is a Group 16 atom or n is 1 if $Q^2$ is a Group 15 atom;

$L^1$ is

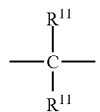

and is not part of an aromatic ring;

$L^2$ is

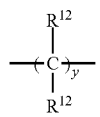

and is not part of an aromatic ring, wherein y is an integer of 2, 3, 4, 5, 6, 7, 8, 9, or 10;

each $X^1$ and $X^2$ is independently a substituted or unsubstituted linear, branched, cyclic, polycyclic, or aromatic hydrocarbyl; or $X^1$ and $X^2$ are joined together to form a $C_4$-$C_{62}$ cyclic, polycyclic, heterocyclic, or aromatic group;

$R^1$ is a substituted or unsubstituted linear, branched, cyclic, polycyclic, heterocyclic, or aromatic $C_1$-$C_{18}$ diyl;

each $R^2$ is independently a hydrogen, a substituted or unsubstituted linear, branched, cyclic, polycyclic, or aromatic $C_1$-$C_{40}$ hydrocarbyl, or a heteroatom-containing group;

each $R^3$, $R^4$, $R^5$, $R^6$, $R^7$, $R^8$, $R^9$, and $R^{10}$ is independently a hydrogen, a halogen, a substituted or unsubstituted linear, branched, cyclic, polycyclic, or aromatic $C_1$-$C_{40}$ hydrocarbyl, or a heteroatom-containing group; or two or more adjacent $R^3$-$R^{10}$ groups are joined together to form a $C_4$-$C_{62}$ cyclic, polycyclic, heterocyclic, or aromatic group;

each instance of $R^{11}$ is independently a hydrogen, a halogen, a substituted or unsubstituted $C_1$-$C_{40}$ hydrocarbyl, or a heteroatom-containing group; or two or more adjacent $R^{11}$ groups are joined together to form a $C_4$-$C_{62}$ cyclic, polycyclic, or heterocyclic group that is not aromatic; and each instance of $R^{12}$ is independently a hydrogen, a halogen, a substituted or unsubstituted $C_1$-$C_{40}$ hydrocarbyl, or a heteroatom-containing group; or two or more adjacent $R^{12}$ groups are joined together to form a $C_4$-$C_{62}$ cyclic, polycyclic, or heterocyclic group that is not aromatic.

In at least one embodiment, the present disclosure provides a catalyst system that includes the catalyst, one or more activators, and an optional catalyst support.

In at least one embodiment, the present disclosure provides a polymerization process that includes a) contacting one or more olefin monomers with any of the catalyst systems discussed and described herein.

In another embodiment, the present disclosure provides polymers having high comonomer content, high molecular weight and narrow polydispersity index, contributing to good processability for the polymer itself and for the polymer used in a composition. Catalysts, catalyst systems, and processes of the present disclosure can provide catalyst activity values of 260 KgP/mmolCat.hr$^{-1}$ or greater and polyolefins, such as polyethylene copolymers, having comonomer content of 12 wt % or greater, an Mn of 150,000 g/mol or greater, an Mw of 250,000 g/mol or greater, and a Mw/Mn of 2.5 or less.

DETAILED DESCRIPTION

The present disclosure provides ligand compounds and catalyst compounds including a nonsymmetric bridged amine bis(phenolate) transition metal complex, production, and uses thereof. In at least one embodiment, the present disclosure is directed to catalyst compounds, catalyst systems, and their use in polymerization processes to produce polyolefin polymers, such as polyethylene polymers and polypropylene polymers. In at least one embodiment, the present disclosure provides catalyst compounds including a nonsymmetric $C_1$,$C_2$-bridged ethylenediamine bis(phenolate), catalyst systems including such, and uses thereof. Catalyst compounds of the present disclosure can be zirconium or hafnium-containing compounds having one or more benzyl ligand(s) substituted and linked with a nonsymmetric $C_1$,$C_2$-bridged ethylenediamine bis(phenolate). In another class of embodiments, the present disclosure is directed to polymerization processes to produce polyolefin polymers from catalyst systems including one or more olefin polymerization catalysts, at least one activator, and an optional support.

For example, the present disclosure is directed to a polymerization process to produce a polyethylene polymer, the process including contacting a catalyst system including one or more catalysts, at least one activator, and at least one support, with ethylene and one or more $C_3$-$C_{10}$ alpha-olefin comonomers under polymerization conditions.

Catalysts, catalyst systems, and processes of the present disclosure can provide polyolefins at good activity values (e.g., 250 gP/mmolCat.h$^{-1}$ or greater), high Mw (e.g., 650,000 g/mol or greater), Mn values of 450,000 g/mol or greater, narrow PDI (e.g., about 2), and or Tm values of about 85° C. or greater). Catalysts, catalyst systems, and processes of the present disclosure can provide polymers having a high comonomer content (e.g., 12 wt % or greater).

For the purposes of the present disclosure, the numbering scheme for the Periodic Table Groups is used as described in *Chemical and Engineering News*, v. 63(5), pg. 27 (1985). Therefore, a "group 4 metal" is an element from group 4 of the Periodic Table, e.g., Hf, Ti, or Zr.

The specification describes transition metal complexes. The term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which, without being bound by theory, is believed to create a cation as a result of the removal of an anionic group, often referred to as a leaving group, from the transition metal.

A metallocene catalyst compound is a transition metal catalyst compound having one, two or three, typically one or two, substituted or unsubstituted cyclopentadienyl ligands bound to the transition metal, typically a metallocene catalyst is an organometallic compound containing at least one π-bound cyclopentadienyl moiety (or substituted cyclopentadienyl moiety).

As used herein, "olefin polymerization catalyst(s)" refers to any catalyst, such as an organometallic complex or compound that is capable of coordination polymerization addition where successive monomers are added in a monomer chain at the organometallic active center.

The terms "substituent," "radical," "group," and "moiety" may be used interchangeably.

As used herein, and unless otherwise specified, the term "Cn" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

"Catalyst productivity" is a measure of how many grams of polymer (P) are produced using a polymerization catalyst including W g of catalyst (cat), over a period of time of T hours; and may be expressed by the following formula: P/(T×W) and expressed in units of gP/gcat/hr. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used per hour (kgP/molcat/hr).

"BOCD" refers to a Broad Orthogonal Composition Distribution in which the comonomer of a copolymer is incorporated predominantly in the high molecular weight chains or species of a polyolefin polymer or composition. The distribution of the short chain branches can be measured (as an indicator of comonomer content), for example, using Temperature Rising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights of polymer chains. BOCD has been described, for example, in U.S. Pat. No. 8,378,043, Col. 3, line 34, bridging Col. 4, line 19, and U.S. Pat. No. 8,476,392, line 43, bridging Col. 16, line 54.

An "olefin," alternatively referred to as "alkene," is a linear, branched, or cyclic compound of carbon and hydrogen having at least one double bond. For purposes of this specification and the claims appended thereto, when a polymer or copolymer is referred to as including an olefin, the olefin present in such polymer or copolymer is the polymerized form of the olefin. For example, when a copolymer is said to have an "ethylene" content of 35 weight % (wt %) to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" is used to refer to mer units indicates that the mer units differ from each other by at least one atom or are different isomerically. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on.

Unless otherwise indicated, as used herein, "low comonomer content" is defined as a polyolefin having less than 8 wt % of comonomer based upon the total weight of the polyolefin. As used herein, "high comonomer content" is defined as a polyolefin having greater than or equal to 8 wt % of comonomer based upon the total weight of the polyolefin.

For the purposes of the present disclosure, ethylene shall be considered an α-olefin.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

Unless otherwise indicated, as used herein, "high molecular weight" is defined as a number average molecular weight (Mn) value of 100,000 g/mol or more. "Low molecular weight" is defined as an Mn value of less than 100,000 g/mol.

Unless otherwise noted all melting points (Tm) are DSC second melt.

The following abbreviations may be used herein: dme is 1,2-dimethoxyethane, Me is methyl, Ph is phenyl, Et is ethyl, Pr is propyl, iPr is isopropyl, n-Pr is normal propyl, Bu is butyl, cPR is cyclopropyl, iBu is isobutyl, tBu is tertiary butyl, p-tBu is para-tertiary butyl, nBu is normal butyl, sBu is sec-butyl, DMAH-PFPB is N,N-dimethylanilinium tetrakis(pentafluorophenyl)borate, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., $CH_2Ph$), Cbz is carbazole, THF (also referred to as thf) is tetrahydrofuran, RT is room temperature (and is 23° C. unless otherwise indicated), tol is toluene, EtOAc is ethyl acetate, Cy is cyclohexyl, Cp is cyclopentadienyl, Cp* is pentamethyl cyclopentadienyl, and Ind is indenyl.

A "catalyst system" includes at least one catalyst compound and at least one activator. When "catalyst system" is used to describe such the catalyst compound/activator combination before activation, it means the unactivated catalyst complex (precatalyst) together with an activator and, optionally, a co-activator. When it is used to describe the combination after activation, it means the activated complex and the activator or other charge-balancing moiety. The transition metal compound may be neutral as in a precatalyst, or a charged species with a counter ion as in an activated catalyst system. For the purposes of the present disclosure, when catalyst systems are described as including neutral stable forms of the components, it is well understood by one of ordinary skill in the art, that the ionic form of the component is the form that reacts with the monomers to produce polymers. Furthermore, catalyst compounds represented by formulae herein embrace both neutral and ionic forms of the catalyst compounds.

In the description herein, the catalyst may be described as a catalyst precursor, a pre-catalyst compound, catalyst compound or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion. Activator and cocatalyst are also used interchangeably.

A scavenger is a compound that may be added to facilitate polymerization by scavenging impurities. Some scavengers may also act as activators and may be referred to as co-activators. A co-activator, that is not a scavenger, may also be used in conjunction with an activator in order to form an active catalyst. In at least one embodiment, a co-activator is pre-mixed with the transition metal compound to form an alkylated transition metal compound.

Non-coordinating anion (NCA) is an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In at least one embodiment, the alkyl group includes at least one aromatic group.

The terms "hydrocarbyl radical," "hydrocarbyl," "hydrocarbyl group," are used interchangeably throughout this document. Likewise, the terms "group," "radical," and "substituent" are also used interchangeably in this document. For purposes of this disclosure, "hydrocarbyl radical" is defined to be $C_1$-$C_{100}$ radicals of carbon and hydrogen, that may be linear, branched, or cyclic, and when cyclic, aromatic or non-aromatic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, and cyclooctyl.

Unless indicated otherwise (e.g., the definition of "substituted hydrocarbyl"), the term "substituted" means that at least one hydrogen atom has been replaced with at least one non-hydrogen group, such as a hydrocarbyl group, a heteroatom, or a heteroatom containing group, such as halogen (such as Br, Cl, F or I) or a functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and the like, where each R* is independently a hydrocarbyl or halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring. As an example, ethyl alcohol is an ethyl group substituted with an —OH group.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)q-SiR*$_3$, and the like, where q is 1 to 10 and each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

For purposes of the present disclosure, in relation to catalyst compounds, the term "substituted" means that a hydrogen group has been replaced with a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)q-SiR*$_3$, and the like, where q is 1 to 10 and each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "diyl," "diyl group," and "diyl radical" are used interchangeably throughout this disclosure. For purposes of this disclosure, "diyl" is defined to be $C_1$-$C_{40}$ divalent groups that may be substituted or unsubstituted linear, branched, cyclic, polycyclic, heterocyclic, or aromatic. In examples throughout this disclosure, diyls can be or include, but are not limited to, $C_1$-$C_{40}$ diyls, $C_1$-$C_{25}$ diyls, $C_1$-$C_{18}$ diyls, $C_1$-$C_{12}$ diyls, $C_1$-$C_{10}$ diyls, and $C_1$-$C_5$ diyls. Examples of a $C_1$-$C_5$ diyl can be or include, but are not limited to, methanediyl (—CH$_2$—), ethanediyl (—CH$_2$CH$_2$—), propanediyl (—CH$_2$CH$_2$CH$_2$—), butanediyl (—CH$_2$(CH$_2$)$_2$CH$_2$—), and pentanediyl (—CH$_2$(CH$_2$)$_3$CH$_2$—), isomers thereof, halide substitutes thereof, or other substituted analogues thereof.

The term "substitutes thereof" means substituted analogues of the referenced item(s), for example "$C_1$ to $C_{10}$ alkyls, and halide substitutes thereof," means $C_1$ to $C_{10}$ alkyls and halide substituted analogs of the $C_1$ to $C_{10}$ alkyls.

The term "alkenyl" means a straight-chain, branched-chain, or cyclic hydrocarbon radical having one or more double bonds. These alkenyl radicals may be optionally substituted. Examples of suitable alkenyl radicals can include ethenyl, propenyl, allyl, 1,4-butadienyl cyclopropenyl, cyclobutenyl, cyclopentenyl, cyclohexenyl, cyclooctenyl, and the like, including their substituted analogues.

The term "arylalkenyl" means an aryl group where a hydrogen has been replaced with an alkenyl or substituted alkenyl group. For example, styryl indenyl is an indene substituted with an arylalkenyl group (a styrene group).

The terms "alkoxy" and "alkoxide" mean an alkyl or aryl group bound to an oxygen atom, such as an alkyl ether or aryl ether group/radical connected to an oxygen atom and can include those where the alkyl/aryl group is a $C_1$ to $C_{10}$ hydrocarbyl. The alkyl group may be straight chain, branched, or cyclic. The alkyl group may be saturated or unsaturated. Examples of suitable alkoxy radicals can include methoxy, ethoxy, n-propoxy, iso-propoxy, n-butoxy, iso-butoxy, sec-butoxy, tert-butoxy, phenoxyl, and the like.

The term "aryl" or "aryl group" means a six carbon aromatic ring and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

The term "arylalkyl" means an aryl group where a hydrogen has been replaced with an alkyl or substituted alkyl group. For example, 3,5'-di-tert-butyl-phenyl indenyl is an indene substituted with an arylalkyl group.

The term "alkylaryl" means an alkyl group where a hydrogen has been replaced with an aryl or substituted aryl group. For example, ethylbenzyl indenyl is an indene substituted with an ethyl group bound to a benzyl group.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom-substituted ring.

The term "continuous" means a system that operates without interruption or cessation. For example, a continuous process to produce a polymer would be one where the reactants are continually introduced into one or more reactors and polymer product is continually withdrawn until the polymerization is stopped, e.g. at 300 minutes.

A solution polymerization means a polymerization process in which the polymer is dissolved in a liquid polymerization medium, such as an inert solvent or monomer(s) or their blends. A solution polymerization is homogeneous. A homogeneous polymerization is one where the polymer product is dissolved in the polymerization medium. Suitable systems may not turbid as described in Oliveira, J. V. et al. (2000) *Ind. Eng. Chem. Res.*, v. 39(12), pp. 4627-4633.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, such as less than 10 wt %, such as less than 1 wt %, such as 0 wt %.

U.S. Pat. No. 9,290,593 ('593 patent) describes BOCD Index. The BOCD Index may be described by the following equation:

BOCD Index=(Content of SCB at the high molecular weight side−Content of SCB at the low molecular weight side)/(Content of SCB at the low molecular weight side), where the "Content of SCB at the high molecular weight side" means the content of the SCB (the number of branches/1,000 carbon atoms) included in a polymer chain having a molecular weight of Mw of the polyolefin or more and 1.3×Mw or less, and the "Content of SCB at the low molecular weight side" means the content of the SCB (the number of branches/1,000 carbon atoms) included in a polymer chain having a molecular weight of 0.7×Mw of the polyolefin or more and less than Mw. The BOCD Index defined by the equation above may be in the range of 1 to 5, such as 2 to 4, such as 2 to 3.5. See, also, FIG. 1 and FIG. 2 of the '593 patent (characterizing BOCD polymer structures using GPC-FTIR data).

The breadth of the composition distribution can be characterized by the $T_{75}$-$T_{25}$ value, where $T_{25}$ is the temperature at which 25% of the eluted polymer is obtained and $T_{75}$ is the temperature at which 75% of the eluted polymer is obtained in a TREF experiment. The composition distribution is further characterized by the $F_{80}$ value, which is the fraction of polymer that elutes below 80° C. in a TREF-LS experiment. A higher $F_{80}$ value indicates a higher fraction of comonomer in the polymer molecule. An orthogonal composition distribution is defined by a $M_{60}$/$M_{90}$ value that is greater than 1, where $M_{60}$ is the molecular weight of the polymer fraction that elutes at 60° C. in a TREF-LS experiment and $M_{90}$ is the molecular weight of the polymer fraction that elutes at 90° C. in a TREF-LS experiment.

In at least one embodiment, a polymer has a BOCD characterized in that the $T_{75}$-$T_{25}$ value is 1 or greater, 2 or greater, 2.5 or greater, 4 or greater, 5 or greater, 7 or greater, 10 or greater, 11.5 or greater, 15 or greater, 17.5 or greater, 20 or greater, 25 or greater, 30 or greater, 35 or greater, 40 or greater, or 45 or greater, where $T_{25}$ is the temperature at which 25% of the eluted polymer is obtained and $T_{75}$ is the temperature at which 75% of the eluted polymer is obtained in a TREF experiment.

The polymers as described herein may further have a BOCD characterized in that $M_{60}$/$M_{90}$ value is 1.5 or greater, 2 or greater, 2.25 or greater, 2.5 or greater, 3 or greater, 3.5 or greater, 4 or greater, 4.5 or greater, or 5 or greater, where $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

Additionally, the polymers as described herein may further have a BOCD characterized in that $F_{80}$ value is 1% or greater, 2% or greater, 3% or greater, 4% or greater, 5% or greater, 6% or greater, 7% or greater, 10% or greater, 11% or greater, 12% or greater, or 15% or greater, where $F_{80}$ is the fraction of polymer that elutes below 80° C.

Ligands

In at least one embodiment, the present disclosure provides one or more ligands that can be contained in a transition metal complex catalyst, as discussed and described herein. The ligand can be represented by Formula (I):

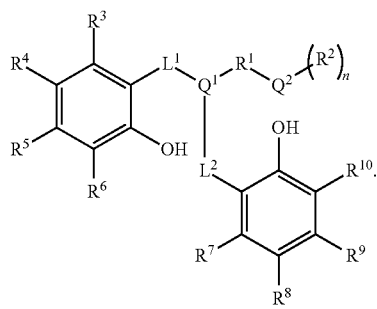

$R^1$ is a linker or bridge between the $Q^1$ and $Q^2$ groups. $R^1$ can be a substituted or unsubstituted linear, branched, cyclic, polycyclic, heterocyclic, or aromatic diyl linking $Q^1$ and $Q^2$ groups. $R^1$ can be a substituted or unsubstituted $C_1$-$C_{30}$ diyl, such as a substituted or unsubstituted $C_1$-$C_{18}$ diyl, a substituted or unsubstituted diyl, or a substituted or unsubstituted $C_1$-$C_5$ diyl. In at least one embodiment, $R^1$ is or includes an unsubstituted organic diyl group that can be or include methanediyl (—$CH_2$—), ethanediyl (—$CH_2CH_2$—), propanediyl (—$CH_2CH_2CH_2$—), butanediyl (—$CH_2(CH_2)_2CH_2$—), pentanediyl (—$CH_2(CH_2)_3CH_2$—), hexanediyl —$CH_2(CH_2)_4CH_2$—), heptanediyl (—$CH_2(CH_2)_5CH_2$—), octanediyl (—$CH_2(CH_2)_6CH_2$—), nonanediyl (—$CH_2(CH_2)_7CH_2$—), decanediyl (—$CH_2(CH_2)_8CH_2$—), undecanediyl (—$CH_2(CH_2)_9CH_2$—), dodecanediyl (—$CH_2(CH_2)_{10}CH_2$—), isomers thereof, halide substitutes thereof, or other substitutes thereof. In at least one embodiment, $R^1$ is a substituted or unsubstituted linear or branched $C_1$-$C_5$ diyl, such as an unsubstituted methanediyl, ethanediyl, propanediyl, a butanediyl, or a pentanediyl.

In at least one embodiment, $R^1$ is a substituted or unsubstituted cyclic, polycyclic, heterocyclic, or aromatic $C_1$-$C_{18}$ or $C_1$-$C_{10}$ diyl. $R^1$ can be or include a phenyl diyl, a benzyl diyl, a cyclohexyl diyl, a cyclooctyl diyl, or substitutes thereof. $R^1$ can be or include a substituted or unsubstituted heterocyclic diyl group that can be or include one or more amines, ethers, thioethers, silyls, boryls, phosphines, or any combination thereof.

In at least one embodiment, $Q^1$ is a Group 15 atom (e.g., N or P) and $Q^2$ is a Group 15 atom (e.g., N or P) or a Group 16 atom (e.g., O, S, or Se), wherein n is 0 if $Q^2$ is a Group 16 atom or n is 1 if $Q^2$ is a Group 15 atom. If $Q^2$ is a Group 16 atom, $R^3$ is not present thereon. n can be either 0 or 1, such as n is 0 if $Q^2$ is a Group 16 atom or n is 1 if $Q^2$ is a Group 15 atom. In at least one embodiment, $Q^1$ and $Q^2$ is N, or P, such as each of $Q^1$ and $Q^2$ is N.

The linker $L^1$ is a substituted or unsubstituted methanediyl group,

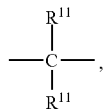

that is not part of an aromatic ring.

Each instance of $R^{11}$ is independently a hydrogen, a halogen (e.g., F, Br, Cl, or I), a substituted or unsubstituted $C_1$-$C_{40}$ hydrocarbyl, or a heteroatom-containing group. In at least one embodiment, the substituted or unsubstituted $C_1$-$C_{40}$ hydrocarbyl is or includes a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. In at least one embodiment, each $R^{11}$ is independently methyl, ethyl, ethenyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclohexyl, cyclooctyl, phenyl, benzyl, naphthyl, phenanthryl, anthracenyl, carbazolyl, fluorenyl, adamantyl, indolyl, indolinyl, imidazolyl, indenyl, indanyl, isomers thereof, halide substitutes thereof, or other substitutes thereof. The heteroatom-containing group can be or include amine, ether, thioether, silyl, boryl, phosphine, or any combination thereof. In at least one embodiment, two or more adjacent $R^{11}$ groups are joined together to form a $C_4$-$C_{62}$ cyclic, polycyclic, or heterocyclic group that is not aromatic. In at least one embodiment, two or more adjacent $R^{11}$ groups are joined together to form a $C_6$-$C_{62}$, $C_{10}$-$O50$, or $C_{12}$-$C_{40}$ cyclic, polycyclic, or heterocyclic group that is not aromatic.

The linker $L^2$ is a substituted or unsubstituted organic diyl group,

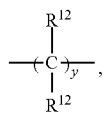

that is not part of an aromatic ring. The substituted or unsubstituted organic diyl group can have two or more —C($R_{12}$)$_2$— groups, such as y is an integer of 2, 3, 4, 5, 6, 7, 8, 9, 10, 11, or 12. In at least one embodiment, y is an integer in a range of 2 to 12, 2 to 10, 2 to 8, or 2 to 5. In at least one embodiment, $L^2$ is methanediyl (—$CH_2$—), ethanediyl (—$CH_2CH_2$—), propanediyl (—$CH_2CH_2CH_2$—), butanediyl (—$CH_2(CH_2)_2CH_2$—), pentanediyl (—$CH_2(CH_2)_3CH_2$—), hexanediyl (—$CH_2(CH_2)_4CH_2$—), heptanediyl (—$CH_2(CH_2)_5CH_2$—), octanediyl (—$CH_2(CH_2)_6CH_2$—), nonanediyl (—$CH_2(CH_2)_7CH_2$—), decanediyl (—$CH_2(CH_2)_8CH_2$—), undecanediyl (—$CH_2(CH_2)_9CH_2$—), dodecanediyl (—$CH_2(CH_2)_{10}CH_2$—), isomers thereof, or halide substitutes thereof. In at least one embodiment, $L^1$ is an unsubstituted methanediyl and $L^2$ can be a substituted or unsubstituted ethanediyl.

In at least one embodiment, for both $L^1$ and $L^2$, each instance of $R^{11}$ and $R^{12}$ is independently a hydrogen or a substituted or unsubstituted $C_1$-$C_{10}$ hydrocarbyl. In at least one embodiment, $L^2$ has y as an integer of 2, 3, 4, or 5, and for both $L^1$ and $L^2$, each $R^{11}$ and $R^{12}$ is independently a hydrogen or a substituted or unsubstituted $C_1$-$C_5$ hydrocarbyl. In at least one embodiment, y (of $L^2$) is an integer of 2 or 3, each $R^{11}$ is a hydrogen, and each $R^{12}$ is independently a hydrogen or a substituted or unsubstituted $C_1$-$C_3$ hydrocarbyl.

The bridged bis(phenolate) ligand is nonsymmetrical due to the different carbon chain lengths of $L^1$ and $L^2$. $L^1$ is shorter than $L^2$ since $L^1$ is a methanediyl and $L^2$ is at least as long as an ethanediyl, or longer. The relatively high catalytic activity of the catalyst (the transition metal complex) and/or the catalyst system is attributed, at least in part, to the nonsymmetrical linkage or bridging caused by $L^1$ and $L^2$.

In at least one embodiment, each $R^2$ is independently a hydrogen, a substituted or unsubstituted $C_1$-$C_{40}$ hydrocarbyl, or a heteroatom-containing group. The substituted or unsubstituted $C_1$-$C_{40}$ hydrocarbyl can be or include a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. The heteroatom-containing group can be or include amine, ether, thioether, silyl, boryl, phosphine, or any combination thereof. In at least one embodiment, when $Q^2$ is N, each $R^2$ is independently a hydrogen or a substituted or unsubstituted $C_1$-$C_{10}$ hydrocarbyl.

In at least one embodiment, each $R^3$, $R^4$, $R^5$, $R^6$, $R^7$, $R^8$, $R^9$, and $R^{10}$ is independently a hydrogen, a halogen (e.g., F, Br, Cl, or I), a substituted or unsubstituted $C_1$-$C_{40}$ hydrocarbyl, or a heteroatom-containing group. In at least one embodiment, the substituted or unsubstituted $C_1$-$C_{40}$ hydrocarbyl is or includes a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. The heteroatom-containing group can be or include amine, ether, thioether, silyl, boryl, phosphine, or any combination thereof. In at least one embodiment, each $R^3$, $R^4$, $R^5$, $R^6$, $R^7$, $R^8$, $R^9$, and $R^{10}$ groups is or includes methyl, ethyl, ethenyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclohexyl, cyclooctyl, phenyl, benzyl, naphthyl, phenanthryl, anthracenyl, carbazolyl, fluorenyl, adamantyl, indolyl, indolinyl, imidazolyl, indenyl, indanyl, isomers thereof, halide substitutes thereof, or other substitutes thereof. In at least one embodiment, two or more adjacent groups of $R^3$, $R^4$, $R^5$, $R^6$, $R^7$, $R^8$, $R^9$, and $R^{10}$ ($R^3$-$R^{10}$) are joined together to form a $C_4$-$C_{62}$ cyclic, polycyclic, heterocyclic, or aromatic group. In at least one embodiment, two or more adjacent $R^3$-$R^{10}$ groups are joined together to form a $C_6$-$C_{62}$, $C_{10}$-$C_{50}$, or $C_{12}$-$C_{40}$ cyclic, polycyclic, heterocyclic, or aromatic group. In at least one embodiment, each of $R^4$ and $R^8$ is a methyl group.

In at least one embodiment, each of $R^6$ and $R^{10}$ is independently halogen, carbazolyl, fluorenyl, adamantyl, indolyl, indolinyl, imidazolyl, indenyl, indanyl, or substitutes thereof. $R^6$ can be carbazolyl, fluorenyl, adamantyl, or a substitute thereof and $R^{10}$ can be a halogen, such as Br. In at least one embodiment, each $R^5$, $R^6$, $R^7$, $R^9$, $R^{10}$, and $R^{11}$ group is independently a hydrogen or a substituted or unsubstituted linear or branched $C_1$-$C_{10}$ hydrocarbyl. In at least one embodiment, each $R^3$, $R^5$, $R^7$, and $R^9$ is a hydrogen and each $R^4$ and $R^8$ is a substituted or unsubstituted linear or branched $C_1$-$C_4$ hydrocarbyl.

In at least one embodiment, when the linker $L^1$ is an unsubstituted methanediyl group and the linker $L^2$ is an unsubstituted ethanediyl group, then the ligand can be represented by the Formula (III):

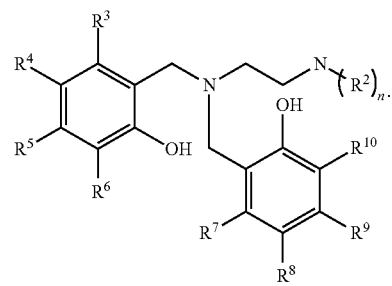

(III)

In at least one embodiment, each $R^2$ is independently a hydrogen, a substituted or unsubstituted $C_1$-$C_{40}$ hydrocarbyl, or a heteroatom-containing group. The substituted or unsubstituted $C_1$-$C_{40}$ hydrocarbyl can be or include a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. The heteroatom-containing group can be or include amine, ether, thioether, silyl, boryl, phosphine, or any combination thereof. In at least one embodiment, each $R^2$ is independently a hydrogen or a substituted or unsubstituted $C_1$-$C_{10}$ hydrocarbyl.

In at least one embodiment, each $R^3$, $R^4$, $R^5$, $R^6$, $R^7$, $R^8$, $R^9$, and $R^{10}$ is independently a hydrogen, a halogen (e.g., F, Br, Cl, or I), a substituted or unsubstituted $C_1$-$C_{40}$ hydrocarbyl, or a heteroatom-containing group. In at least one embodiment, the substituted or unsubstituted $C_1$-$C_{40}$ hydrocarbyl is or includes a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. The heteroatom-containing group can be or include amine, ether, thioether, silyl, boryl, phosphine, or any combination thereof. In at least one embodiment, each $R^3$, $R^4$, $R^5$, $R^6$, $R^7$, $R^8$, $R^9$, and $R^{10}$ groups is or includes methyl, ethyl, ethenyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclohexyl, cyclooctyl, phenyl, benzyl, naphthyl, phenanthryl, anthracenyl, carbazolyl, fluorenyl, adamantyl, indolyl, indolinyl, imidazolyl, indenyl, indanyl, isomers thereof, halide substitutes thereof, or other substitutes thereof. In at least one embodiment, two or more adjacent groups of $R^3$, $R^4$, $R^5$, $R^6$, $R^7$, $R^8$, $R^9$, and $R^{10}$ ($R^3$-$R^{10}$) are joined together to form a $C_4$-$C_{62}$ cyclic, polycyclic, heterocyclic, or aromatic group. In at least one embodiment, two or more adjacent $R^3$-$R^{10}$ groups are joined together to form a $C_6$-$C_{62}$, $C_{10}$-$050$, or $C_{12}$-$C_{40}$ cyclic, polycyclic, heterocyclic, or aromatic group. In at least one embodiment, each of $R^4$ and $R^8$ is a methyl group.

In at least one embodiment, each of $R^6$ and $R^{10}$ is independently halogen, carbazolyl, fluorenyl, adamantyl, indolyl, indolinyl, imidazolyl, indenyl, indanyl, or substitutes thereof. $R^6$ can be carbazolyl, fluorenyl, adamantyl, or a substitute thereof and $R^{10}$ can be a halogen, such as Br. In at least one embodiment, each $R^5$, $R^6$, $R^7$, $R^9$, and $R^{10}$ group is independently a hydrogen or a substituted or unsubstituted linear or branched $C_1$-$C_{10}$ hydrocarbyl. In at least one embodiment, each $R^3$, $R^5$, $R^7$, and $R^9$ is a hydrogen and each $R^4$ and $R^8$ is a substituted or unsubstituted linear or branched $C_1$-$C_4$ hydrocarbyl.

The ligand represented by Formula (III) can be referred to as a $C_1,C_2$-bridged ligand.

In at least one embodiment, a ligand that is contained in a transition metal complex catalyst is represented by the Formula (IV):
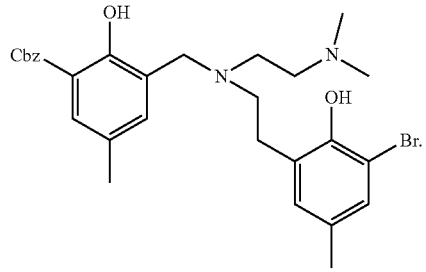
(IV)
In at least one embodiment, a ligand that is represented by Formula (I) is one or more of the following:
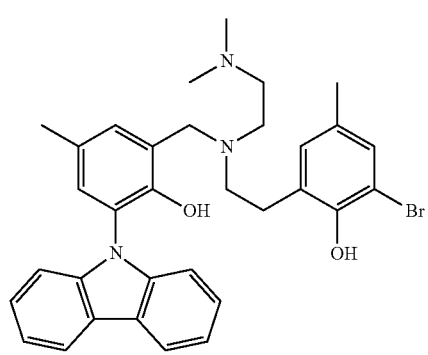
1
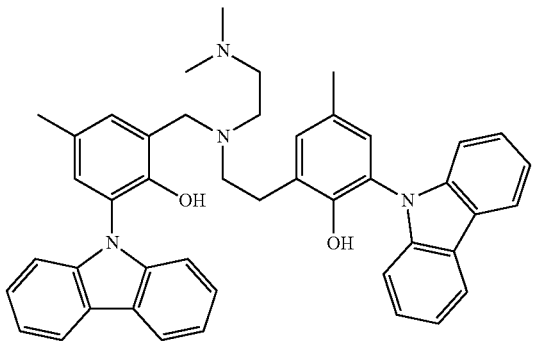
4
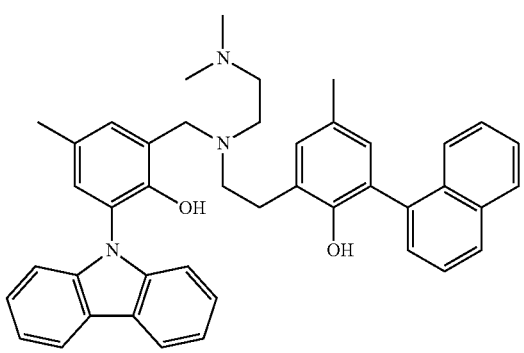
5
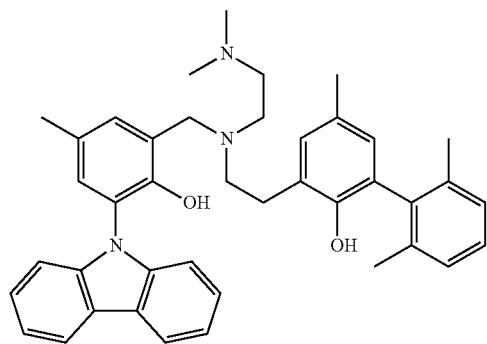
2
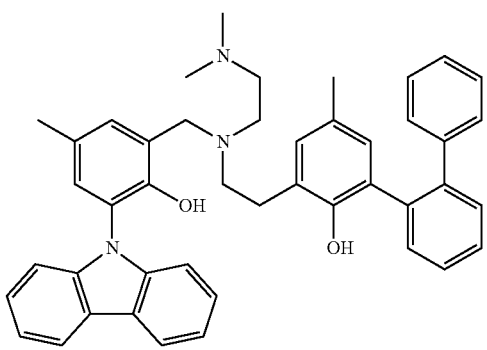
6
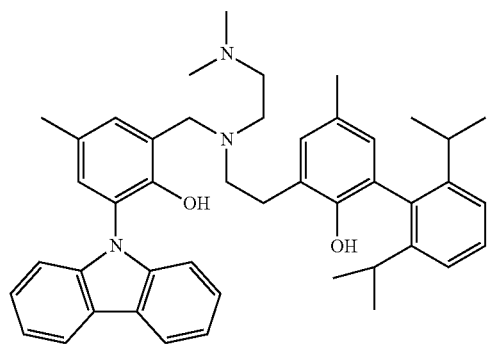
3
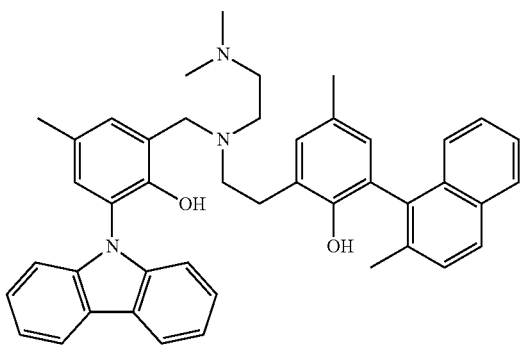
7

8
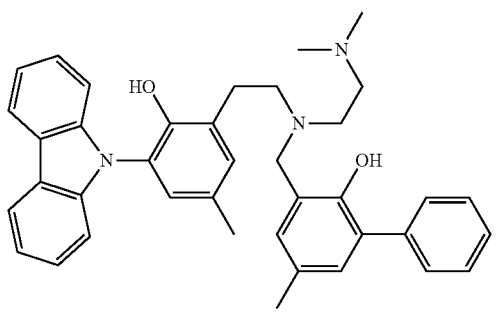
9
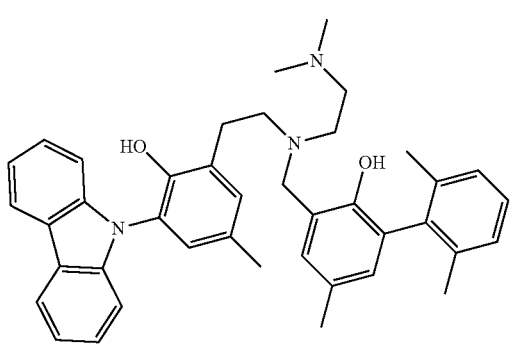
10
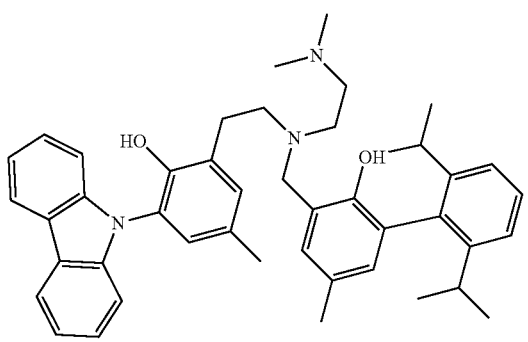
11
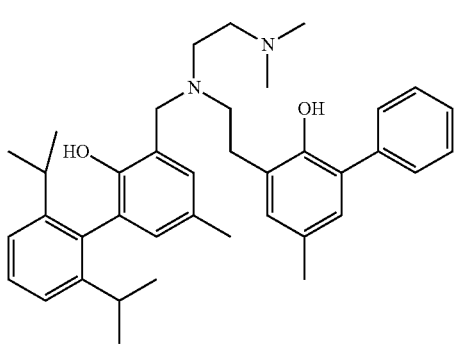
12
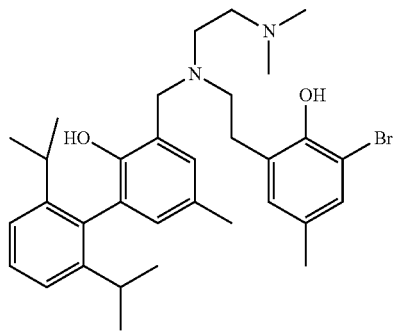
13
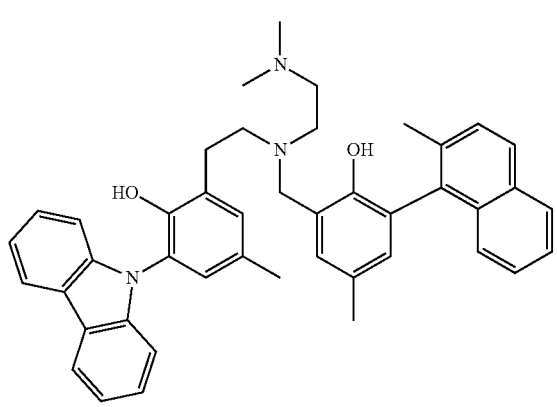
14
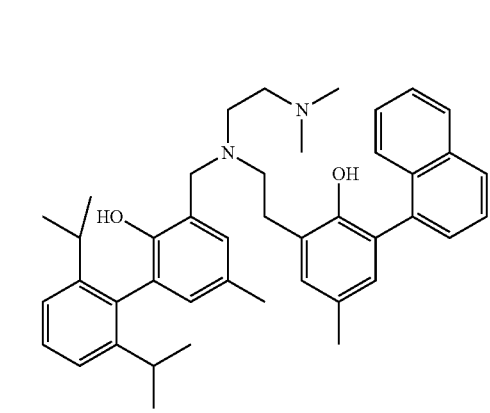
15
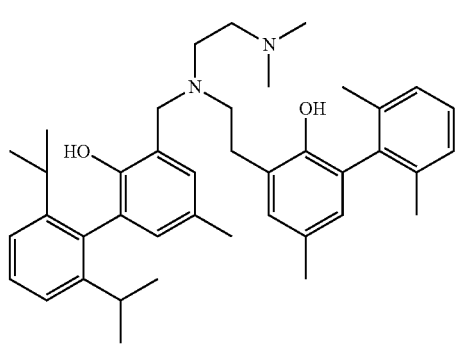

16

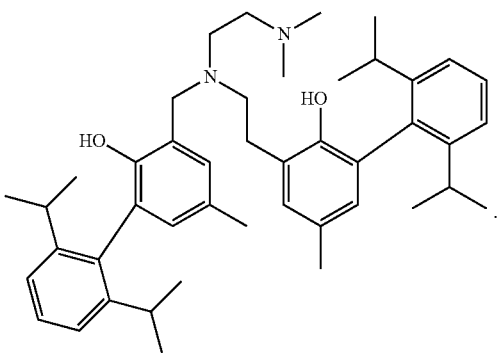

In at least one embodiment, a ligand that is represented by Formula (I) is:

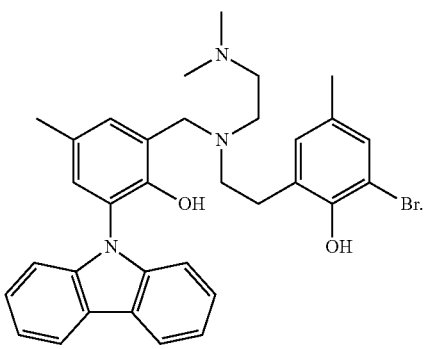

1

Transition Metal Complexes

In at least one embodiment, the present disclosure relates to bridged transition metal complexes, where the complexes include at least one of a $C_4$-$C_{62}$ cyclic or polycyclic ring structure with particular combinations of substituents and bridged with, for example, a nonsymmetric bridged ethylenediamine bis(phenolate). In at least one embodiment, the bridge is characterized in that it has at least one functionality, either included in the bridge or bonded to it.

The invention relates to catalyst compounds, and catalyst systems including such compounds, represented by formula (II):

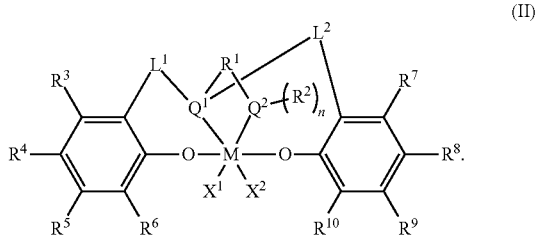

(II)

The metal M can be any transition metal. In at least one embodiment, the metal M is a Group 4 transition metal, such as titanium, hafnium, or zirconium. In at least one embodiment, M is hafnium (Hf) or zirconium (Zr).

In at least one embodiment, each $X^1$ and $X^2$ is independently a hydrogen, a halogen (e.g., F, Br, Cl, or I), a substituted or unsubstituted $C_1$-$C_{40}$ hydrocarbyl, or a heteroatom-containing group. A substituted or unsubstituted $C_1$-$C_{40}$ hydrocarbyl can be or include a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. A heteroatom-containing group can be or include amine, ether, thioether, silyl, boryl, phosphine, or any combination thereof. In at least one embodiment, $X^1$ and $X^2$ are joined together to form a $C_4$-$C_{62}$ cyclic, polycyclic, heterocyclic, or aromatic group that is not aromatic. In at least one embodiment, $X^1$ and $X^2$ are joined together to form a $C_6$-$C_{62}$, $C_{10}$-$O_{50}$, or $C_{12}$-$C_{40}$ cyclic, polycyclic, heterocyclic, or aromatic group.

In one or more examples, each $X^1$ and $X^2$ is independently a substituted or unsubstituted $C_1$-$C_{20}$ hydrocarbyl. Each $X^1$ and $X^2$ can independently be or include a substituted or unsubstituted $C_1$-$C_8$ alkyl, a phenyl, a benzyl, a naphthyl, a cyclohexyl, or halide substitutes thereof. In at least one embodiment, each $X^1$ and $X^2$ is benzyl.

$R^1$ is a linker or bridge between the $Q^1$ and $Q^2$ groups. $R^1$ can be a substituted or unsubstituted linear, branched, cyclic, polycyclic, heterocyclic, or aromatic diyl linking $Q^1$ and $Q^2$ groups. $R^1$ can be a substituted or unsubstituted $C_1$-$C_{30}$ diyl, such as a substituted or unsubstituted $C_1$-$C_{18}$ diyl, a substituted or unsubstituted $C_1$-$C_{10}$ diyl, or a substituted or unsubstituted $C_1$-$C_5$ diyl. In at least one embodiment, $R^1$ is or includes an unsubstituted organic diyl group that can be or include methanediyl (—$CH_2$—), ethanediyl (—$CH_2CH_2$—), propanediyl (—$CH_2CH_2CH_2$—), butanediyl (—$CH_2(CH_2)_2CH_2$—), pentanediyl (—$CH_2(CH_2)_3CH_2$—), hexanediyl (—$CH_2(CH_2)_4CH_2$—), heptanediyl (—$CH_2(CH_2)_5CH_2$—), octanediyl (—$CH_2(CH_2)_6CH_2$—), nonanediyl (—$CH_2(CH_2)_7CH_2$—), decanediyl (—$CH_2(CH_2)_8CH_2$—), undecanediyl (—$CH_2(CH_2)_9CH_2$—), dodecanediyl (—$CH_2(CH_2)_{10}CH_2$—), isomers thereof, halide substitutes thereof, or other substitutes thereof. In at least one embodiment, $R^1$ is a substituted or unsubstituted linear or branched $C_1$-$C_5$ diyl, such as an unsubstituted methanediyl, ethanediyl, propanediyl, a butanediyl, or a pentanediyl.

In at least one embodiment, $R^1$ is a substituted or unsubstituted cyclic, polycyclic, heterocyclic, or aromatic $C_1$-$C_{18}$ or $C_1$-$C_{10}$ diyl. $R^1$ can be or include a phenyl diyl, a benzyl diyl, a cyclohexyl diyl, a cyclooctyl diyl, or substitutes thereof. $R^1$ can be or include a substituted or unsubstituted heterocyclic diyl group that can be or include one or more amines, ethers, thioethers, silyls, boryls, phosphines, or any combination thereof.

In at least one embodiment, $Q^1$ is a Group 15 atom (e.g., N or P) and $Q^2$ is a Group 15 atom (e.g., N or P) or a Group 16 atom (e.g., 0, S, or Se), wherein n is 0 if $Q^2$ is a Group 16 atom or n is 1 if $Q^2$ is a Group 15 atom. If $Q^2$ is a Group 16 atom, $R^3$ is not present thereon. n can be either 0 or 1, such as n is 0 if $Q^2$ is a Group 16 atom or n is 1 if $Q^2$ is a Group 15 atom. In at least one embodiment, $Q^1$ and $Q^2$ is N, or P, such as each of $Q^1$ and $Q^2$ is N.

In at least one embodiment, the linker $L^1$ is a substituted or unsubstituted methanediyl group,

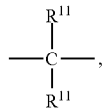

that is not part of an aromatic ring.

In at least one embodiment, each instance of $R^{11}$ is independently a hydrogen, a halogen (e.g., F, Br, Cl, or I), a substituted or unsubstituted $C_1$-$C_{40}$ hydrocarbyl, or a heteroatom-containing group. In at least one embodiment, the substituted or unsubstituted $C_1$-$C_{40}$ hydrocarbyl is or includes a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. In at least one embodiment, each $R^{11}$ is independently methyl, ethyl, ethenyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclohexyl, cyclooctyl, phenyl, benzyl, naphthyl, phenanthryl, anthracenyl, carbazolyl, fluorenyl, adamantyl, indolyl, indolinyl, imidazolyl, indenyl, indanyl, isomers thereof, halide substitutes thereof, or other substitutes thereof. The heteroatom-containing group can be or include amine, ether, thioether, silyl, boryl, phosphine, or any combination thereof. In at least one embodiment, two or more adjacent $R^{11}$ groups are joined together to form a $C_4$-$C_{62}$ cyclic, polycyclic, or heterocyclic group that is not aromatic. In at least one embodiment, two or more adjacent $R^{11}$ groups are joined together to form a $C_6$-$C_{62}$, $C_{10}$-$C_{50}$, or $C_{12}$-$C_{40}$ cyclic, polycyclic, or heterocyclic group that is not aromatic.

In at least one embodiment, the linker $L^2$ is a substituted or unsubstituted organic diyl group,

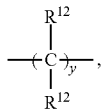

that is not part of an aromatic ring. The substituted or unsubstituted organic diyl group can have two or more —C(R$_{12}$)$_2$— groups, such as y is an integer of 2, 3, 4, 5, 6, 7, 8, 9, 10, 11, or 12. In at least one embodiment, y is an integer in a range of 2 to 12, 2 to 10, 2 to 8, or 2 to 5. In at least one embodiment, $L^2$ is methanediyl (—CH$_2$—), ethanediyl (—CH$_2$CH$_2$—), propanediyl (—CH$_2$CH$_2$CH$_2$—), butanediyl (—CH$_2$(CH$_2$)$_2$CH$_2$—), pentanediyl (—CH$_2$(CH$_2$)$_3$CH$_2$—), hexanediyl (—CH$_2$(CH$_2$)$_4$CH$_2$—), heptanediyl (—CH$_2$(CH$_2$)$_5$CH$_2$—), octanediyl (—CH$_2$(CH$_2$)$_6$CH$_2$—), nonanediyl (—CH$_2$(CH$_2$)$_7$CH$_2$—), decanediyl (—CH$_2$(CH$_2$)$_8$CH$_2$—), undecanediyl (—CH$_2$(CH$_2$)$_9$CH$_2$—), dodecanediyl (—CH$_2$(CH$_2$)$_{10}$CH$_2$—), isomers thereof, or halide substitutes thereof. In at least one embodiment, $L^1$ is an unsubstituted methanediyl and $L^2$ can be a substituted or unsubstituted ethanediyl.

In at least one embodiment, for both $L^1$ and $L^2$, each instance of $R^{11}$ and $R^{12}$ is independently a hydrogen or a substituted or unsubstituted $C_1$-$C_{10}$ hydrocarbyl. In at least one embodiment, $L^2$ has y as an integer of 2, 3, 4, or 5, and for both $L^1$ and $L^2$, each $R^{11}$ and $R^{12}$ is independently a hydrogen or a substituted or unsubstituted $C_1$-$C_5$ hydrocarbyl. In at least one embodiment, y (of $L^2$) is an integer of 2 or 3, each $R^{11}$ is a hydrogen, and each $R^{12}$ is independently a hydrogen or a substituted or unsubstituted $C_1$-$C_3$ hydrocarbyl.

The bridged bis(phenolate) ligand is nonsymmetrical due to the different carbon chain lengths of $L^1$ and $L^2$. $L^1$ is shorter than $L^2$ since $L^1$ is a methanediyl and $L^2$ is at least as long as an ethanediyl, or longer. Without wishing to be bound by theory, it is believed that the relatively high catalytic activity of the catalyst (the transition metal complex) and/or the catalyst system is attributed, at least in part, to the nonsymmetrical linkage or bridging caused by $L^1$ and $L^2$.

In at least one embodiment, each $R^2$ is independently a hydrogen, a substituted or unsubstituted $C_1$-$C_{40}$ hydrocarbyl, or a heteroatom-containing group. The substituted or unsubstituted $C_1$-$C_{40}$ hydrocarbyl can be or include a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. The heteroatom-containing group can be or include amine, ether, thioether, silyl, boryl, phosphine, or any combination thereof. In at least one embodiment, when $Q^2$ is N, each $R^2$ is independently a hydrogen or a substituted or unsubstituted $C_1$-$C_{10}$ hydrocarbyl.

In at least one embodiment, each $R^3$, $R^4$, $R^5$, $R^6$, $R^7$, $R^8$, $R^9$, and $R^{10}$ is independently a hydrogen, a halogen (e.g., F, Br, Cl, or I), a substituted or unsubstituted $C_1$-$C_{40}$ hydrocarbyl, or a heteroatom-containing group. In at least one embodiment, the substituted or unsubstituted $C_1$-$C_{40}$ hydrocarbyl is or includes a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. The heteroatom-containing group can be or include amine, ether, thioether, silyl, boryl, phosphine, or any combination thereof. In at least one embodiment, each $R^3$, $R^4$, $R^5$, $R^6$, $R^7$, $R^8$, $R^9$, and $R^{10}$ groups is or includes methyl, ethyl, ethenyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclohexyl, cyclooctyl, phenyl, benzyl, naphthyl, phenanthryl, anthracenyl, carbazolyl, fluorenyl, adamantyl, indolyl, indolinyl, imidazolyl, indenyl, indanyl, isomers thereof, halide substitutes thereof, or other substitutes thereof. In at least one embodiment, two or more adjacent groups of $R^3$, $R^4$, $R^5$, $R^6$, $R^7$, $R^8$, $R^9$, and $R^{10}$ ($R^3$-$R^{10}$) are joined together to form a $C_4$-$C_{62}$ cyclic, polycyclic, heterocyclic, or aromatic group. In at least one embodiment, two or more adjacent $R^3$-$R^{10}$ groups are joined together to form a $C_6$-$C_{62}$, $C_{10}$-$C_{50}$, or $C_{12}$-$C_{40}$ cyclic, polycyclic, heterocyclic, or aromatic group. In at least one embodiment, each of $R^4$ and $R^8$ is a methyl group.

In at least one embodiment, each of $R^6$ and $R^{10}$ is independently halogen, carbazolyl, fluorenyl, adamantyl, indolyl, indolinyl, imidazolyl, indenyl, indanyl, or substitutes thereof. $R^6$ can be carbazolyl, fluorenyl, adamantyl, or a substitute thereof and $R^{10}$ can be a halogen, such as Br. In at least one embodiment, each $R^5$, $R^6$, $R^7$, $R^9$, $R^{10}$, and $R^{11}$ group is independently a hydrogen or a substituted or unsubstituted linear or branched $C_1$-$C_{10}$ hydrocarbyl. In at least one embodiment, each $R^3$, $R^5$, $R^7$, and $R^9$ is a hydrogen and each $R^4$ and $R^8$ is a substituted or unsubstituted linear or branched $C_1$-$C_4$ hydrocarbyl.

In at least one embodiment, when each $Q^1$ and $Q^2$ is a nitrogen, the linker $L^1$ is an unsubstituted methanediyl group, and the linker $L^2$ is an unsubstituted ethanediyl group, then the transition metal complex catalyst is represented by Formula (V):

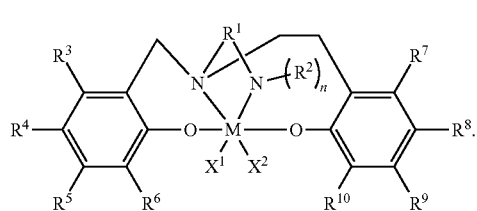

(V)

The metal M can be any transition metal. In at least one embodiment, the metal M is a Group 4 transition metal, such as titanium, hafnium, or zirconium. In at least one embodiment, M is hafnium (Hf) or zirconium (Zr).

In at least one embodiment, each $X^1$ and $X^2$ is independently a hydrogen, a halogen (e.g., F, Br, Cl, or I), a substituted or unsubstituted $C_1$-$C_{40}$ hydrocarbyl, or a heteroatom-containing group. A substituted or unsubstituted $C_1$-$C_{40}$ hydrocarbyl can be or include a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. A heteroatom-containing group can be or include amine, ether, thioether, silyl, boryl, phosphine, or any combination thereof. In at least one embodiment, $X^1$ and $X^2$ are joined together to form a $C_4$-$C_{62}$ cyclic, polycyclic, heterocyclic, or aromatic group that is not aromatic. In at least one embodiment, $X^1$ and $X^2$ are joined together to form a $C_6$-$C_{62}$, $C_{10}$-$C_{50}$, or $C_{12}$-$C_{40}$ cyclic, polycyclic, heterocyclic, or aromatic group.

In one or more examples, each $X^1$ and $X^2$ is independently a substituted or unsubstituted $C_1$-$C_{40}$ hydrocarbyl. Each $X^1$ and $X^2$ can independently be or include a substituted or unsubstituted $C_1$-$C_8$ alkyl, a phenyl, a benzyl, a naphthyl, a cyclohexyl, or halide substitutes thereof. In at least one embodiment, each $X^1$ and $X^2$ is benzyl.

In at least one embodiment, each $R^2$ is independently a hydrogen, a substituted or unsubstituted $C_1$-$C_{40}$ hydrocarbyl, or a heteroatom-containing group. The substituted or unsubstituted $C_1$-$C_{40}$ hydrocarbyl can be or include a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. The heteroatom-containing group can be or include amine, ether, thioether, silyl, boryl, phosphine, or any combination thereof. In at least one embodiment, each $R^2$ is independently a hydrogen or a substituted or unsubstituted $C_1$-$C_{10}$ hydrocarbyl.

In at least one embodiment, each $R^3$, $R^4$, $R^5$, $R^6$, $R^7$, $R^8$, $R^9$, and $R^{10}$ is independently a hydrogen, a halogen (e.g., F, Br, Cl, or I), a substituted or unsubstituted $C_1$-$C_{40}$ hydrocarbyl, or a heteroatom-containing group. In at least one embodiment, the substituted or unsubstituted $C_1$-$C_{40}$ hydrocarbyl is or includes a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. The heteroatom-containing group can be or include amine, ether, thioether, silyl, boryl, phosphine, or any combination thereof. In at least one embodiment, each $R^3$, $R^4$, $R^5$, $R^6$, $R^7$, $R^8$, $R^9$, and $R^{10}$ groups is or includes methyl, ethyl, ethenyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclohexyl, cyclooctyl, phenyl, benzyl, naphthyl, phenanthryl, anthracenyl, carbazolyl, fluorenyl, adamantyl, indolyl, indolinyl, imidazolyl, indenyl, indanyl, isomers thereof, halide substitutes thereof, or other substitutes thereof. In at least one embodiment, two or more adjacent groups of $R^3$, $R^4$, $R^5$, $R^6$, $R^7$, $R^8$, $R^9$, and $R^{10}$ ($R^3$-$R^{10}$) are joined together to form a $C_4$-$C_{62}$ cyclic, polycyclic, heterocyclic, or aromatic group. In at least one embodiment, two or more adjacent $R^3$-$R^{10}$ groups are joined together to form a $C_6$-$C_{62}$, $C_{10}$-$C_{50}$, or $C_{12}$-$C_{40}$ cyclic, polycyclic, heterocyclic, or aromatic group. In at least one embodiment, each of $R^4$ and $R^8$ is a methyl group.

In at least one embodiment, each of $R^6$ and $R^{10}$ is independently halogen, carbazolyl, fluorenyl, adamantyl, indolyl, indolinyl, imidazolyl, indenyl, indanyl, or substitutes thereof. $R^6$ can be carbazolyl, fluorenyl, adamantyl, or a substitute thereof and $R^{10}$ can be a halogen, such as Br. In at least one embodiment, each $R^5$, $R^6$, $R^7$, $R^9$, and $R^{10}$ group is independently a hydrogen or a substituted or unsubstituted linear or branched $C_1$-$C_{10}$ hydrocarbyl. In at least one embodiment, each $R^3$, $R^5$, $R^7$, and $R^9$ is a hydrogen and each $R^4$ and $R^8$ is a substituted or unsubstituted linear or branched $C_1$-$C_4$ hydrocarbyl.

The ligand represented by Formula (V) can be referred to as a $C_1$,$C_2$-bridged catalyst compound.

In at least one embodiment, when each $Q^1$ and $Q^2$ is a nitrogen, the linker $L^1$ is an unsubstituted methanediyl group, the linker $L^2$ is an unsubstituted ethanediyl group, and $R^1$ is an unsubstituted ethanediyl group, then the transition metal complex catalyst is represented by (VI):

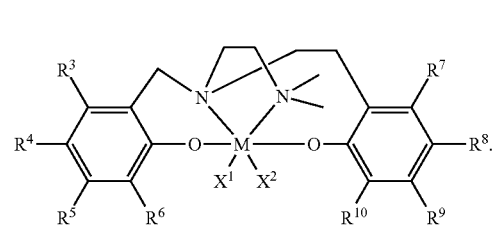

(VI)

The metal M can be any transition metal. In at least one embodiment, the metal M is a Group 4 transition metal, such as titanium, hafnium, or zirconium. In at least one embodiment, M is hafnium (Hf) or zirconium (Zr).

In at least one embodiment, each $X^1$ and $X^2$ is independently a hydrogen, a halogen (e.g., F, Br, Cl, or I), a substituted or unsubstituted $C_1$-$C_{40}$ hydrocarbyl, or a heteroatom-containing group. A substituted or unsubstituted $C_1$-$C_{40}$ hydrocarbyl can be or include a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. A heteroatom-containing group can be or include amine, ether, thioether, silyl, boryl, phosphine, or any combination thereof. In at least one embodiment, $X^1$ and $X^2$ are joined together to form a $C_4$-$C_{62}$ cyclic, polycyclic, heterocyclic, or aromatic group that is not aromatic. In at least one embodiment, $X^1$ and $X^2$ are joined together to form a $C_6$-$C_{62}$, $C_{10}$-$050$, or $C_{12}$-$C_{40}$ cyclic, polycyclic, heterocyclic, or aromatic group.

In one or more examples, each $X^1$ and $X^2$ is independently a substituted or unsubstituted $C_1$-$C_{20}$ hydrocarbyl. Each $X^1$ and $X^2$ can independently be or include a substituted or unsubstituted $C_1$-$C_8$ alkyl, a phenyl, a benzyl, a naphthyl, a cyclohexyl, or halide substitutes thereof. In at least one embodiment, each $X^1$ and $X^2$ is benzyl.

In at least one embodiment, each $R^3$, $R^4$, $R^5$, $R^6$, $R^7$, $R^8$, $R^9$, and $R^{10}$ is independently a hydrogen, a halogen (e.g., F, Br, Cl, or I), a substituted or unsubstituted $C_1$-$C_{40}$ hydrocarbyl, or a heteroatom-containing group. In at least one embodiment, the substituted or unsubstituted $C_1$-$C_{40}$ hydrocarbyl is or includes a substituted or unsubstituted linear $C_1$-$C_{40}$ hydrocarbyl, a substituted or unsubstituted branched $C_3$-$C_{40}$ hydrocarbyl, or a substituted or unsubstituted cyclic, polycyclic, or aromatic $C_4$-$C_{40}$ hydrocarbyl. The heteroatom-containing group can be or include amine, ether, thioether, silyl, boryl, phosphine, or any combination thereof. In at least one embodiment, each $R^3$, $R^4$, $R^5$, $R^6$, $R^7$, $R^8$, $R^9$, and $R^{10}$ groups is or includes methyl, ethyl, ethenyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclohexyl, cyclooctyl, phenyl, benzyl, naphthyl, phenanthryl, anthracenyl, carbazolyl, fluorenyl, adamantyl, indolyl, indolinyl, imidazolyl, indenyl, indanyl, isomers thereof, halide substitutes thereof, or other substitutes thereof. In at least one embodiment, two or more adjacent groups of $R^3$, $R^4$, $R^5$, $R^6$, $R^7$, $R^8$, $R^9$, and $R^{10}$ ($R^3$-$R^{10}$) are joined together to form a $C_4$-$C_{62}$ cyclic, polycyclic, heterocyclic, or aromatic group. In at least one embodiment, two or more adjacent $R^3$-$R^{10}$ groups are joined together to form a $C_6$-$C_{62}$, $C_{10}$-$050$, or $C_{12}$-$C_{40}$ cyclic, polycyclic, heterocyclic, or aromatic group. In at least one embodiment, each of $R^4$ and $R^8$ is a methyl group.

In at least one embodiment, each of $R^6$ and $R^{10}$ is independently halogen, carbazolyl, fluorenyl, adamantyl, indolyl, indolinyl, imidazolyl, indenyl, indanyl, or substitutes thereof. $R^6$ can be carbazolyl, fluorenyl, adamantyl, or a substitute thereof and $R^{10}$ can be a halogen, such as Br. In at least one embodiment, each $R^5$, $R^6$, $R^7$, $R^9$, and $R^{10}$ group is independently a hydrogen or a substituted or unsubstituted linear or branched $C_1$-$C_{10}$ hydrocarbyl. In at least one embodiment, each $R^3$, $R^5$, $R^7$, and $R^9$ is a hydrogen and each $R^4$ and $R^8$ is a substituted or unsubstituted linear or branched $C_1$-$C_4$ hydrocarbyl.

In at least one embodiment, the transition metal complex catalyst is represented by Formula (VII):

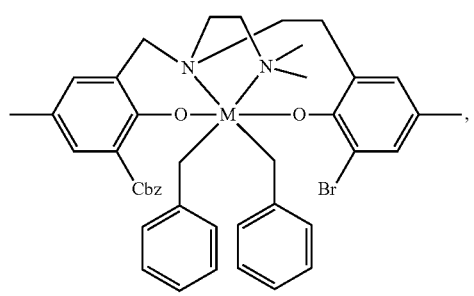

(VII)

wherein M is Zr or Hf. When M is Zr, the compound of Formula (VII) is referred to as Zr-VII. When M is Hf, the compound of Formula (VII) is referred to as Hf-VII.

In at least one embodiment, a transition metal complex catalyst is represented by Formula (II) is one or more of the following:

1

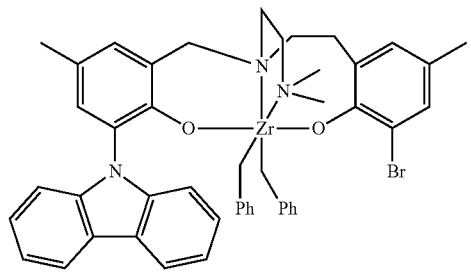

2

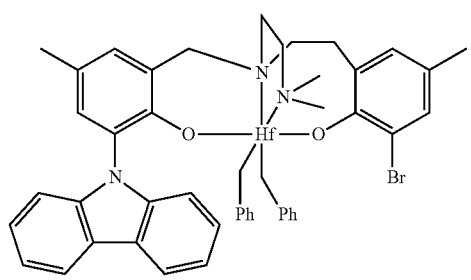

3

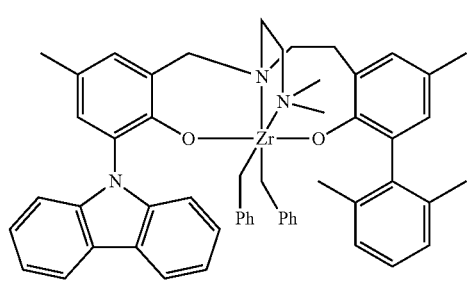

4

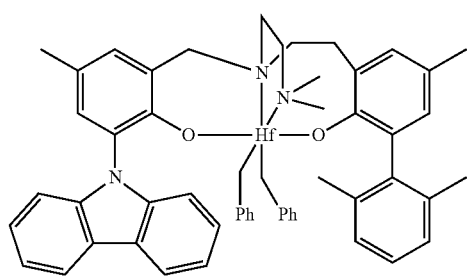

5

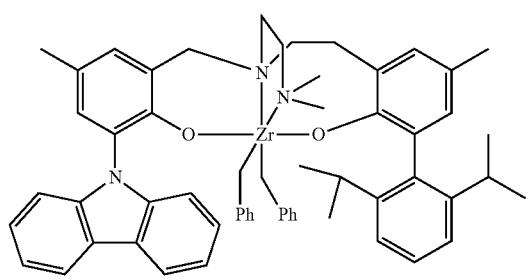

6
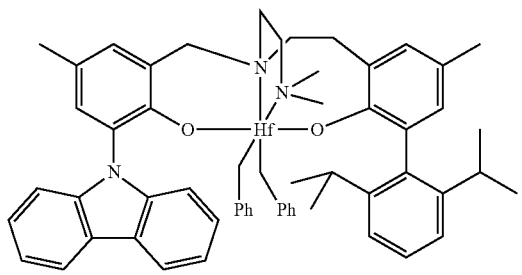
7
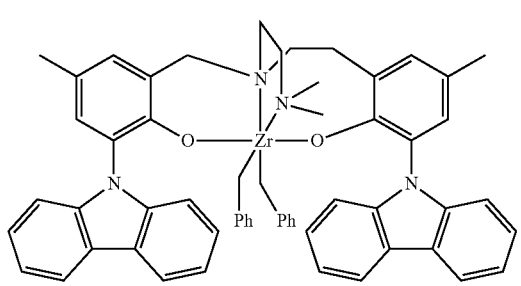
8
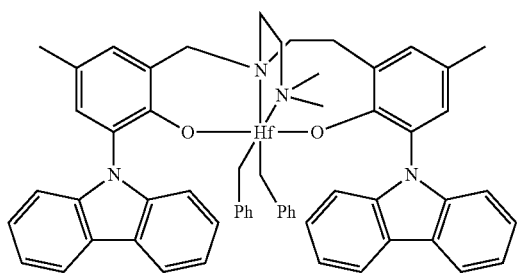
9
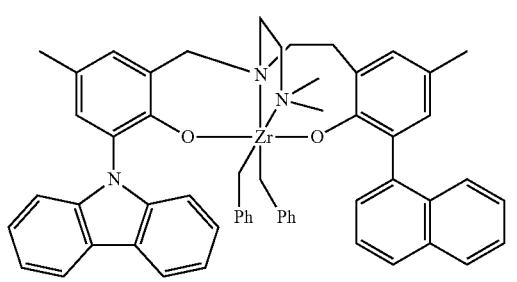
10
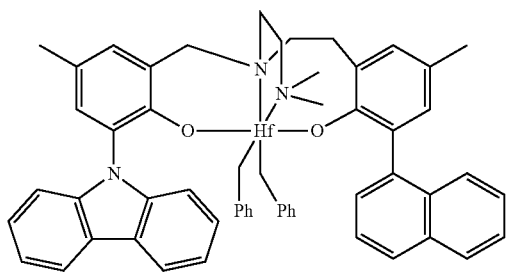
11
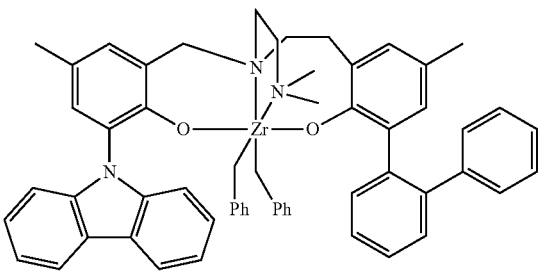
12
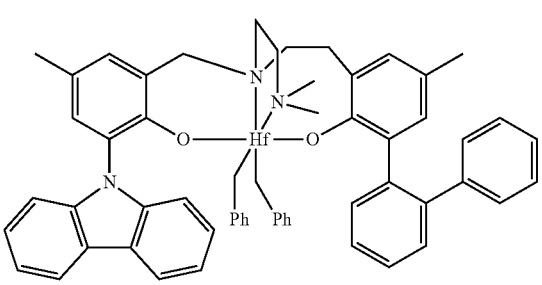
13
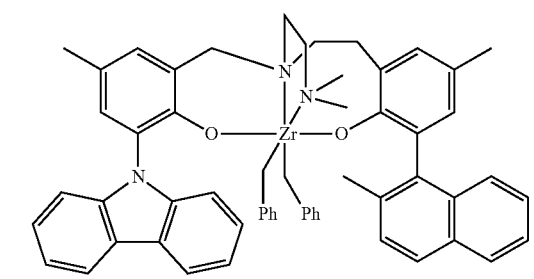
14
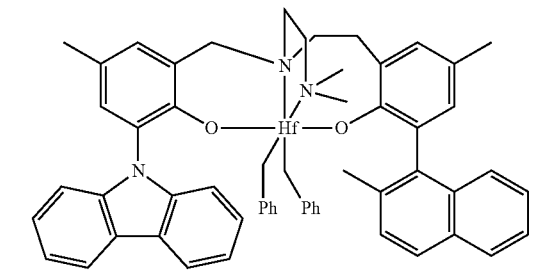
15
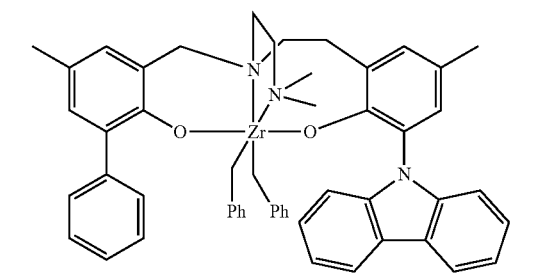

16
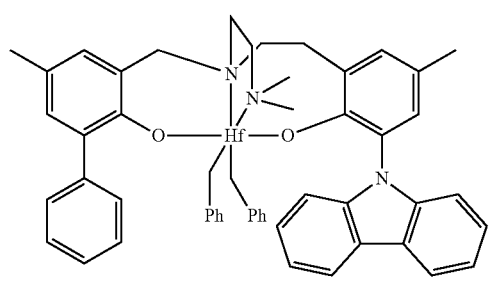
17
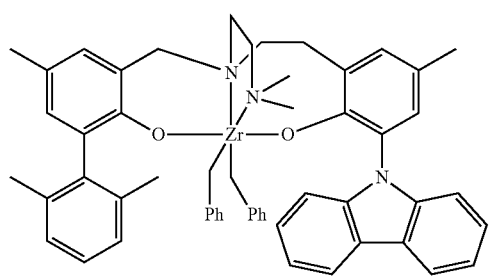
18
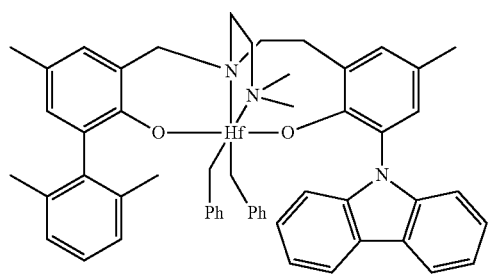
19
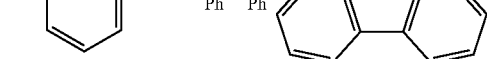
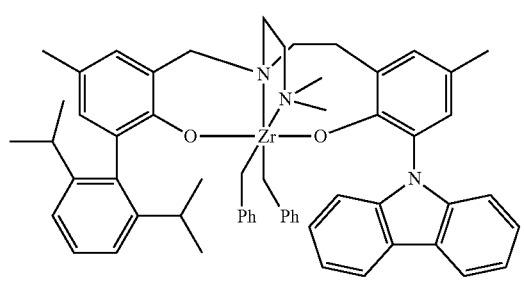
20
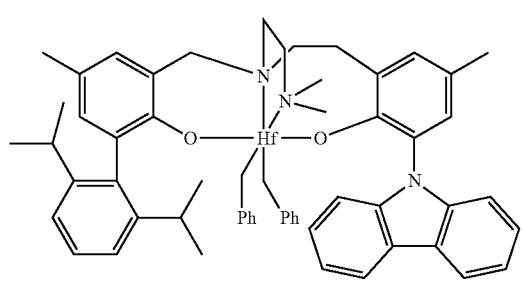
21
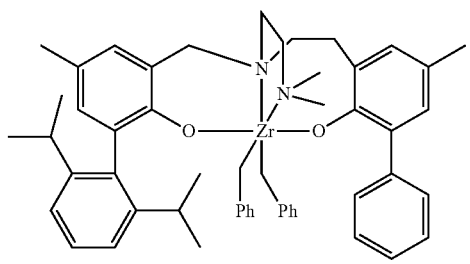
22
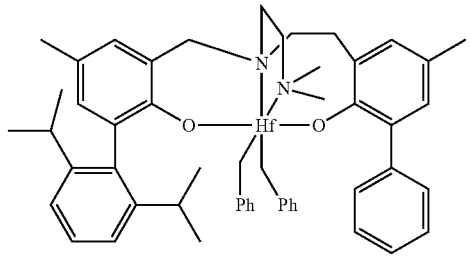
23
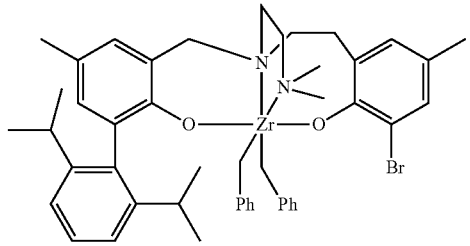
24
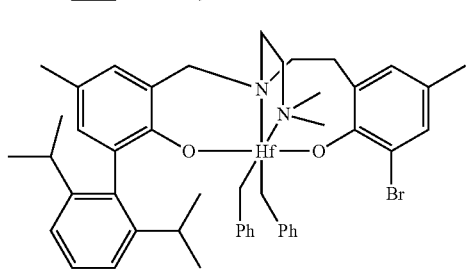
25
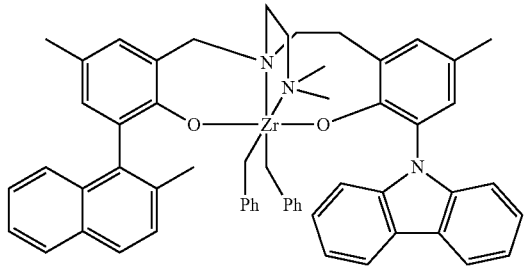
26
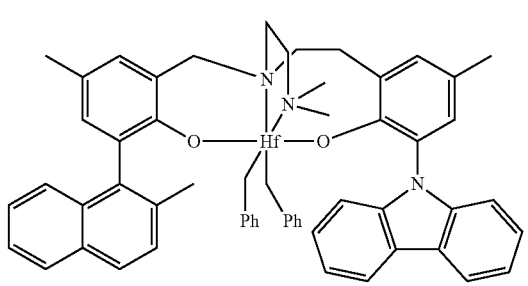

31
-continued

27
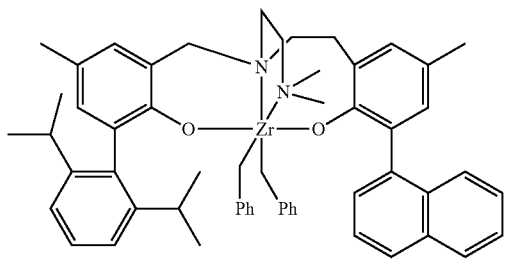

28
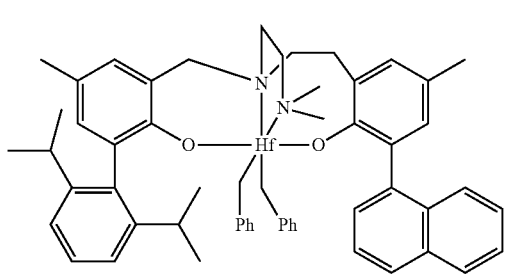

29
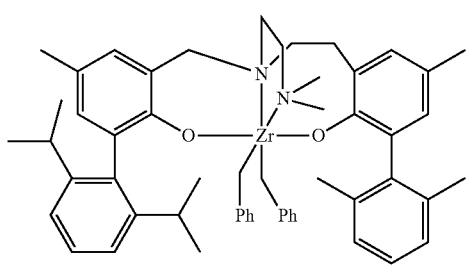

30
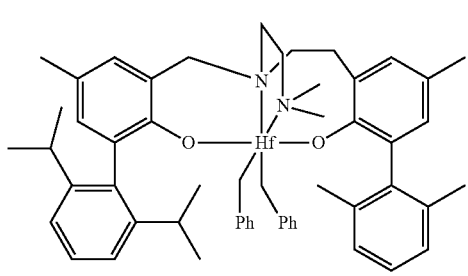

31
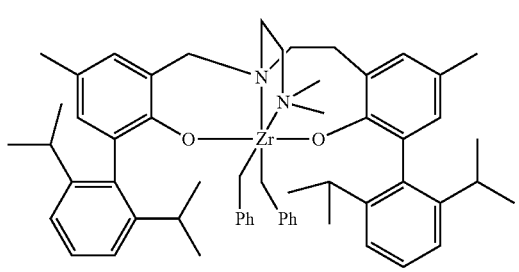

32
-continued

32
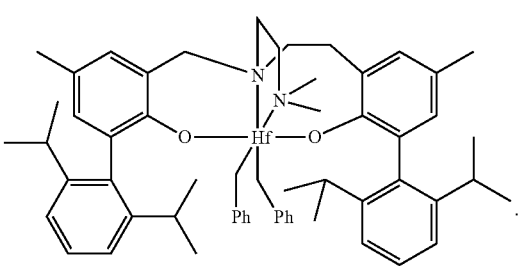

In preferred embodiments of the invention, the transition metal complex catalyst is represented by Formula (II) is one or more of the following:

1
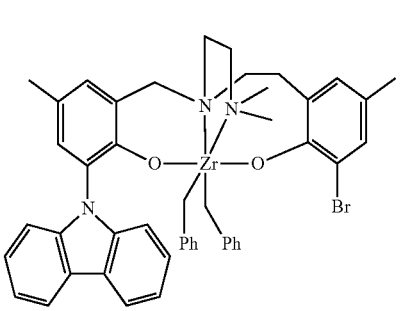

2
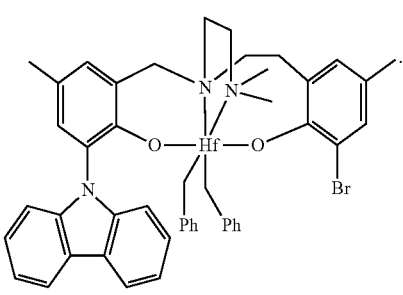

Methods to Prepare the Catalyst Compounds

Ligands of Formulas (I), (III) and (IV) may be synthesized according to the schematic reaction procedure described in Schemes 1-3. Transition metal complex catalysts of Formulas (II), (VI) and (VII) can be synthesized according to the schematic reaction procedure described in Scheme 4.

As shown in Scheme 1: (i) 2-carbazolyl-4-methylphenol is treated with paraformaldehyde to produce 2-carbazolyl-4-methyl-5-methenyl-oxo-phenol; (ii) 2-carbazolyl-4-methyl-6-methenyl-oxo-phenol is treated with N,N-dimethylethylenediamine to produce Compound A 2-carbazolyl-4-methyl-6-methene-(N,N-dimethyl-ethylenediamine)-phenol.

Scheme 1

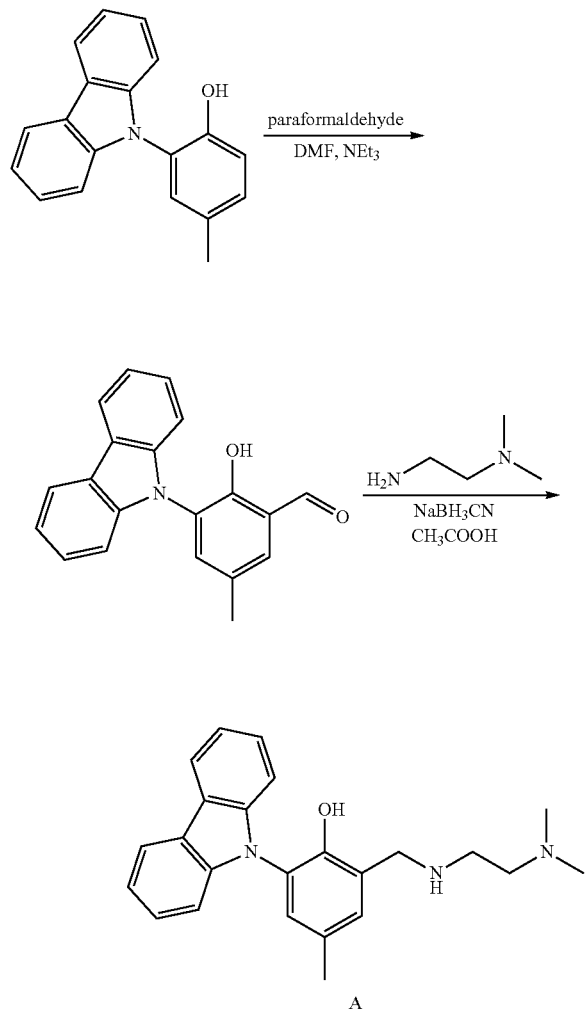

bromo-4-methyl-6-allylbenzene is treated with ozone to produce Compound B 1-(MOM-oxy)-2-bromo-4-methyl-6-propenyl-oxo-benzene.

Scheme 2

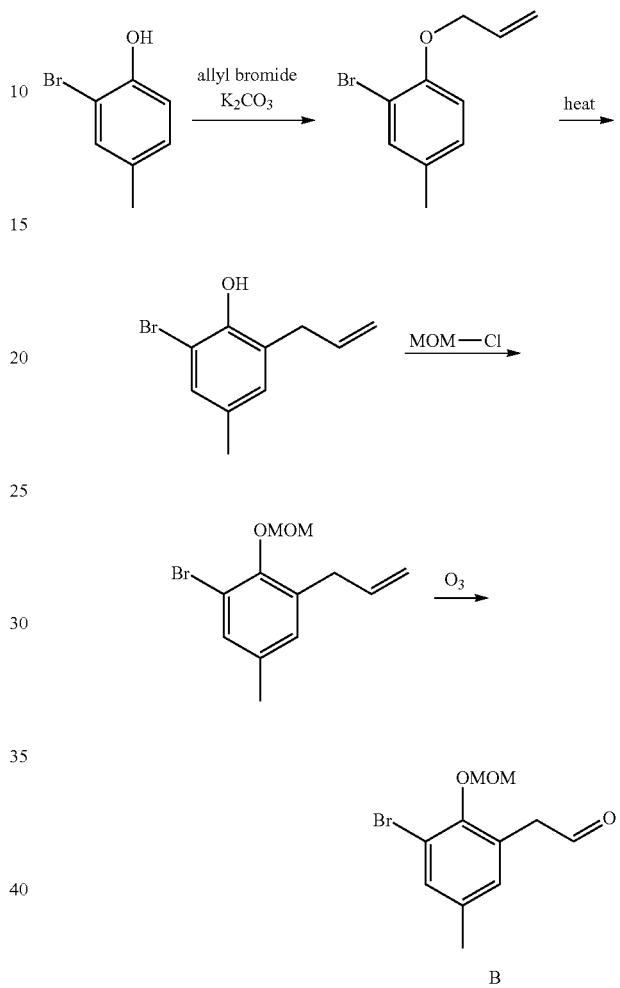

As shown in Scheme 2: (i) 2-bromo-4-methylphenol is treated with allyl bromide to produce 1-(allyloxy)-2-bromo-4-methylbenzene; (ii) 1-(allyloxy)-2-bromo-4-methylbenzene is heated to produce 2-bromo-4-methyl-6-allylphenol; (iii) 2-bromo-4-methyl-6-allylphenol is treated with methoxymethyl chloride to produce 1-(MOM-oxy)-2-bromo-4-methyl-5-allylbenzene; and (iv) 1-(MOM-oxy)-2-

As shown in Scheme 3: Compound A 2-carbazolyl-4-methyl-6-methene-(N,N-dimethyl-ethylenediamine)-phenol and Compound B 1-(MOM-oxy)-2-bromo-4-methyl-6-propenyl-oxo-benzene are combined and reacted to produce the ligand of Formula (IV).

Scheme 3

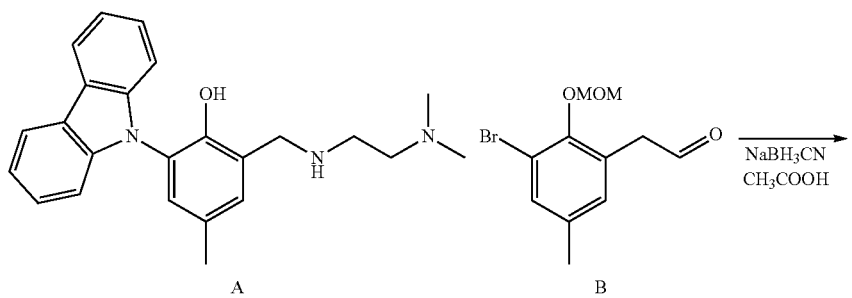

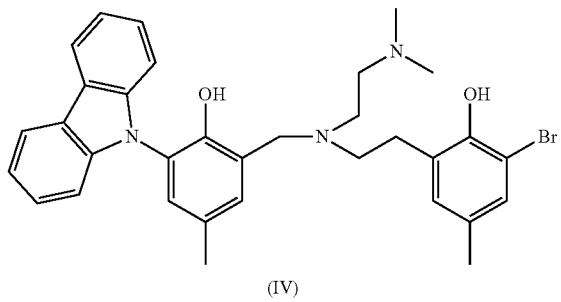

(IV)

As shown in Scheme 4: The ligand of Formula (IV) and a tetrabenzyl metal (Zr or Hf) are combined and reacted to produce the transition metal complex catalysts of Formula (VII), where M is zirconium or hafnium.

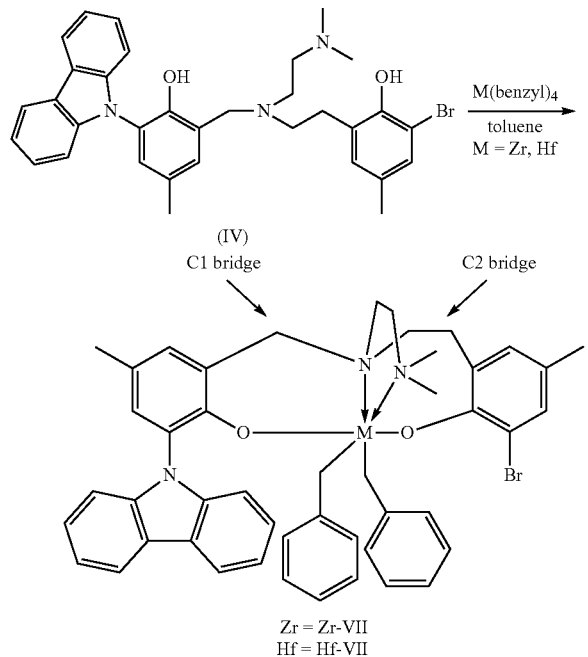

Activators

The terms "cocatalyst" and "activator" are used herein interchangeably and are defined to be any compound which can activate any one of the catalyst compounds described above by converting the neutral catalyst compound to a catalytically active catalyst compound cation.

After the catalysts have been synthesized, catalyst systems may be formed by combining the catalysts with activators in any suitable manner, including by supporting them for use in slurry or gas phase polymerization. The catalyst systems may also be added to or generated in solution polymerization or bulk polymerization (in the monomer, such as, without solvent). Suitable catalyst system may contain a transition metal complex as described above and an activator such as alumoxane or a non-coordinating anion activator. Activation may be performed using alumoxane solution including an alkyl alumoxane such as methyl alumoxane, referred to as MAO, as well as modified MAO, referred to herein as MMAO, which contains some higher alkyl groups to improve the solubility. MAO can be purchased from Albemarle Corporation, Baton Rouge, La., such as in a 10 wt % solution in toluene. In at least one embodiment, activators that is used in the catalyst system is or includes one or more alumoxanes, one or more aluminum alkyls, and other aluminum compounds. Suitable activators that can be used in the catalyst system can be or include, but are not limited to, methyl alumoxane, ethyl alumoxane, isobutyl alumoxane, isobutyl alumoxane, trimethyl aluminum, triethyl aluminum, tripropyl aluminum, tributyl aluminum, N,N-dimethylanilinium tetra(perfluorophenyl)borate, N,N-dimethylanilinium tetrakis(perfluoronaphtyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphtyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, triphenylcarbenium tetrakis(perfluorophenyl)borate, 1-(4-(tris(pentafluorophenyl)borate)-2,3,5,6-tetrafluorophenyl)pyrrolidinium, tetrakis(pentafluorophenyl)borate, 4-(tris(pentafluorophenyl)borate)-2,3,5,6-tetrafluoropyridine, isomers thereof, substitutes thereof, or any combination thereof.

When an alumoxane or modified alumoxane is used, the catalyst-to-activator molar ratio is from about 1:3,000 to about 10:1; such as about 1:2,000 to about 10:1; such as about 1:1,000 to about 10:1; such as about 1:500 to about 1:1; such as about 1:300 to about 1:1; such as about 1:200 to about 1:1; such as about 1:100 to about 1:1; such as about 1:50 to about 1:1; such as about 1:10 to about 1:1. When the activator is an alumoxane (modified or unmodified), some embodiments select the maximum amount of activator at a 5,000-fold molar excess over the catalyst (per metal catalytic site). The minimum activator-to-catalyst ratio can be 1:1 molar ratio.

Activation may also be performed using non-coordinating anions, referred to as NCA's, of the type, such as described in EP0277003A1 and EP0277004A1. NCA may be added in the form of an ion pair using, such as [DMAH]+ [NCA]– in which the N,N-dimethylanilinium (DMAH) cation reacts with a basic leaving group on the transition metal complex to form a transition metal complex cation and [NCA]–. The cation in the precursor may, alternatively, be trityl. Alternatively, the transition metal complex may be reacted with a neutral NCA precursor, such as $B(C_6F_5)_3$, which abstracts an anionic group from the complex to form an activated species. Suitable activators include N,N-dimethylanilinium tetrakis (pentafluorophenyl)borate ($[PhNMe_2H]B(C_6F_5)_4$) and N,N-dimethylanilinium tetrakis (heptafluoronaphthyl)borate, where Ph is phenyl, and Me is methyl.

Additionally, activators useful herein include those described in U.S. Pat. No. 7,247,687 at column 169, line 50 to column 174, line 43, particularly column 172, line 24 to column 173, line 53.

In at least one embodiment of the present disclosure described herein, the non-coordinating anion activator is represented by the following formula (1):

$$(Z)^{d+}(A^{d-}) \qquad (1)$$

where Z is (L-H) or a reducible Lewis acid, L is a neutral Lewis base, H is hydrogen and (L-H)$^+$ is a Brønsted acid; A$^{d-}$ is a non-coordinating anion having the charge d–; and d is an integer from 1 to 3.

When Z is (L-H) such that the cation component is (L-H)$^{d+}$, the cation component may include Brønsted acids such as protonated Lewis bases capable of protonating a moiety, such as an alkyl or aryl, from the catalyst precursor, resulting in a cationic transition metal species, or the activating cation (L-H)$^{d+}$ is a Brønsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: (Ar$_3$C$^+$), where Ar is aryl or aryl substituted with a heteroatom, or a C$_1$ to C$_{40}$ hydrocarbyl, the reducible Lewis acid may be represented by the formula: (Ph$_3$C$^+$), where Ph is phenyl or phenyl substituted with a heteroatom, and/or a C$_1$ to C$_{40}$ hydrocarbyl. In at least one embodiment, the reducible Lewis acid is triphenyl carbenium.

In at least one embodiment, the anion component A$^{d-}$ includes those having the formula [M$^k$+Q$^n$]$^{d-}$ where k is 1, 2, or 3; n is 1, 2, 3, 4, 5 or 6, or 3, 4, 5 or 6; n–k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, the Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable Ad-components also include diboron compounds as disclosed in U.S. Pat. No. 5,447,895, which is fully incorporated herein by reference.

In at least one embodiment, in any of the NCA's represented by Formula (1) described above, the anion component Ad– is represented by the formula [M*k*+Q*n*]d*– where k* is 1, 2, or 3; n* is 1, 2, 3, 4, 5, or 6 (or 1, 2, 3, or 4); n*–k*=d*; M* is boron; and Q* is independently selected from hydride, bridged or unbridged dialkylamido, halogen, alkoxide, aryloxide, hydrocarbyl radicals, the Q* having up to 20 carbon atoms with the proviso that in not more than 1 occurrence is Q* a halogen.

The present disclosure also provides a method to polymerize olefins including contacting olefins (such as propylene) with a catalyst complex as described above and an NCA activator represented by the Formula (2):

$$R_nM^{**}(ArNHal)^{4-n} \qquad (2)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. For example, the NCA containing an anion of Formula (2) also contains a suitable cation that is essentially non-interfering with the ionic catalyst complexes formed with the transition metal compounds, or the cation is Zd+ as described above.

In at least one embodiment, in any of the NCA's containing an anion represented by Formula (2) described above, R is selected from the group consisting of C$_1$ to C$_{30}$ hydrocarbyl radicals. In at least one embodiment, C$_1$ to C$_{30}$ hydrocarbyl radicals is substituted with one or more C$_1$ to C$_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means C$_4$ to C$_{20}$ hydrocarbyl radicals; —SRa, —NRa$_2$, and —PRa$_2$, where each Ra is independently a monovalent C$_4$ to C$_{20}$ hydrocarbyl radical having a molecular volume greater than or equal to the molecular volume of an isopropyl substitution or a C$_4$ to C$_{20}$ hydrocarbyl substituted organometalloid having a molecular volume greater than or equal to the molecular volume of an isopropyl substitution.

In at least one embodiment, in any of the NCA's containing an anion represented by Formula (2) described above, the NCA also includes cation containing a reducible Lewis acid represented by the formula: (Ar$_3$C$^+$), where Ar is aryl or aryl substituted with a heteroatom, and/or a C$_1$ to C$_{40}$ hydrocarbyl, or the reducible Lewis acid represented by the formula: (Ph$_3$C$^+$), where Ph is phenyl or phenyl substituted with one or more heteroatoms, and/or C$_1$ to C$_{40}$ hydrocarbyls.

In at least one embodiment, in any of the NCA's containing an anion represented by Formula (2) described above, the NCA also contains a cation represented by the formula, (L-H)$^{d+}$, wherein L is an neutral Lewis base; H is hydrogen; (L-H) is a Brønsted acid; and d is 1, 2, or 3, or (L-H)$^{d+}$ is a Brønsted acid selected from ammoniums, oxoniums, phosphoniums, silyliums, and mixtures thereof.

In at least one embodiment, suitable activators include those disclosed in U.S. Pat. Nos. 7,297,653 and 7,799,879, which are fully incorporated by reference herein.

In at least one embodiment, an activator is or includes a salt of a cationic oxidizing agent and a noncoordinating, compatible anion represented by the Formula (3):

$$(OX^{e+})_d(A^{d-})_e \qquad (3)$$

where OX$^{e+}$ is a cationic oxidizing agent having a charge of e+; e is 1, 2 or 3; d is 1, 2 or 3; and A$^{d-}$ is a non-coordinating anion having the charge of d– (as further described above). Examples of cationic oxidizing agents include: ferrocenium, hydrocarbyl-substituted ferrocenium, Ag$^+$, or Pb$^{+2}$. Suitable embodiments of A$^{d-}$ include tetrakis(pentafluorophenyl)borate.

Suitable activators useful in catalyst systems can be or include one or more of: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis (perfluoronaphthyl)borate, trimethylammonium tetrakis (perfluorobiphenyl)borate, N,N-dimethylanilinium tetrakis (perfluorobiphenyl)borate, triphenylcarbenium tetrakis (perfluorobiphenyl)borate, and the types disclosed in U.S. Pat. No. 7,297,653, which is fully incorporated by reference herein.

Suitable activators may also include: N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4^-]$; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In at least one embodiment, the activator is or includes one or more of a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate).

In at least one embodiment, an activator is or includes one or more of N,N-dimethylanilinium tetra(perfluorophenyl)borate; N,N-dimethylanilinium tetrakis(perfluoronaphthyl)borate; N,N-dimethylanilinium tetrakis(perfluorobiphenyl)borate; N,N-dimethylaniliniumtetrakis(3,5-bis (trifluoromethyl)phenyl)borate; triphenylcarbenium tetrakis (perfluoronaphthyl)borate; triphenylcarbenium tetrakis (perfluorobiphenyl)borate; triphenylcarbenium tetrakis(3,5-bis(trifluoromethyl)phenyl)borate; triphenylcarbenium tetra (perfluorophenyl)borate; trimethylammonium tetrakis (perfluoronaphthyl)borate; triethylammonium tetrakis (perfluoronaphthyl)borate; tripropylammonium tetrakis (perfluoronaphthyl)borate; tri(n-butyl)ammonium tetrakis (perfluoronaphthyl)borate; tri(t-butyl)ammonium tetrakis (perfluoronaphthyl)borate; N,N-diethylanilinium tetrakis (perfluoronaphthyl)borate; N,N-dimethyl-(2,4,6-trimethylanilinium) tetrakis(perfluoronaphthyl)borate; and tropillium tetrakis(perfluoronaphthyl)borate.

In at least one embodiment, two NCA activators is used in the polymerization and the molar ratio of the first NCA activator to the second NCA activator is any ratio. In at least one embodiment, the molar ratio of the first NCA activator to the second NCA activator is 0.01:1 to 10,000:1, or 0.1:1 to 1,000:1, or 1:1 to 100:1.

In at least one embodiment, the NCA activator-to-catalyst ratio is a 1:1 molar ratio, or 0.1:1 to 100:1, or 0.5:1 to 200:1, or 1:1 to 500:1 or 1:1 to 1,000:1. In at least one embodiment, the NCA activator-to-catalyst ratio is 0.5:1 to 10:1, or 1:1 to 5:1.

In at least one embodiment, the transition metal complex catalysts is combined with combinations of alumoxanes and NCA's (see for example, U.S. Pat. Nos. 5,153,157, 5,453,410, EP 0573120B1, WO 1994/007928, and WO 1995/014044 which discuss the use of an alumoxane in combination with an ionizing activator, all of which are incorporated by reference herein).

In at least one embodiment, when an NCA (such as an ionic or neutral activator) is used, suitable catalyst-to-activator molar ratio can be from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2.

Likewise, a co-activator, such as a group 1, 2, or 13 organometallic species (e.g., an alkyl aluminum compound such as tri-n-octyl aluminum), may be used in the catalyst system herein. The catalyst-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Support Materials

In at least one embodiment, the catalyst system includes an inert support material. In at least one embodiment, the supported material is a porous support material, for example, talc, or inorganic oxides. Other support materials include zeolites, clays, organoclays, or any other suitable organic or inorganic support material and the like, or mixtures thereof.

In at least one embodiment, the support material is an inorganic oxide. Suitable inorganic oxide materials for use in transition metal complex catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, such as functionalized polyolefins, such as polyethylene. Supports include magnesia, titania, zirconia, montmorillonite, phyllosilicate, zeolites, talc, clays, and the like. Also, combinations of these support materials may be used, such as silica-chromium, silica-alumina, silica-titania, and the like. Support materials can be or include, but are not limited to $Al_2O_3$, $ZrO_2$, $SiO_2$, $SiO_2/Al_2O_3$, $SiO_2/TiO_2$, silica clay, silicon oxide/clay, or any mixture thereof.

The support material, such as an inorganic oxide, can have a surface area in the range of from about 10 $m^2/g$ to about 700 $m^2/g$, pore volume in the range of from about 0.1 $cm^3/g$ to about 4 $cm^3/g$ and average particle size in the range of from about 5 μm to about 500 μm. In at least one embodiment, the surface area of the support material is in the range of from about 50 $m^2/g$ to about 500 $m^2/g$, pore volume of from about 0.5 $cm^3/g$ to about 3.5 $cm^3/g$ and average particle size of from about 10 μm to about 200 μm. In at least one embodiment, the surface area of the support material is in the range of from about 100 $m^2/g$ to about 400 $m^2/g$, pore volume from about 0.8 $cm^3/g$ to about 3 $cm^3/g$ and average particle size is from about 5 μm to about 100 μm. The average pore size of the support material useful in the present disclosure is in the range of from 10 Å to 1,000 Å, such as 50 Å to about 500 Å, such as 75 Å to about 350 Å. In at least one embodiment, the support material is a high surface area, amorphous silica (surface area=300 $m^2/gm$; pore volume of 1.65 $cm^3/gm$). Silicas are marketed under the tradenames of DAVISON 952 or DAVISON 955 by the Davison Chemical Division of W. R. Grace and Company. In other embodiments DAVISON 948 is used. Alternatively, a silica can be ES-70™ silica (PQ Corporation, Malvern, Pa.) that has preferably been calcined (such as at 875° C.).

The support material should be dry, that is, substantially free of absorbed water. Drying of the support material can be effected by heating or calcining at about 100° C. to about 1,000° C., such as at least about 600° C. When the support material is silica, it is heated to at least 200° C., such as about 200° C. to about 850° C., such as at about 600° C.; and for a time of about 1 minute to about 100 hours, from about 12 hours to about 72 hours, or from about 24 hours to about 60 hours. The calcined support material should have at least some reactive hydroxyl (OH) groups to produce supported catalyst systems of the present disclosure. The calcined support material is then contacted with at least one polymerization catalyst containing one or more transition metal complex catalyst and an activator.

The support material, having reactive surface groups, such as hydroxyl groups, is slurried in a non-polar solvent and the resulting slurry is contacted with a solution of a transition metal complex catalyst and an activator. In at least one embodiment, the slurry of the support material is first contacted with the activator for a period of time in the range of from about 0.5 hours to about 24 hours, from about 2 hours to about 16 hours, or from about 4 hours to about 8 hours. The solution of the transition metal complex catalyst is then contacted with the isolated support/activator. In at least one embodiment, the supported catalyst system is generated in situ. The slurry of the support material can be first contacted with the catalyst compound for a period of time in the range of from about 0.5 hours to about 24 hours, from about 2 hours to about 16 hours, or from about 4 hours to about 8 hours. The slurry of the supported transition metal complex catalyst is then contacted with the activator solution.

The mixture of the catalyst, activator and support is heated to about 0° C. to about 70° C., such as to about 23° C. to about 60° C., such as at room temperature. Suitable contact times can range from about 0.5 hours to about 24 hours, from about 2 hours to about 16 hours, or from about 4 hours to about 8 hours.

Suitable non-polar solvents are materials in which all of the reactants used herein, e.g., the activator, and the catalyst compound, are at least partially soluble and which are liquid at room temperature. Non-limiting example non-polar solvents are alkanes, such as isopentane, hexane, n-heptane, octane, nonane, and decane, cycloalkanes, such as cyclohexane, aromatics, such as benzene, toluene, and ethylbenzene.

In at least one embodiment, the support material contains a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof and the electron-withdrawing anion is selected from fluoride, chloride, bromide, phosphate, triflate, bisulfate, sulfate, or any combination thereof.

The electron-withdrawing component used to treat the support material can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In one or more embodiments, the activator-support can be or include fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, H+, [H(OEt$_2$)$_2$]+, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in one or more embodiments, two or more electron-withdrawing anion source compounds in two or more separate contacting steps.

In at least one embodiment, a process by which a chemically-treated support material is prepared can include contacting a selected support material, or combination of support materials, with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, such as a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process that includes: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Polymerization Processes

In at least one embodiment, the present disclosure provides polymerization processes where monomer (e.g., ethylene and/or propylene), and optionally comonomer, are contacted with a catalyst system containing one or more transition metal complex catalysts and one or more activators, as described above. The catalyst compound and activator may be combined in any order, and are combined prior to contacting with the monomer.

In at least one embodiment, a polymerization process includes a) contacting one or more olefin monomers with a catalyst system containing: i) an activator and ii) a catalyst compound. The activator may be an alumoxane or a non-coordination anion activator. The one or more olefin monomers can be or include, but are not limited to, ethylene, propylene, butylene, or any combination thereof. The polymerization process further includes heating the one or more olefin monomers and the catalyst system to 70° C. or more to form polyethylene, polypropylene, or a copolymer containing both polyethylene and polypropylene.

Monomers useful herein include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer contains ethylene and an optional comonomers containing one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer contains ethylene and an optional comonomers containing one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced herein at up to 20 wt %, such as at about 0.00001 wt % to about 10 wt %, such as about 0.002 wt % to about 1 wt %, such as about 0.003 wt % to about 0.2 wt %, based upon the total weight of the composition. In at least one embodiment, 500 ppm or less of diene is added to the polymerization, such as 400 ppm or less, such as 300 ppm or less. In other embodiments at least 50 ppm of diene is added to the polymerization, or 100 ppm or more, or 150 ppm or more.

Diolefin monomers include any hydrocarbon structure, such as $C_4$ to $C_{30}$, having at least two unsaturated bonds, where at least two of the unsaturated bonds are readily incorporated into a polymer by either a stereospecific or a non-stereospecific catalyst(s). The diolefin monomers can be selected from alpha, omega-diene monomers (e.g., di-vinyl monomers). The diolefin monomers are linear di-vinyl monomers, such as those containing from 4 carbon atoms to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1,000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be performed. For example, a homogeneous polymerization process is one where at least 90 wt % of the product is soluble in the reaction media. A bulk homogeneous process can be used. For example, a bulk process is one where monomer concentration in all feeds to the reactor is 70 volume % or more. Alternately, no solvent or diluent is present or added in the reaction medium, (except for the small amounts used as the carrier for the catalyst system or other additives, or amounts found with the monomer; e.g., propane in propylene). In at least one, the process is a slurry polymerization process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In at least one embodiment, the solvent is not aromatic, such that aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 80 vol % solvent or less, 60 vol % solvent or less, such as 40 vol % or less, such as 20 vol % or less, based on the total volume of the feedstream. The polymerization can be performed in a bulk process.

Polymerizations can be performed at any temperature and/or pressure suitable to obtain the desired polymers, such as ethylene and or propylene polymers. Suitable temperatures and/or pressures include a temperature in the range of from about 0° C. to about 300° C., such as about 20° C. to about 200° C., such as about 35° C. to about 150° C., such as about 40° C. to about 120° C., such as about 45° C. to about 80° C., for example about 80° C., and at a pressure in the range of from about 0.35 MPa to about 10 MPa, such as about 0.45 MPa to about 6 MPa, such as about 0.5 MPa to about 4 MPa, such as 0.66 MPa or 0.93 MPa, for example.

In a suitable polymerization, the run time of the reaction is up to 300 minutes, such as in the range of from about 5 minutes to about 250 minutes, such as about 10 minutes to about 120 minutes.

In at least one embodiment, hydrogen is present in the polymerization reactor at a partial pressure of about 0.001 psig to about 50 psig (about 0.007 kPa to about 345 kPa), such as from about 0.01 psig to about 25 psig (about 0.07 kPa to about 172 kPa), such as about 0.1 psig to about 10 psig (about 0.7 kPa to about 70 kPa).

In at least one embodiment, the catalyst system or the transition metal complex has a catalytic activity of about 10 kg/mmol/hr or greater, such as of about 20 kg/mmol/hr or greater, such as of about 40 kg/mmol/hr or greater, such as of about 50 kg/mmol/hr or greater, such as of about 70 kg/mmol/hr or greater, such as of about 80 kg/mmol/hr or greater, such as of about 90 kg/mmol/hr or greater, such as of about 100 kg/mmol/hr or greater, such as of about 120 kg/mmol/hr or greater, such as of about 150 kg/mmol/hr or greater, such as of about 180 kg/mmol/hr or greater, such as of about 200 kg/mmol/hr or greater, such as of about 250 kg/mmol/hr or greater, such as of about 300 kg/mmol/hr or greater, such as of about 350 kg/mmol/hr or greater, such as of about 400 kg/mmol/hr or greater, such as of about 450 kg/mmol/hr or greater, such as of about 500 kg/mmol/hr or greater, such as of about 550 kg/mmol/hr or greater, such as of about 600 kg/mmol/hr or greater, such as of about 700 kg/mmol/hr or greater, such as of about 800 kg/mmol/hr or greater, such as of about 900 kg/mmol/hr or greater, such as of about 1,000 kg/mmol/hr or greater, such as of about 1,200 kg/mmol/hr or greater, such as of about 1,500 kg/mmol/hr or greater, such as of about 2,000 kg/mmol/hr, or greater. For example, the catalyst system or the transition metal complex has a catalytic activity of about 10 kg/mmol/hr to about 2,000 kg/mmol/hr, such as about 10 kg/mmol/hr to about 1,500 kg/mmol/hr, such as about 10 kg/mmol/hr to about 1,000 kg/mmol/hr, such as about 10 kg/mmol/hr to about 800 kg/mmol/hr, such as about 10 kg/mmol/hr to about 700 kg/mmol/hr, such as about 10 kg/mmol/hr to about 600 kg/mmol/hr, such as about 10 kg/mmol/hr to about 500 kg/mmol/hr, such as about 10 kg/mmol/hr to about 400 kg/mmol/hr, such as about 10 kg/mmol/hr to about 300 kg/mmol/hr, such as about 50 kg/mmol/hr to about 1,500 kg/mmol/hr, such as about 50 kg/mmol/hr to about 1,000 kg/mmol/hr, such as about 50 kg/mmol/hr to about 800 kg/mmol/hr, such as about 50 kg/mmol/hr to about 700 kg/mmol/hr, such as about 50 kg/mmol/hr to about 600 kg/mmol/hr, such as about 50 kg/mmol/hr to about 500 kg/mmol/hr, such as about 50 kg/mmol/hr to about 400 kg/mmol/hr, such as about 50 kg/mmol/hr to about 300 kg/mmol/hr, such as about 100 kg/mmol/hr to about 1,500 kg/mmol/hr, such as about 100 kg/mmol/hr to about 1,000 kg/mmol/hr, such as about 100 kg/mmol/hr to about 800 kg/mmol/hr, such as about 100 kg/mmol/hr to about 700 kg/mmol/hr, such as about 100 kg/mmol/hr to about 600 kg/mmol/hr, such as about 100 kg/mmol/hr to about 500 kg/mmol/hr, such as about 100 kg/mmol/hr to about 400 kg/mmol/hr, such as about 100 kg/mmol/hr to about 300 kg/mmol/hr, such as about 200 kg/mmol/hr to about 1,500 kg/mmol/hr, such as about 200 kg/mmol/hr to about 1,000 kg/mmol/hr, such as about 200 kg/mmol/hr to about 800 kg/mmol/hr, such as about 200 kg/mmol/hr to about 700 kg/mmol/hr, such as about 200 kg/mmol/hr to about 600 kg/mmol/hr, such as about 200 kg/mmol/hr to about 500 kg/mmol/hr, about 200 kg/mmol/hr to about 400 kg/mmol/hr, such as about 200 kg/mmol/hr to about 300 kg/mmol/hr, such as about 400 kg/mmol/hr to about 1,500 kg/mmol/hr, such as about 400 kg/mmol/hr to about 1,000 kg/mmol/hr, such as about 400 kg/mmol/hr to about 800 kg/mmol/hr, such as about 400 kg/mmol/hr to about 700 kg/mmol/hr, such as about 400 kg/mmol/hr to about 600 kg/mmol/hr, such as about 400 kg/mmol/hr to about 500 kg/mmol/hr, such as or about 300 kg/mmol/hr to about 400 kg/mmol/hr.

In at least one embodiment, the catalyst system or the transition metal complex has a catalytic activity of in a range from about 10 kg/mmol/hr to about 1,000 kg/mmol/hr, such as about 100 kg/mmol/hr to about 1,000 kg/mmol/hr, such as about 100 kg/mmol/hr to about 600 kg/mmol/hr, such as about 200 kg/mmol/hr to about 600 kg/mmol/hr, such as about 400 kg/mmol/hr to about 600 kg/mmol/hr.

In at least one embodiment, the conversion of olefin monomer is at least 10%, based upon polymer yield and the weight of the monomer entering the reaction zone, such as 20% or more, such as 30% or more, such as 50% or more, such as 80% or more. In at least one embodiment, a catalyst of the present disclosure has an activity of 25,000 g/mmol/hr to about 260,000 g/mmol/hr. In at least one embodiment, a catalyst of the present disclosure is capable of producing polyethylene having an Mw from about 40,000 g/mol to about 1,500,000 g/mol, such as from about 180,000 g/mol to about 1,000,000 g/mol, such as from about 300,000 g/mol to about 900,000 g/mol, such as from about 400,000 g/mol to about 800,000 g/mol, such as from about 500,000 g/mol to about 660,000 g/mol. In at least one embodiment, a catalyst of the present disclosure is capable of producing polyethylene having an Mn from about 30,000 g/mol to about 1,000,000 g/mol, such as from about 70,000 g/mol to about 500,000 g/mol, such as from about 100,000 g/mol to about 400,000 g/mol, such as from about 250,000 g/mol to about 300,000 g/mol. In at least one embodiment, a catalyst of the present disclosure is capable of producing polyethylene having an Mw/Mn value from about 1 to about 5, such as from about 1.5 to about 4, such as from about 2 to about 4, such as from about 2.5 to about 3.5. In at least one embodiment, for catalyst systems containing and one or more transition metal complex catalysts, such as a catalyst of Formulas (II), (V), (VI) and (VII), a polyethylene formed by the catalyst system have an Mw/Mn value from about 1 to about 5, such as from about 1.5 to about 4, such as from about 2 to about 4, such as from about 2.5 to about 3.5. In at least one embodiment, a catalyst of the present disclosure is capable of producing polyethylene having a comonomer content $C_8$ wt % of 10 wt % or greater, such as 12 wt % or greater, such as 15 wt % or greater, such as 17 wt % or greater, such as 19 wt % or greater, such as 19.5 wt %, for example.

In at least one embodiment, little or no alumoxane is used in the process to produce the polymers. Alumoxane can be present at zero mol %, alternatively the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. Scavenger (such as trialkyl aluminum) can be present at zero mol %, alternately the scavenger is present at a molar ratio of scavenger metal to transition metal of less than 100:1, such as less than 50:1, such as less than 15:1, such as less than 10:1.

In at least one embodiment, the polymerization: 1) is conducted at temperatures of about 0° C. to about 300° C. (such as about 25° C. to about 150° C., such as about 40° C. to about 120° C., such as about 70° C. to about 110° C.); 2) is conducted at a pressure of atmospheric pressure to 10 MPa (such as about 0.35 MPa to about 10 MPa, such as from about 0.45 MPa to about 6 MPa, such as from about 0.5 MPa to about 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, where aromatics are present in the solvent at less than 1 wt %, such as less than 0.5 wt %, such as at 0 wt % based upon the weight of the solvents); and 4) the activity of the catalyst compound is at least 25,000 g/mmol/hr, such about 150,000 g/mmol/hr, about 200,000 g/mmol/hr, about 250,000 g/mmol/hr or greater. In at least one embodiment, the catalyst system used in the polymerization includes no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Chain Transfer Agent

A "chain transfer agent" (CTA) is any agent capable of hydrocarbyl and/or polymeryl group exchange between a coordinative polymerization catalyst and the metal center of the chain transfer agent during a polymerization process. The chain transfer agent can be any desirable chemical compound such as those disclosed in WO 2007/130306. The chain transfer agent can be selected from Group 2, 12, or 13 alkyl or aryl compounds, such as zinc, magnesium, or aluminum alkyls or aryls. In some examples, the alkyl is a $C_1$-$C_{30}$ alkyl, a $C_2$-$C_{20}$ alkyl, or a $C_3$-$C_{12}$ alkyl. Suitable alkyls for the CTA can be or include, but are not limited to, methyl, ethyl, propyl, butyl, isobutyl, tertbutyl, pentyl, hexyl, cyclohexyl, phenyl, octyl, nonyl, decyl, undecyl, dodecyl, isomers thereof, or any combination thereof.

In at least one embodiment, the chain transfer agent is selected from dialkyl zinc compounds, where the alkyl is independently selected from methyl, ethyl, propyl, butyl, isobutyl, tertbutyl, pentyl, hexyl, cyclohexyl, and phenyl. In at least one embodiment, the chain transfer agent is selected from trialkyl aluminum compounds, where the alkyl is independently selected from methyl, ethyl, propyl, butyl, isobutyl, tertbutyl, pentyl, hexyl, and cyclohexyl. In at least one embodiment, the chain transfer agent is selected from tri aryl aluminum compounds where the aryl is selected from phenyl and substituted phenyl.

In at least one embodiment, the process is characterized by the transfer of at least 0.5 polymer chains (e.g., 0.5 to 3) polymer chains, where n is the maximum number of polymer chains that can be transferred to the chain transfer agent metal, such as n is 1 to 3 for trivalent metals (such as Al) and 1 to 2 for divalent metals (such as Zn), such as n is 1.5 to 3 for trivalent metals (such as Al) and 1.5-2 for divalent metals (such as Zn). The number of chains transferred per metal is the slope of the plot of moles of polymer produced versus the moles of the chain transfer agent metal (as determined from at least four points, CTA metal:catalyst transition metal of 20:1, 80:1, 140:1 and 200:1, using least squares fit (Microsoft™ Excel 2010, version 14.0.7113.5000 (32 bit)) to draw the line.

Suitable chain transfer agents can be present at from 10 or 20 or 50 or 100 equivalents to 600 or 700 or 800 or 1,000 or 2,000 or 4,000 equivalents relative to the catalyst component. Alternately the chain transfer agent is preset at a catalyst complex-to-CTA molar ratio of from about 1:12,000 to 10:1; alternatively 1:6,000; alternatively, 1:3,000 to 10:1; alternatively 1:2,000 to 10:1; alternatively 1:1,000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1.

Suitable chain transfer agents can be or include a compound represented by the formula $AlR_3$, $MgR_2$, or $ZnR_2$, where each R is, independently, a $C_1$-$C_8$ hydrocarbyl, such as methyl, ethyl, propyl, butyl, phenyl, hexyl, octyl, or an isomer thereof. Suitable chain transfer agents can be or include, but are not limited to, diethylzinc, tri-n-octyl aluminum, trimethylaluminum, triethylaluminum, tri-isobutylaluminum, tri-n-hexylaluminum, trioctylaluminum, diethyl aluminum chloride, methyl alumoxane, dibutyl zinc, di-n-propylzinc, di-n-hexylzinc, di-n-pentylzinc, di-n-decylzinc, di-n-dodecylzinc, di-n-tetradecylzinc, di-n-hexadecylzinc, di-n-octadecylzinc, diphenylzinc, diisobutylaluminum hydride, diethylaluminum hydride, di-n-octylaluminum hydride, dibutylmagnesium, diethylmagnesium, dihexylmagnesium, triethylboron, or any combination thereof.

In at least one embodiment, two or more complexes are combined with diethyl zinc and/or tri-n-octylaluminum in the same reactor with monomer(s). Alternately, one or more complexes is/are combined with another catalyst and diethyl zinc and/or tri-n-octylaluminum in the same reactor with monomers.

In at least one embodiment, one or more complexes is/are combined with a mixture of diethyl zinc and an aluminum reagent in the same reactor with monomer(s). Alternately, one or more complexes is/are combined with two chain transfer agents in the same reactor with monomers.

Polyolefin Products

The present disclosure also provides compositions of matter which can be produced by the methods described herein.

In at least one embodiment, the process described herein produces ethylene homopolymers or ethylene copolymers, such as ethylene-propylene and/or ethylene-alpha-olefin (such as $C_4$ to $C_{20}$) copolymers (such as ethylene-hexene copolymers or ethylene-octene copolymers) having an Mw/Mn of greater than 1 to 4 (such as greater than 1 to 3).

Likewise, the process of the present disclosure produces olefin polymers, such as polyethylene and polypropylene homopolymers and copolymers. In at least one embodiment, the polymers produced herein are homopolymers of ethylene or propylene, are copolymers of ethylene such as copolymer of ethylene having from 0 mol % to about 25 mol % (such as from about 0.5 mol % to about 20 mol %, such as from about 1 mol % to about 15 mol %, such as from about 3 mol % to about 10 mol %) of one or more $C_3$ to $C_{20}$ olefin comonomer (such as $C_3$ to $C_{12}$ alpha-olefin, such as propylene, butene, hexene, octene, decene, dodecene, such as propylene, butene, hexene, octene), or are copolymers of propylene such as copolymers of propylene having from 0 mol % to about 25 mol % (such as from about 0.5 mol % to about 20 mol %, such as from about 1 mol % to about 15 mol %, such as from about 3 mol % to about 10 mol %) of one or more of $C_2$ or $C_4$ to $C_{20}$ olefin comonomer (such as ethylene or $C_4$ to $C_{12}$ alpha-olefin, such as butene, hexene, octene, decene, dodecene, such as ethylene, butene, hexene, octene).

In at least one embodiment, a polymer, such as polyethylene, has a comonomer content of 10 wt % or greater, such as 12 wt % or greater, such as 15 wt % or greater, such as 17 wt % or greater, such as 19 wt % or greater, such as 19.5 wt %, for example. In at least one embodiment, the monomer is ethylene and the comonomer is octene, such as from about 10 wt % to about 20 wt % octene, such as about 12 wt % to about 19.5 wt % octene.

In at least one embodiment, a polymer, such as polyethylene, has a Tm from about 80° C. to about 115° C., such as from about 82° C. to about 110° C., such as from about 85° C. to about 105° C., as determined by Differential Scanning calorimetry. For purposes of the claims to this invention the following DSC procedure shall be used:

Differential Scanning calorimetry. Melting Temperature, Tm, is measured by differential scanning calorimetry ("DSC") using a DSCQ200 unit. The sample is first equilibrated at 25° C. and subsequently heated to 220° C. using a heating rate of 10° C./min (first heat). The sample is held at 220° C. for 3 minutes. The sample is subsequently cooled down to −100° C. with a constant cooling rate of 10° C./min (first cool). The sample is equilibrated at −100° C. before being heated to 220° C. at a constant heating rate of 10° C./min (second heat). The exothermic peak of crystallization (first cool) is analyzed using the TA Universal Analysis software and the corresponding to 10° C./min cooling rate is determined. The endothermic peak of melting (second heat) is also analyzed using the TA Universal Analysis software and the peak melting temperature (Tm) corresponding to 10° C./min heating rate is determined.

In at least one embodiment, a polymer, such as polyethylene, has an Mw from about 40,000 g/mol to about 1,500,000 g/mol, such as from about 180,000 g/mol to about 1,000,000 g/mol, such as from about 300,000 g/mol to about 900,000 g/mol, such as from about 400,000 g/mol to about 800,000 g/mol, such as from about 500,000 g/mol to about 660,000 g/mol. In at least one embodiment, a polymer, such as polyethylene, has an Mn from about 30,000 g/mol to about 1,000,000 g/mol, such as from about 70,000 g/mol to about 500,000 g/mol, such as from about 100,000 g/mol to about 400,000 g/mol, such as from about 200,000 g/mol to about 400,000 g/mol. In at least one embodiment, a polymer, such as polyethylene, has an Mw/Mn value from about 1 to about 5, such as from about 1.1 to about 4, such as from about 1.2 to about 3, such as from about 1.4 to about 2.5.

Molecular Weight, Comonomer Composition and Long Chain Branching Determination by Polymer Char GPC-IR Hyphenated with Multiple Detectors For purposes of the claims, and unless otherwise indicated, the distribution and the moments of molecular weight (Mw, Mn, Mz, Mw/Mn, etc.), the comonomer content ($C_2$, $C_3$, $C_6$, etc.) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-µm Teflon filter and degassed with an online degasser before entering the GPC instrument. The nominal flow rate is 1.0 ml/min and the nominal injection volume is 200 µL. The whole system including transfer lines, columns, and detectors are contained in an oven maintained at 145° C. Given amount of polymer sample is weighed and sealed in a standard vial with 80-4 flow marker (Heptane) added to it. After loading the vial in the autosampler, polymer is automatically dissolved in the instrument with 8 ml added TCB solvent. The polymer is dissolved at 160° C. with continuous shaking for about 1 hour for most polyethylene samples or 2 hours for polypropylene samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha+1} + \frac{\alpha_{PS}+1}{\alpha+1}\log M_{PS}$$

where the variables with subscript "PS" stand for polystyrene while those without a subscript are for the test samples. In this method, $\alpha_{PS}$=0.67 and $K_{PS}$=0.000175, while a and K for other materials are as calculated and published in literature (Sun, T. et al. (2001) *Macromolecules*, v. 34(19), pp. 6812-6820), except that for purposes of this invention and claims thereto, α=0.695+(0.01*(wt. fraction propylene)) and K=0.000579-(0.0003502*(wt. fraction propylene)) for ethylene-propylene copolymers and ethylene-propylene-diene terpolymers, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1-0.0087*w2b+0.000018*(w2b)−2) for ethylene-butene copolymer where w2b is a bulk weight percent of butene comonomer, a is 0.695 and K is 0.000579*(1-0.0075*w2b) for ethylene-hexene copolymer where w2b is a bulk weight percent of hexene comonomer, and α is 0.695 and K is 0.000579*(1-0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$w2 = f*SCB/1000TC$.

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk } IR \text{ ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $w2b = f*\text{bulk CH3/1000TC}$ bulk SCB/1000TC=bulk CH3/1000TC−bulk CH3end/1000TC and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (Light Scattering from Polymer Solutions; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, A2 is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing ethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

In at least one embodiment, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

In at least one embodiment, a bimodal polymer, such as a bimodal polyethylene (e.g., formed by a catalyst system having a catalyst represented by Formulas (II), (V), (VI) and (VII) and another type of catalyst, such as, for example, a metallocene catalyst) has an Mw/Mn value from about 1 to about 10, such as from about 1.5 to about 8, such as from about 2 to about 4, such as from about 2 to about 3.

In at least one embodiment, the polymer produced herein has a composition distribution breadth index (CDBI) of 50% or more, such as 60% or more, such as 70% or more. CDBI is a measure of the composition distribution of monomer within the polymer chains and is measured by the procedure described in PCT publication WO 1993/003093, published Feb. 18, 1993, specifically columns 7 and 8 as well as in Wild, L. et al. (1982) J. Poly. Sci., Poly. Phys. Ed., v 20, pp. 441-455 and U.S. Pat. No. 5,008,204, including that fractions having a weight average molecular weight (Mw) below 15,000 are ignored when determining CDBI.

Blends

In at least one embodiment, the polymer (such as polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, LDPE, LLDPE, HDPE, random copolymer of ethylene and propylene, and/or butene, hexene, polybutene, ethylene vinyl acetate, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as polyethylene or polypropylene) is present in the above blends, at from 10 to 99 wt %, based upon the weight of the polymers in the blend, such as 20 to 95 wt %, such as at least 30 to 90 wt %, such as at least 40 to 90 wt %, such as at least 50 to 90 wt %, such as at least 60 to 90 wt %, such as at least 70 to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Specifically, any of the foregoing polymers, such as the foregoing polyethylenes or blends thereof, may be used in a variety of end-use applications. Such applications include, for example, mono- or multi-layer blown, extruded, and/or shrink films. These films may be formed by any number of extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. For example, the films are oriented in the Machine Direction (MD) at a ratio of up to 15, such as between 5 and 7, and in the Transverse Direction (TD) at a ratio of up to 15, such as 7 to 9. However, in at least one embodiment the film is oriented to the same extent in both the MD and TD directions.

The films may vary in thickness depending on the intended application; however, films of a thickness from 1 to 50 µm are usually suitable. Films intended for packaging are usually from 10 to 50 µm thick. Suitable thickness of the sealing layer can be 0.2 µm to 50 µm. There may be a sealing layer on both the inner and outer surfaces of the film or the sealing layer may be present on only the inner or the outer surface.

In at least one embodiment, one or more layers is modified by corona treatment, electron beam irradiation, gamma irradiation, flame treatment, or microwave. In at least one embodiment, one or both of the surface layers is modified by corona treatment.

This invention also relates to:
1. A ligand represented by Formula (I):

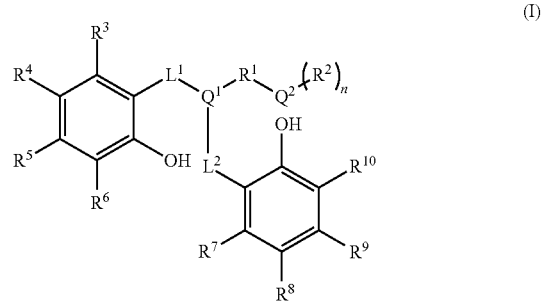

wherein:
$Q^1$ is a Group 15 atom;
$Q^2$ is a Group 15 atom or a Group 16 atom, wherein n is 0 if $Q^2$ is a Group 16 atom or n is 1 if $Q^2$ is a Group 15 atom;
$R^1$ is a substituted or unsubstituted linear, branched, cyclic, polycyclic, heterocyclic, or aromatic $C_1$-$C_{18}$ diyl;
each $R^2$ is independently a hydrogen, a substituted or unsubstituted linear, branched, cyclic, polycyclic, or aromatic $C_1$-$C_{40}$ hydrocarbyl, or a heteroatom-containing group; and
each $R^3$, $R^4$, $R^5$, $R^6$, $R^7$, $R^8$, $R^9$, and $R^{10}$ is independently a hydrogen, a halogen, a substituted or unsubstituted linear, branched, cyclic, polycyclic, or aromatic $C_1$-$C_{40}$ hydrocarbyl, or a heteroatom-containing group; or two or more adjacent $R^3$-$R^{10}$ groups are joined together to form a $C_4$-$C_{62}$ cyclic, polycyclic, heterocyclic, or aromatic group;
$L^1$ is

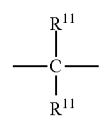

and is not part of an aromatic ring;
$L^2$ is

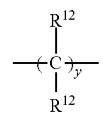

and is not part of an aromatic ring, wherein y is an integer of 2, 3, 4, 5, 6, 7, 8, 9, or 10;
each instance of $R^{11}$ is independently a hydrogen, a halogen, a substituted or unsubstituted $C_1$-$C_{40}$ hydrocarbyl, or a heteroatom-containing group; or two or more adjacent $R^{11}$ groups are joined together to form a $C_4$-$C_{62}$ cyclic, polycyclic, or heterocyclic group that is not aromatic; and
each instance of $R^{12}$ is independently a hydrogen, a halogen, a substituted or unsubstituted $C_1$-$C_{40}$ hydrocarbyl, or a heteroatom-containing group; or two or more adjacent $R^{12}$ groups are joined together to form a $C_4$-$C_{62}$ cyclic, polycyclic, or heterocyclic group that is not aromatic.

2. A catalyst compound represented by Formula (II):

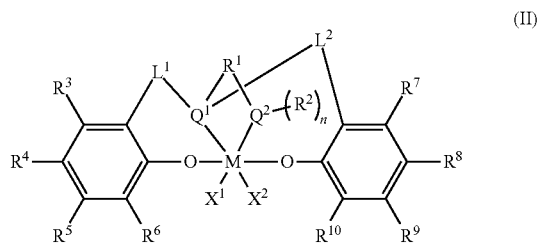

(II)

wherein:

M is a Group 4 transition metal;

each $X^1$ and $X^2$ is independently a substituted or unsubstituted linear, branched, cyclic, polycyclic, or aromatic hydrocarbyl; or $X^1$ and $X^2$ are joined together to form a $C_4$-$C_{62}$ cyclic, polycyclic, heterocyclic, or aromatic group;

$Q^1$ is a Group 15 atom;

$Q^2$ is a Group 15 atom or a Group 16 atom, wherein n is 0 if $Q^2$ is a Group 16 atom or n is 1 if $Q^2$ is a Group 15 atom;

$R^1$ is a substituted or unsubstituted linear, branched, cyclic, polycyclic, heterocyclic, or aromatic $C_1$-$C_{18}$ diyl;

each $R^2$ is independently a hydrogen, a substituted or unsubstituted linear, branched, cyclic, polycyclic, or aromatic $C_1$-$C_{40}$ hydrocarbyl, or a heteroatom-containing group; and each $R^3$, $R^4$, $R^5$, $R^6$, $R^7$, $R^8$, $R^9$, and $R^{10}$ is independently a hydrogen, a halogen, a substituted or unsubstituted linear, branched, cyclic, polycyclic, or aromatic $C_1$-$C_{40}$ hydrocarbyl, or a heteroatom-containing group; or two or more adjacent $R^3$-$R^{10}$ groups are joined together to form a $C_4$-$C_{62}$ cyclic, polycyclic, heterocyclic, or aromatic group;

$L^1$ is

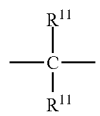

and is not part of an aromatic ring;

$L^2$ is

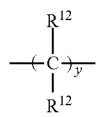

and is not part of an aromatic ring, wherein y is an integer of 2, 3, 4, 5, 6, 7, 8, 9, or 10;

each instance of $R^{11}$ is independently a hydrogen, a halogen, a substituted or unsubstituted $C_1$-$C_{40}$ hydrocarbyl, or a heteroatom-containing group; or two or more adjacent $R^{11}$ groups are joined together to form a $C_4$-$C_{62}$ cyclic, polycyclic, or heterocyclic group that is not aromatic; and each instance of $R^{12}$ is independently a hydrogen, a halogen, a substituted or unsubstituted $C_1$-$C_{40}$ hydrocarbyl, or a heteroatom-containing group; or two or more adjacent $R^{12}$ groups are joined together to form a $C_4$-$C_{62}$ cyclic, polycyclic, or heterocyclic group that is not aromatic.

3. The catalyst compound of paragraph 2, wherein M is Hf or Zr.

4. The catalyst compound of paragraphs 2 or 3, wherein each $X^1$ and $X^2$ is independently a substituted or unsubstituted $C_1$-$C_{20}$ hydrocarbyl.

5. The catalyst compound of any of paragraphs 2 to 4, wherein each $X^1$ and $X^2$ is independently a substituted or unsubstituted $C_1$-$C_8$ alkyl, phenyl, benzyl, naphthyl, or cyclohexyl.

6. The catalyst compound of any of paragraphs 2 to 5, wherein each $X^1$ and $X^2$ is benzyl.

7. The catalyst compound or ligand of any of paragraphs 1 to 6, wherein $R^1$ is a substituted or unsubstituted $C_1$-$C_{10}$ diyl.

8. The catalyst compound or ligand of any of paragraphs 1 to 6, wherein $R^1$ is selected from methanediyl, ethanediyl, propanediyl, butanediyl, pentanediyl, hexanediyl, heptanediyl, octanediyl, nonanediyl, decanediyl, undecanediyl, dodecanediyl, isomers thereof, halide substitutes thereof, or other substitutes thereof.

9. The catalyst compound or ligand of paragraph 8, wherein $R^1$ is selected from unsubstituted methanediyl, ethanediyl, propanediyl, butanediyl, or pentanediyl.

10. The catalyst compound or ligand of any of paragraphs 1 to 9, wherein $L^1$ is a substituted or unsubstituted methanediyl and $L^2$ is a substituted or unsubstituted ethanediyl, preferably, $L^1$ is an unsubstituted methanediyl and $L^2$ is an unsubstituted ethanediyl.

11. The catalyst compound or ligand of any of paragraphs 1 to 10, wherein $Q^2$ is N, n is 2, and each $R^2$ is independently hydrogen or unsubstituted $C_1$-$C_{10}$ hydrocarbyl.

12. The catalyst compound or ligand of paragraph 11, wherein each $R^2$ is independently methyl or ethyl.

13. The catalyst compound or ligand of any of paragraphs 1 to 12, wherein each $R^3$, $R^4$, $R^5$, $R^6$, $R^7$, $R^8$, $R^9$, and $R^{10}$ is independently hydrogen, halogen, methyl, ethyl, ethenyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclohexyl, cyclooctyl, phenyl, benzyl, naphthyl, phenanthryl, anthracenyl, carbazolyl, fluorenyl, adamantyl, indolyl, indolinyl, imidazolyl, indenyl, indanyl, isomers thereof, halide substitutes thereof, or other substitutes thereof.

14. The catalyst compound or ligand of paragraph 13, wherein each of $R^6$ and $R^{10}$ is independently halogen, phenyl, carbazolyl, fluorenyl, adamantyl, indolyl, indolinyl, imidazolyl, indenyl, indanyl, or substitutes thereof.

15. The catalyst compound of paragraph 14, wherein $R^6$ is carbazolyl or fluorenyl and $R^{10}$ is halogen, phenyl, carbazolyl, or fluorenyl.

16. The catalyst compound or ligand of any of paragraphs 1 to 15, wherein $R^4$ and $R^8$ is independently substituted or unsubstituted linear or branched $C_1$-$C_4$ hydrocarbyl.

17. The catalyst compound or ligand of any of paragraphs 1 to 16, wherein $Q^1$ and $Q^2$ are N.

18. The ligand of paragraph 1, wherein the ligand is selected from any of the ligands represented by the formulas 1 to 16 as described above.

19. The catalyst compound of paragraph 2, wherein the catalyst compound is selected from:
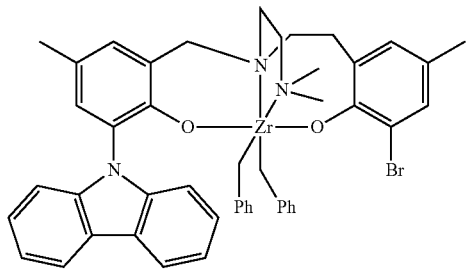
1
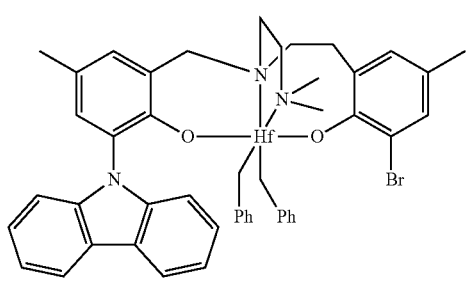
2
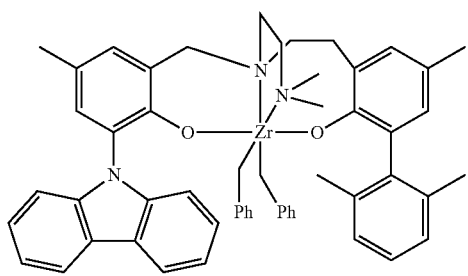
3
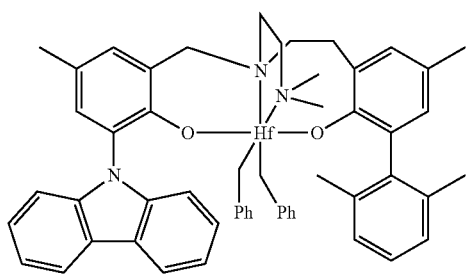
4
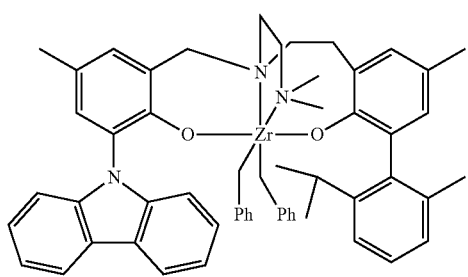
5
-continued
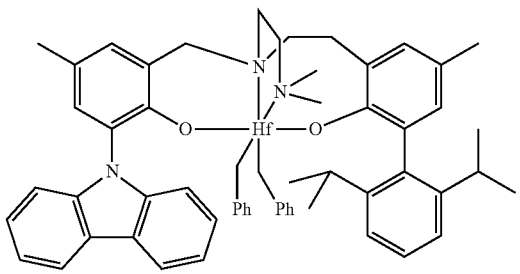
6
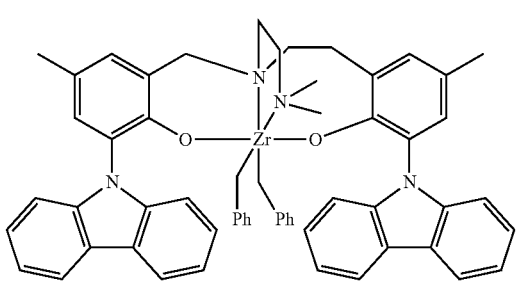
7
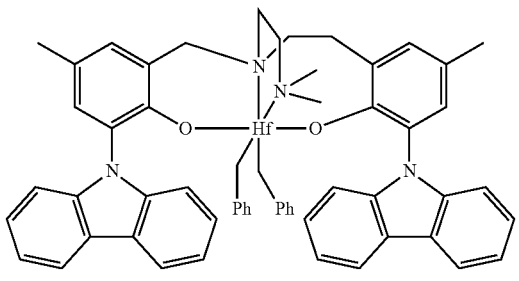
8
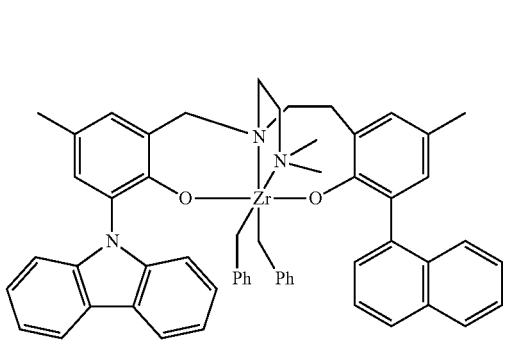
9
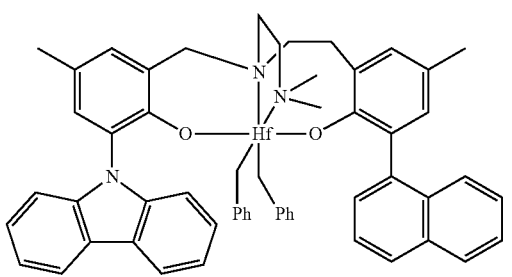
10

11
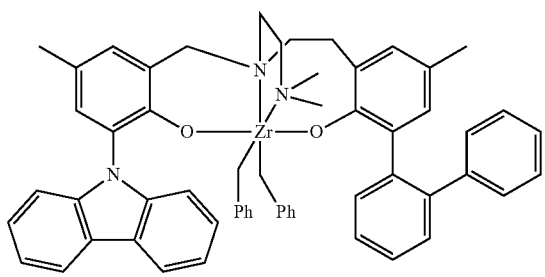
12
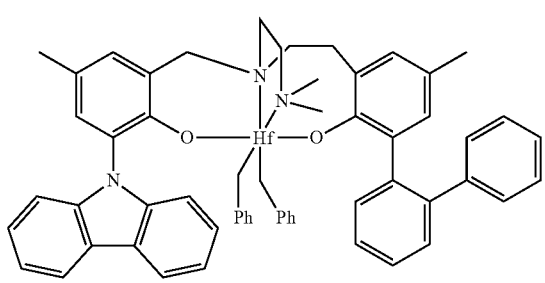
13
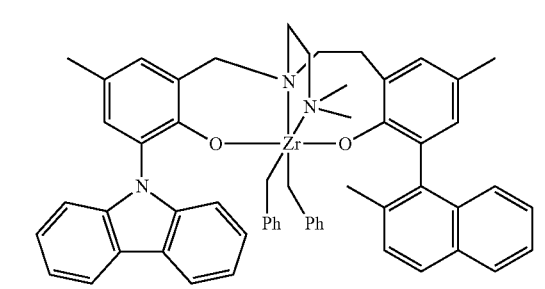
14
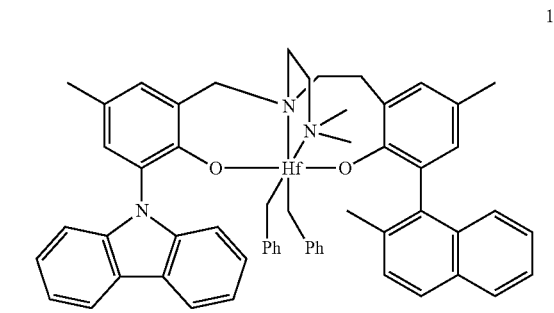
15
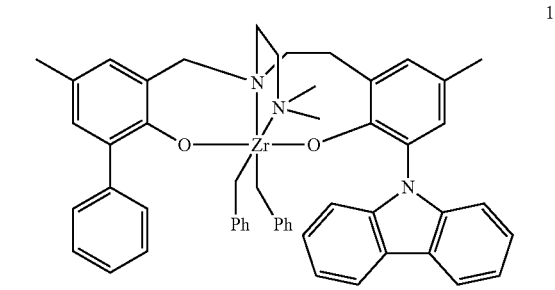
16
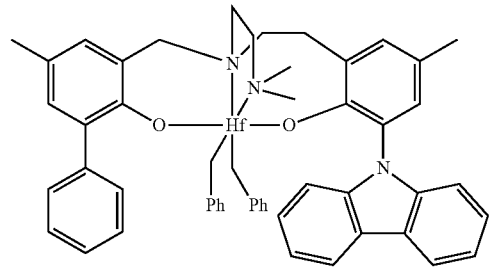
17
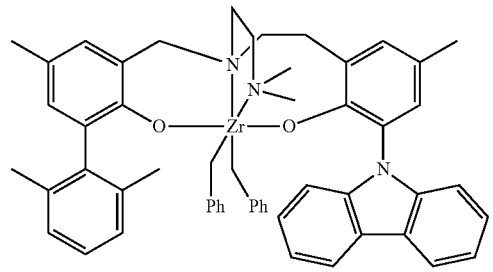
18
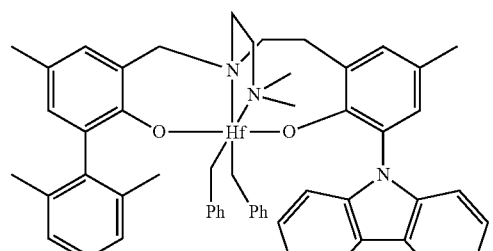
19
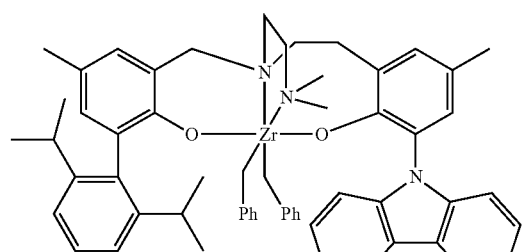
20
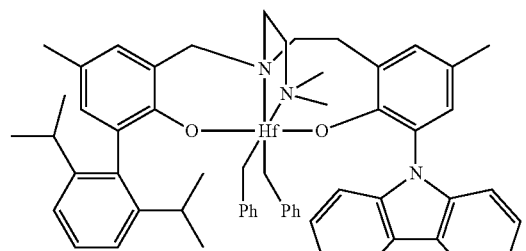

-continued
21
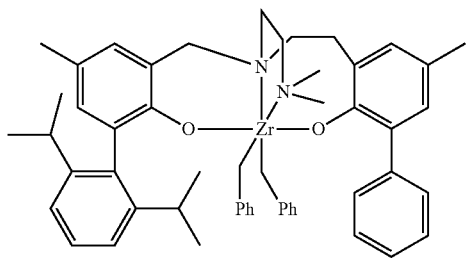
22
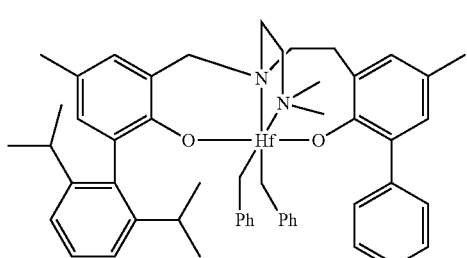
23
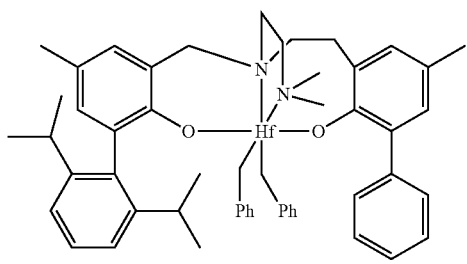
24
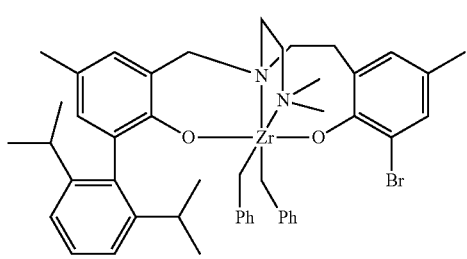
25
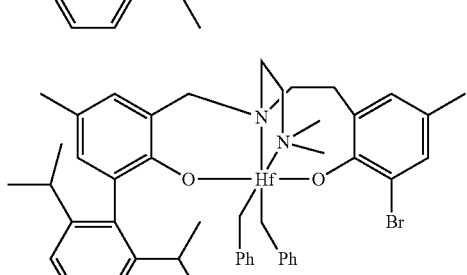
26
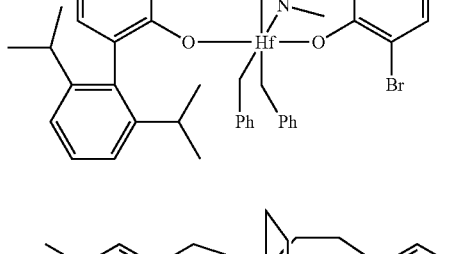
-continued
27
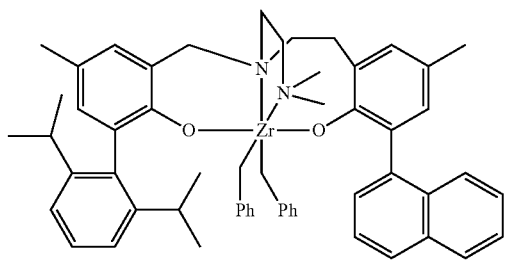
28
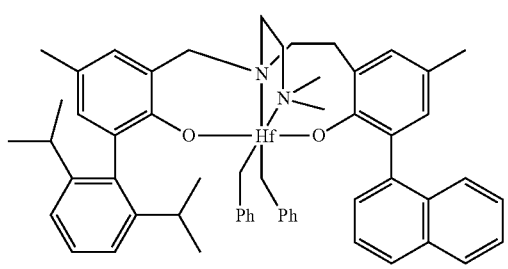
29
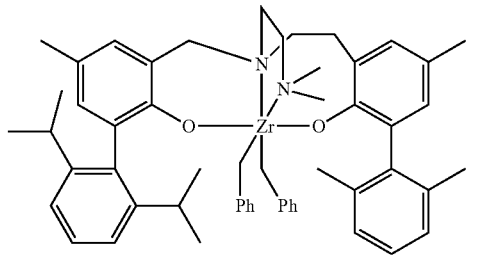
30
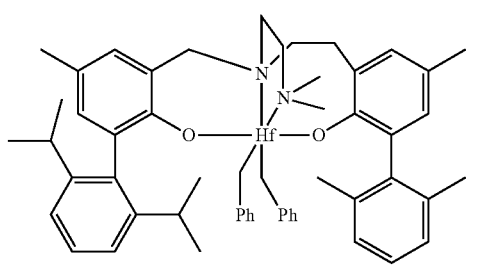
31
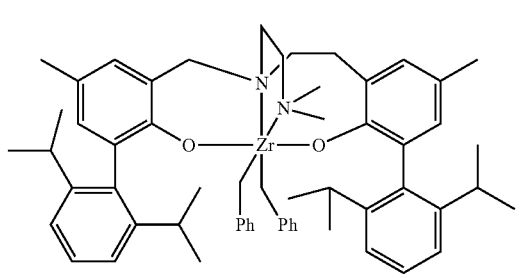

20. The catalyst compound of paragraph 19, wherein the catalyst compound is selected from:

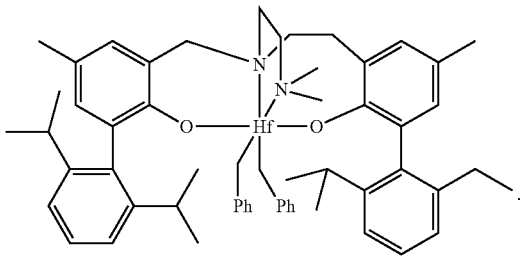

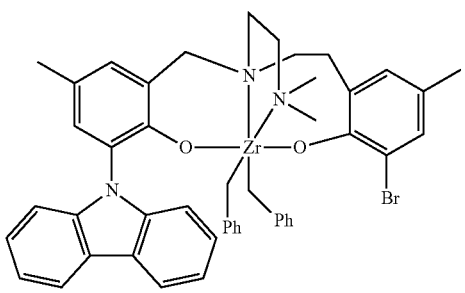

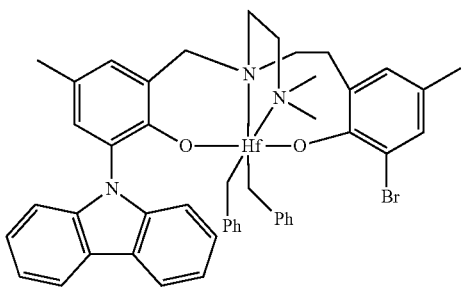

21. A catalyst system comprising an activator and the catalyst compound of any of paragraphs 2-20.
22. The catalyst system of paragraph 21, further comprising a support material.
23. The catalyst system of paragraph 22, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.
24. The catalyst system of any of paragraphs 21-23, wherein the activator comprises an alkylalumoxane.
25. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of paragraphs 21 to 24 in at least one solution polymerization reactor at a reactor pressure of from 2 MPa to 200 MPa and a reactor temperature of from 10° C. to 250° C. to form an ethylene alpha-olefin copolymer.
26. The process of paragraph 25, wherein the catalyst has an activity of 100,000 g/mmol/hr or greater.
27. The process of paragraphs 25 or 26, wherein the ethylene alpha-olefin copolymer has an Mw value of from 250,000 to 700,000 g/mol.
28. The process of any of paragraphs 25 to 27, wherein the ethylene alpha-olefin copolymer has an Mw/Mn value of 5 or less.
29. The process of paragraph 28, wherein the ethylene alpha-olefin copolymer has an Mw/Mn value of from 1 to 2.
30. The process of any of paragraphs 25 to 29, wherein the ethylene alpha-olefin copolymer has a comonomer content of 12 wt % or greater.
31. The process of paragraph 32, wherein the ethylene alpha-olefin copolymer has a comonomer content of 15 wt % or greater.
32. The process of paragraph 31, wherein the ethylene alpha-olefin copolymer has a comonomer content of 17 wt % or greater.
33. An ethylene alpha-olefin copolymer comprising: ethylene; and at least one $C_3$-$C_{20}$ alpha-olefin, wherein the copolymer has an Mw value of from 250,000 to 700,000 g/mol, an Mw/Mn value of 5 or less, and a comonomer content of 12 wt % or greater.
34. The copolymer of paragraph 33, wherein the alpha-olefin is octene.
35. The copolymer of paragraphs 33 or 34, wherein the copolymer has an Mw/Mn value of from 1 to 2.
36. The copolymer of any of paragraphs 33 to 35, wherein the copolymer has a comonomer content of 15 wt % or greater.
37. The copolymer of any of paragraphs 33 to 36, wherein the copolymer has a comonomer content of 17 wt % or greater.

This invention further relates to:

1A. A catalyst compound represented by Formula (II):

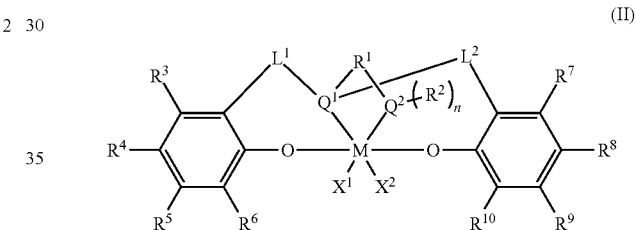

wherein:
M is a Group 4 transition metal, preferably Hf or Zr;
each $X^1$ and $X^2$ is independently a substituted or unsubstituted linear, branched, cyclic, polycyclic, or aromatic hydrocarbyl; or $X^1$ and $X^2$ are joined together to form a $C_4$-$C_{62}$ cyclic, polycyclic, heterocyclic, or aromatic group;
$Q^1$ is a Group 15 atom;
$Q^2$ is a Group 15 atom or a Group 16 atom, wherein n is 0 if $Q^2$ is a Group 16 atom or n is 1 if $Q^2$ is a Group 15 atom;
$R^1$ is a substituted or unsubstituted linear, branched, cyclic, polycyclic, heterocyclic, or aromatic $C_1$-$C_{18}$ diyl;
each $R^2$ is independently a hydrogen, a substituted or unsubstituted linear, branched, cyclic, polycyclic, or aromatic hydrocarbyl, or a heteroatom-containing group; and
each $R^3$, $R^4$, $R^5$, $R^6$, $R^7$, $R^8$, $R^9$, and $R^{10}$ is independently a hydrogen, a halogen, a substituted or unsubstituted linear, branched, cyclic, polycyclic, or aromatic hydrocarbyl, or a heteroatom-containing group; or two or more adjacent $R^3$-$R^{10}$ groups are joined together to form a $C_4$-$C_{62}$ cyclic, polycyclic, heterocyclic, or aromatic group;
$L^1$ is

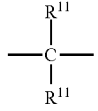

and is not part of an aromatic ring;
L$^2$ is

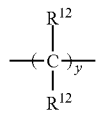

and is not part of an aromatic ring, wherein y is an integer of 2, 3, 4, 5, 6, 7, 8, 9, or 10;

each instance of R$^{11}$ is independently a hydrogen, a halogen, a substituted or unsubstituted C$_1$-C$_{40}$ hydrocarbyl, or a heteroatom-containing group; or two or more adjacent R$^{11}$ groups are joined together to form a C$_4$-C$_{62}$ cyclic, polycyclic, or heterocyclic group that is not aromatic; and each instance of R$^{12}$ is independently a hydrogen, a halogen, a substituted or unsubstituted C$_1$-C$_{40}$ hydrocarbyl, or a heteroatom-containing group; or two or more adjacent R$^{12}$ groups are joined together to form a C$_4$-C$_{62}$ cyclic, polycyclic, or heterocyclic group that is not aromatic.

2A. The catalyst compound of paragraph 1A, wherein each X$^1$ and X$^2$ is independently a substituted or unsubstituted C$_1$-C$_8$ alkyl, phenyl, benzyl, naphthyl, or cyclohexyl.

3A. The catalyst compound of paragraph 1A, wherein R$^1$ is a substituted or unsubstituted C$_1$-C$_{10}$ diyl, preferably R$^1$ is selected from methanediyl, ethanediyl, propanediyl, butanediyl, pentanediyl, hexanediyl, heptanediyl, octanediyl, nonanediyl, decanediyl, undecanediyl, dodecanediyl, isomers thereof, halide substitutes thereof, or other substitutes thereof, preferably R$^1$ is selected from unsubstituted methanediyl, ethanediyl, propanediyl, butanediyl, or pentanediyl.

4A. The catalyst paragraph 1A, wherein L$^1$ is an unsubstituted methanediyl and L$^2$ is an unsubstituted ethanediyl.

5A. The catalyst compound of paragraph 1A, wherein Q$^2$ is N, n is 2, and each R$^2$ is independently hydrogen or unsubstituted C$_1$-C$_{10}$ hydrocarbyl, preferably each R$^2$ is independently methyl or ethyl.

6A. The catalyst compound of paragraph 1A, wherein each R$^3$, R$^4$, R$^5$, R$^6$, R$^7$, R$^8$, R$^9$, and R$^{10}$ is independently hydrogen, halogen, methyl, ethyl, ethenyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclohexyl, cyclooctyl, phenyl, benzyl, naphthyl, phenanthryl, anthracenyl, carbazolyl, fluorenyl, adamantyl, indolyl, indolinyl, imidazolyl, indenyl, indanyl, isomers thereof, halide substitutes thereof, or other substitutes thereof, preferably each of R$^6$ and R$^{10}$ is independently halogen, phenyl, carbazolyl, fluorenyl, adamantyl, indolyl, indolinyl, imidazolyl, indenyl, indanyl, or substitutes thereof.

7A. The catalyst compound of paragraph 1A, wherein R$^4$ and R$^8$ is independently substituted or unsubstituted linear or branched C$_1$-C$_4$ hydrocarbyl.

8A. The catalyst compound of paragraph 1A, wherein Q$^1$ and Q$^2$ are N.

9A. The catalyst compound of paragraph 1A, wherein M is Hf or Zr; X$^1$ and X$^2$ is independently a substituted or unsubstituted C$_1$-C$_8$ alkyl, phenyl, benzyl, naphthyl, or cyclohexyl, and R$^1$ is a substituted or unsubstituted diyl.

10A. The catalyst compound of paragraph 1A, wherein M is Hf or Zr; X$^1$ and X$^2$ is independently a substituted or unsubstituted C$_1$-C$_8$ alkyl, phenyl, benzyl, naphthyl, or cyclohexyl, and R$^1$ is selected from methanediyl, ethanediyl, propanediyl, butanediyl, pentanediyl, hexanediyl, heptanediyl, octanediyl, nonanediyl, decanediyl, undecanediyl, dodecanediyl, isomers thereof, halide substitutes thereof, or other substitutes thereof.

11A. The catalyst compound of paragraph 1A, wherein R$^1$ is selected from unsubstituted methanediyl, ethanediyl, propanediyl, butanediyl, or pentanediyl, and L$^1$ is an unsubstituted methanediyl and L$^2$ is an unsubstituted ethanediyl.

12A. The catalyst compound of paragraph 1A, wherein M is Hf or Zr; X$^1$ and X$^2$ is independently a substituted or unsubstituted C$_1$-C$_8$ alkyl, phenyl, benzyl, naphthyl, or cyclohexyl; R$^1$ is selected from methanediyl, ethanediyl, propanediyl, butanediyl, pentanediyl, hexanediyl, heptanediyl, octanediyl, nonanediyl, decanediyl, undecanediyl, dodecanediyl, isomers thereof, halide substitutes thereof, or other substitutes thereof; each R$^2$ is independently hydrogen or unsubstituted hydrocarbyl; R$^6$ is carbazolyl or fluorenyl; R$^{10}$ is halogen, phenyl, carbazolyl, or fluorenyl; R$^4$ and R$^8$ is independently substituted or unsubstituted linear or branched C$_1$-C$_4$ hydrocarbyl; and Q$^1$ and Q$^2$ are N.

13A. The catalyst compound of paragraph 1A, wherein the catalyst compound is selected from catalyst compounds 1 to 32, preferably catalyst compounds 1 and 2 as described above.

14A. A catalyst system comprising an activator, the catalyst compound of any of paragraphs 1A to 13A, and an optional support material.

15A. The catalyst system of paragraph 14A, wherein the activator comprises an alkylalumoxane or an non-coordinating anion.

16A. A process for the production of an ethylene alpha-olefin copolymer comprising: polymerizing ethylene and at least one C$_3$-C$_{20}$ alpha-olefin by contacting the ethylene and the at least one C$_3$-C$_{20}$ alpha-olefin with a catalyst system of paragraphs 14A or 15A in at least one solution polymerization reactor at a reactor pressure of from 2 MPa to 200 MPa and a reactor temperature of from 10° C. to 250° C. to form an ethylene alpha-olefin copolymer, wherein the catalyst preferably has an activity of 100,000 g/mmol/hr or greater.

17A. The process of paragraph 16A, wherein the ethylene alpha-olefin copolymer has an Mw value of from 250,000 to 700,000 g/mol and/or an Mw/Mn value of 5 or less, preferably from 1 to 2.

18A. The process of paragraph 16A or 17A, wherein the ethylene alpha-olefin copolymer has a comonomer content of 12 wt % or greater, preferably of 15 wt % or greater, preferably of 17 wt % or greater.

19A. An ethylene alpha-olefin copolymer comprising: ethylene and at least one C$_3$-C$_{20}$ alpha-olefin (preferably octene), wherein the copolymer has an Mw value of from 250,000 to 700,000 g/mol, an Mw/Mn value of 5 or less (preferably 1 to 2), and a comonomer content of 12 wt % or greater, preferably of 15 wt % or greater, preferably of 17 wt % or greater.

20A. A ligand represented by Formula (I):

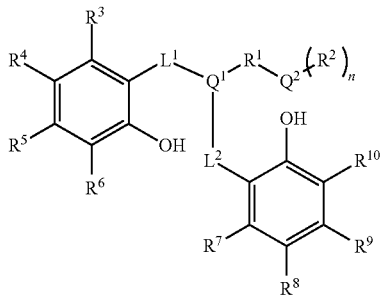

(I)

wherein: $Q^1$ is a Group 15 atom; $Q^2$ is a Group 15 atom or a Group 16 atom, wherein n is 0 if $Q^2$ is a Group 16 atom or n is 1 if $Q^2$ is a Group 15 atom; $R^1$ is a substituted or unsubstituted linear, branched, cyclic, polycyclic, heterocyclic, or aromatic $C_1$-$C_{18}$ diyl; each $R^2$ is independently a hydrogen, a substituted or unsubstituted linear, branched, cyclic, polycyclic, or aromatic hydrocarbyl, or a heteroatom-containing group; and each $R^3$, $R^4$, $R^5$, $R^6$, $R^7$, $R^8$, $R^9$, and $R^{10}$ is independently a hydrogen, a halogen, a substituted or unsubstituted linear, branched, cyclic, polycyclic, or aromatic $C_1$-$C_{40}$ hydrocarbyl, or a heteroatom-containing group; or two or more adjacent $R^3$-$R^{10}$ groups are joined together to form a $C_4$-$C_{62}$ cyclic, polycyclic, heterocyclic, or aromatic group;

$L^1$ is

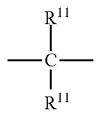

and is not part of an aromatic ring;

$L^2$ is

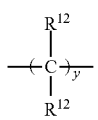

and is not part of an aromatic ring, wherein y is an integer of 2, 3, 4, 5, 6, 7, 8, 9, or 10;

each instance of $R^{11}$ is independently a hydrogen, a halogen, a substituted or unsubstituted hydrocarbyl, or a heteroatom-containing group; or two or more adjacent $R^{11}$ groups are joined together to form a $C_4$-$C_{62}$ cyclic, polycyclic, or heterocyclic group that is not aromatic; and each instance of $R^{12}$ is independently a hydrogen, a halogen, a substituted or unsubstituted hydrocarbyl, or a heteroatom-containing group; or two or more adjacent $R^{12}$ groups are joined together to form a $C_4$-$C_{62}$ cyclic, polycyclic, or heterocyclic group that is not aromatic.

21A. The ligand of paragraph 20A, wherein $R^1$ is a substituted or unsubstituted $C_1$-$C_{10}$ diyl; wherein $L^1$ is an unsubstituted methanediyl and $L^2$ is an unsubstituted ethanediyl; wherein $Q^2$ is N, n is 2; each $R^2$ is independently hydrogen or unsubstituted $C_1$-$C_{10}$ hydrocarbyl; each $R^3$, $R^4$, $R^5$, $R^6$, $R^7$, $R^8$, $R^9$, and $R^{10}$ is independently hydrogen, halogen, methyl, ethyl, ethenyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclohexyl, cyclooctyl, phenyl, benzyl, naphthyl, phenanthryl, anthracenyl, carbazolyl, fluorenyl, adamantyl, indolyl, indolinyl, imidazolyl, indenyl, indanyl, isomers thereof, halide substitutes thereof, or other substitutes thereof.

22A. The ligand of paragraph 20A, wherein $R^1$ is selected from unsubstituted methanediyl, ethanediyl, propanediyl, butanediyl, or pentanediyl; $L^1$ is an unsubstituted methanediyl and $L^2$ is an unsubstituted ethanediyl; $Q^2$ is N, n is 2, each $R^2$ is independently methyl or ethyl; each of $R^6$ and $R^{10}$ is independently halogen, phenyl, carbazolyl, fluorenyl, adamantyl, indolyl, indolinyl, imidazolyl, indenyl, indanyl, or substitutes thereof.

23A. The ligand of paragraph 20A, wherein $R^6$ is carbazolyl or fluorenyl and $R^{10}$ is halogen, phenyl, carbazolyl, or fluorenyl; $R^4$ and $R^8$ is independently substituted or unsubstituted linear or branched $C_1$-$C_4$ hydrocarbyl; and $Q^1$ and $Q^2$ are N.

EXPERIMENTAL

All air sensitive syntheses are carried out in nitrogen or argon purged dry boxes. All solvents are available from commercial sources. Paraformaldehyde, 2-carbazolyl-4-methylphenol, N,N-dimethylformamide (DMF), triethylamine, N,N-dimethylethylenediamine, sodium cyanoborohydride, acetic acid, 2-bromo-4-methylphenol, allyl bromide, potassium carbonate, methoxymethyl chloride (MOM-Cl), ozone, toluene, tetrabenzyl hafnium, tetrabenzyl zirconium, and other precursors, reagents, and solvents are available from commercial sources.

$^1$H NMR for Ligand and Catalyst Characterization:

Chemical structures are determined by $^1$H NMR. $^1$H NMR data are collected at room temperature (e.g., 23° C.) in a 5 mm probe using either a 400 or 500 MHz Bruker spectrometer with deuterated methylene chloride or deuterated benzene.

Examples
Synthesis of Catalysts (and catalyst precursor compounds)
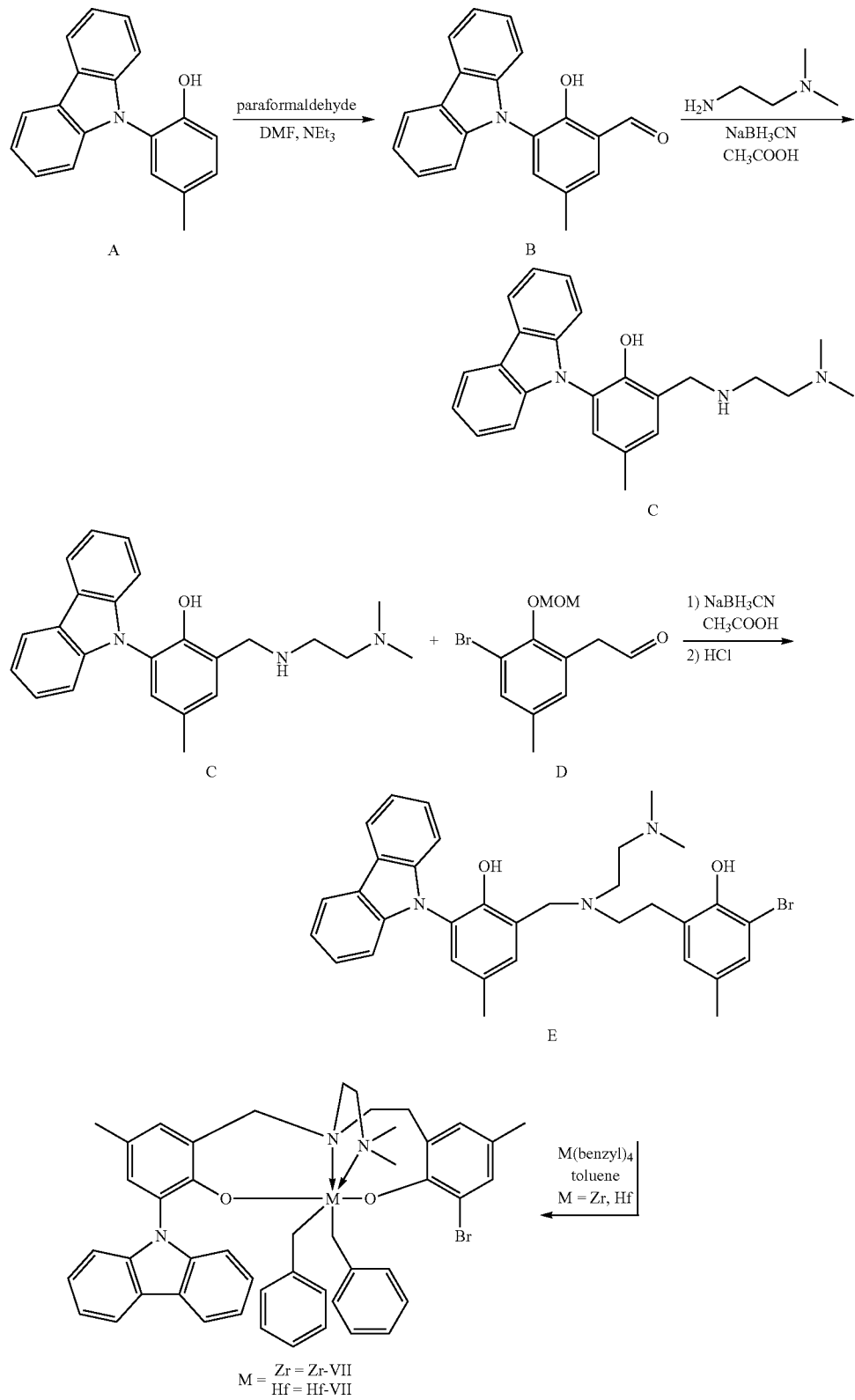
M = Zr = Zr-VII
     Hf = Hf-VII

3-(9H-carbazol-9-yl)-2-hydroxy-5-methylbenzaldehyde (B)

2-(carbazolyl)-4-methylphenol (9.65 mmol), magnesium dichloride (2.5 equiv.), trimethylamine (3.0 equiv.), and paraformaldehyde (6 equiv.) were slurried in 150 mL of acetonitrile. The slurry was stirred at RT for 2 hours during which the slurry changed to bright yellow in color. The reaction flask was then cooled to −35° C. and DMF (5 equiv.) was slowly added. The reaction was allowed to warm to RT and stir overnight. It was poured into 250 mL of 1M HCl and extracted with ethyl acetate. The organic layer was washed with brine, collected, dried with $MgSO_4$, and filtered. Solvent was removed. The residue was purified on a silica Biotage SNAP Ultra column with a gradient of 0-20% ethyl acetate/hexane.

2-(9H-carbazol-9-yl)-6-(((2-(dimethylamino)ethyl)amino)methyl)-4-methylphenol (C)

A 100 mL round-bottom flask was charged with the above aldehyde (B) (2.0 equiv.), N1,N1-dimethylethane-1,2-diamine (5.0 equiv.), and 40 mL of methanol. To the stirred mixture was added sodium cyanoborohydride and acetic acid at room temperature. After stirring overnight, volatiles were removed and the residue redissolved in 50 mL of dichloromethane. The mixture was washed with water (2×50 mL), and the organic portion dried with $MgSO_4$, and filtered to remove salts. The solvent was reduced and the remainder placed onto a Biotage samplet cartridge. A solvent gradient of 5-20% ethyl acetate in hexane was used to purify compound C.

2-(2-((3-(9H-carbazol-9-yl)-2-hydroxy-5-methylbenzyl)(2-(dimethylamino)ethyl) amino)ethyl)-6-bromo-4-methylphenol (E)

The amine C (1 equiv.) and 2-(3-bromo-2-(methoxymethoxy)-5-methylphenyl)acetaldehyde (1 equiv.) were dissolve in methanol in a 100 mL round-bottom flask. Sodium cyanoborohydride and acetic acid were added the mixture stirred at room temperature overnight. Volatiles were removed and the residue redissolved in 50 mL of dichloromethane. The mixture was washed with water (2×50 mL), and the organic portion dried with $MgSO_4$, and filtered to remove salts. The solvent was reduced and the remainder placed onto a Biotage samplet cartridge. A solvent gradient of 5-20% ethyl acetate in hexane was used to purify the protected ligand. In a 50 mL round-bottom flask, the compound was dissolved in 20 mL of tetrahydrofuran. Hydrochloric acid (10 equiv.) in THF was added and the reaction stirred overnight. Solid sodium bicarbonate was added to basify the solution, which was then extracted with ethyl acetate (30 mL). The organic portion was washed with water (2×30 mL), dried with $MgSO_4$, filtered, and the solvent removed. The residue was purified using a Biotage Ultra silica column with a solvent gradient of 5-40% ethyl acetate in hexane.

Metallation: In a nitrogen atmosphere, the ligand E was dissolved in 4 mL of toluene in a 20 mL vial. Tetrabenzyl zirconium or hafnium was dissolved in 4 mL of toluene in a separate vial. The solutions were combined and after 1 hour, filtered through a 0.2 μm syringe filter, the toluene was removed, and the residue slurried in pentane. The solids were collected and dried under vacuum. (M=Zr or Hf).

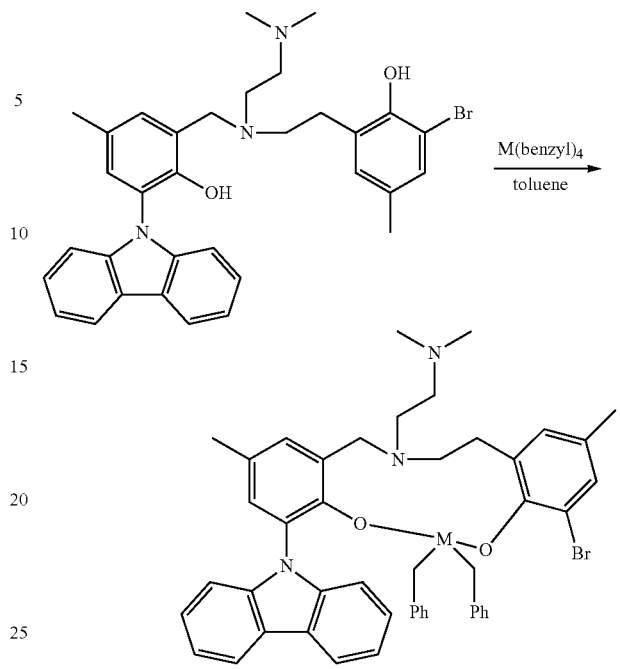

Polymerization Examples

General polymerization procedures for parallel pressure reactor. Solvents, polymerization-grade toluene, and isohexane were supplied by ExxonMobil Chemical Company and purified by passing through a series of columns: two 500 cc Oxyclear cylinders in series from Labclear (Oakland, Calif.), followed by two 500 cc columns in series packed with dried 3 Å mole sieves (8-12 mesh; Aldrich Chemical Company), and two 500 cc columns in series packed with dried 5 Å mole sieves (8-12 mesh; Aldrich Chemical Company).

1-octene ($C_8$) (98%, Aldrich Chemical Company) was dried by stirring over NaK overnight followed by filtration through basic alumina (Aldrich Chemical Company, Brockman Basic 1).

Polymerization-grade ethylene ($C_2$) was used and further purified by passing the gas through a series of columns: 500 $cm^3$ Oxyclear cylinder from Labclear (Oakland, Calif.) followed by a 500 $cm^3$ column packed with dried 3 Å mole sieves (8-12 mesh; Aldrich Chemical Company) and a 500 $cm^3$ column packed with dried 5 Å mole sieves (8-12 mesh; Aldrich Chemical Company).

Solutions of the metal complexes and activators were prepared in a drybox using toluene (ExxonMobil Chemical Company; anhydrous, stored under nitrogen; 98%). Concentrations were 0.2 mmol/L for the metal complexes and N,N-dimethyl anilinium tetrakis-pentafluorophenyl borate (DMAH-PFPB) and 0.5% w/w for methyl alumoxane (MAO).

Slurries of supported catalysts in toluene were prepared in the drybox using 45 mg of the supported catalyst and 15 mL of toluene. The resulting mixture was vortexed for uniform distribution of particles prior to injection.

For polymerization experiments with supported catalysts or DMAH-PFPB as activator, tri-n-octylaluminum (TNOAL, neat, AkzoNobel) was used as a scavenger. Concentration of the TNOAL solution in toluene ranged from 0.5 to 2 mmol/L.

Polymerizations were carried out in a parallel, pressure reactor, as generally described in U.S. Pat. Nos. 6,306,658; 6,455,316; 6,489,168; WO 2000/009255; and Murphy et al. (2003) *J. Am. Chem. Soc.*, v. 125, pp. 4306-4317, each of which is fully incorporated herein by reference. The experiments were conducted in an inert atmosphere (N2) drybox using autoclaves equipped with an external heater for temperature control, glass inserts (internal volume of reactor=23.5 mL for C2 and C2/C8; 22.5 mL for $C_3$ runs), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours.

Catalyst systems dissolved in solution were used in the polymerization examples below, unless specified otherwise. Ethylene-Octene Copolymerization (EO)(see Tables 1 and 2).

A pre-weighed glass vial insert and disposable stirring paddle were fitted to each reaction vessel of the reactor, which contains 48 individual reaction vessels. The reactor was then closed and purged with ethylene. Each vessel was charged with enough solvent (such as isohexane) to bring the total reaction volume, including the subsequent additions, to the desired volume, such as 5 mL. 1-octene, if required, was injected into the reaction vessel and the reactor was heated to the set temperature and pressurized to the predetermined pressure of ethylene, while stirring at 800 rpm. The aluminum and/or zinc compound in toluene was then injected as scavenger and/or chain transfer agent followed by addition of the activator solution (such as 1-1.2 molar equivalents of N,N-dimethyl anilinium tetrakis-pentafluorophenyl borate-DMAH-PFPB).

The catalyst solution (such as 0.020-0.080 µmol of metal complex) was injected into the reaction vessel and the polymerization was allowed to proceed until a pre-determined amount of ethylene (quench value 20 psi) had been used up by the reaction. Alternatively, the reaction may be allowed to proceed for a set amount of time (for example, maximum reaction time 30 minutes). Ethylene was added continuously (through the use of computer controlled solenoid valves) to the autoclaves during polymerization to maintain reactor gauge pressure (+/−2 psig) and the reactor temperature was monitored and maintained within +/−1° C. The reaction was quenched by pressurizing the vessel with compressed air. After the reactor was vented and cooled, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight, by FT-IR (see below) to determine percent octene incorporation, and by DSC (see below) to determine melting point (Tm).

For polymerizations using MAO as activator (such as 100 to 1,000 molar equivalents), the MAO solution was injected into the reaction vessel after the addition of 1-octene and prior to heating the vessel to the set temperature and pressurizing with ethylene. No additional aluminum reagent was used as scavenger during these runs.

Equivalence is determined based on the mole equivalents relative to the moles of the transition metal in the catalyst complex.

For polymerizations using MAO as activator, the MAO solution was injected into the vessel after the addition of isohexane. No additional aluminum reagent was used as scavenger during these runs.

Polymerizations using Catalysts (Tables 1 and 2). For ethylene-octene copolymerization (EO), the reactor was prepared as described above and purged with ethylene. Isohexane, 1-octene (100 µL), and the scavenger solution were added sequentially to the reaction vessel via syringe at room temperature and atmospheric pressure. If the reactor was heated to the process temperature of 80° C., it was then charged with ethylene to the pressure setpoint of 95 psig (95 psig=655 kPa) while stirring at 800 rpm. If the reactor was then heated to the process temperature of 100° C., it was then charged with ethylene to the pressure setpoint of 135 psig (135 psig=931 kPa) while stirring at 800 rpm. The supported catalyst slurry was injected into the vessel and the polymerization was allowed to proceed as described in the previous section. To test for catalyst response to hydrogen, the EO experiments were also carried out using 300 ppm $H_2$/5 ethylene mixed gas.

Polymer Characterization. Polymer sample solutions were prepared by dissolving polymer in 1,2,4-trichlorobenzene (TCB, 99+% purity from Sigma-Aldrich) containing 2,6-di-tertbutyl-4-methylphenol (BHT, 99% from Aldrich) at 165° C. in a shaker oven for approximately 3 hours. The concentration of polymer in solution was between 0.1 mg/mL to 0.9 mg/mL with a BHT concentration of 1.25 mg BHT/mL of TCB.

Gel Permeation Chromatography-Tosoh EcoSEC High Temperature GPC System (GPC-Tosoh EcoSEC)—

Mw, Mn and Mw/Mn were determined by using a High Temperature Gel Permeation Chromatography (Tosoh Bioscience, LLC), equipped with a differential refractive index detector (DRI). Three high temperature TSK gel column (Tosoh GMHHR-H(30)HT2) were used. The nominal flow rate was 1 mL/min, and the nominal injection volume was 300 µL. The various transfer lines, columns, and dual flow differential refractometer (the DRI detector) were contained in an oven maintained at 160° C. Solvent for the experiment was prepared by dissolving 1.2 grams of butylated hydroxytoluene as an antioxidant in 4 liters of Aldrich reagent grade 1, 2, 4 trichlorobenzene (TCB). The TCB mixture was then filtered through a 0.1 µm Teflon filter. The TCB was then degassed with an online degasser before entering the GPC instrument. Polymer solutions were prepared by placing dry polymer in glass vials, adding the desired amount of TCB, then heating the mixture at 160° C. with continuous shaking for about 2 hours. All quantities were measured gravimetrically. The injection concentration was from 0.5 to 2 mg/mL, with lower concentrations being used for higher molecular weight samples. Flow rate in the apparatus was then increased to 1 mL/minute, and the DRI was allowed to stabilize for 2 hours before injecting the first sample. The molecular weight was determined by combining universal calibration relationship with the column calibration which was performed with a series of monodispersed polystyrene (PS) standards. The MW was calculated at each elution volume with the following equation:

$$\log M_X = \frac{\log(K_X/K_{PS})}{a_X + 1} + \frac{a_{PS} + 1}{a_X + 1} \log M_{PS}$$

where the variables with subscript "X" stand for the test sample while those with subscript "PS" stand for PS. In this method, $a_{PS}$=0.67 and $K_{PS}$=0.000175 while $a_X$ and $K_X$ are obtained from published literature. Specifically, a/K=0.695/0.000579 for polyethylene and 0.705/0.0002288 for polypropylene.

The concentration, c, at each point in the chromatogram was calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. Specifically, dn/dc=0.109 for both polyethylene and polypropylene.

The mass recovery was calculated from the ratio of the integrated area of the concentration chromatography over elution volume and the injection mass which was equal to the pre-determined concentration multiplied by injection loop volume.

All molecular weights are reported in g/mol unless otherwise noted.

Differential Scanning calorimetry (DSC) measurements were performed on a TAQ100 instrument to determine the melting point (Tm) of the polymers. Samples were preannealed at 220° C. for 15 minutes and then allowed to cool to room temperature overnight. The samples were then heated to 220° C. at a rate of 100° C./min and then cooled at a rate of 50° C./min. Melting points were collected during the heating period.

The weight percent of ethylene incorporated in polymers was determined by rapid FTIR spectroscopy on a Bruker Equinox 55+IR in reflection mode. Samples were prepared in a thin film format by evaporative deposition techniques. FT-IR methods were calibrated using a set of samples with a range of known wt % ethylene content. For ethylene-1-octene copolymers, the wt % octene in the copolymer was determined via measurement of the methyl deformation band at about 1,375 cm$^{-1}$. The peak height of this band was normalized by the combination and overtone band at ~4321 cm-1, which corrects for path length differences.

For ethylene-octene copolymers, the wt % ethylene is determined via measurement of the methylene rocking band (about 770 cm$^{-1}$ to about 700 cm$^{-1}$). The peak area of this band is normalized by sum of the band areas of the combination and overtone bands in the range of about 4,500 cm$^{-1}$ to about 4000 cm$^{-1}$. For samples with composition outside the calibration range, the wt % ethylene was determined by $^1$H NMR spectroscopy or estimated from the polymer Tm.

$^1$H NMR data were collected at 120° C. in a 5 mm probe using a spectrometer with a $^1$H frequency of 500 MHz. Data was recorded using a maximum pulse width of 45°, 5 seconds between pulses and signal averaging 120 transients. Spectral signals were integrated.

Table 1 provides the reaction conditions for ethylene octene copolymerization (EO) using DMAH-PFPB or MAO.

TABLE 1

| | |
|---|---|
| Catalyst loading | 0.020-0.080 µmol |
| DMAH-PFPB | 1.1 equiv |
| MAO | 500 equiv |
| Temperature | 80° C. or 100° C. |
| Pressure Setpoint | 95 psi or 135 psi |
| 1-octene | 100 µL |
| Solvent | Isohexane |
| Total Volume | 5 mL |
| Aluminum compound (scavenger) | 0.5 µmol tri-n-octyl aluminum (TNOAL) |

Tables 2 and 3 provide catalyst activity and polymer properties for ethylene-octene copolymerization (EO) using DMAH-PFPB or MAO. Experiments 1-20 utilized the catalyst represented by Formula (VII) containing zirconium (Zr-VII catalyst) and Experiments 21-39 utilized the catalyst represented by Formula (VII) containing hafnium (Hf-VII catalyst). Experiments 1-10 and 21-29 included the scavenger TNOAL at a concentration of 0.5 µmol, while the remainder of the experiments did not contain a scavenger. The catalytic activities shown in Experiments 1-20 (Zr-VII catalyst) were in a range from about 25 kg/mmol/hr to 165 kg/mmol/hr. The catalytic activities shown in Experiments 21-39 (Hf-VII catalyst) were in a range from about 104 kg/mmol/hr to 260 kg/mmol/hr. For comparing the overall catalytic activity, the Hf-VII catalyst outperformed the Zr-VII catalyst.

Both the Zr-VII catalyst and the Hf-VII catalyst provide particularly high molecular weight polymers (289 Kg/mol to 657 Kg/mol with Zr-VII; 168 Kg/mol to 342 Kg/mol with Hf-VII) with narrow PDI (1.4 to 2.4) and high comonomer content (12.9 wt % to 19.5 wt %). For example, as shown in Tables 2 and 3, Example 11, the polymer obtained using Zr-VII as the catalyst in presence of MAO at 80° C. and 95 psi has a comonomer content ($C_8$ wt %) of 19.5 wt %.

The results obtained using the novel catalysts provide promising advantages for processability of the polymer itself and the polymer in a composition.

TABLE 2

| Example | Catalyst Formula (VII) Zr, Hf | Catalyst (µmol) | Activator | Scavenger | Scavenger (µmol) | T (° C.) | P Setpoint (psi) | rxn time (s) |
|---|---|---|---|---|---|---|---|---|
| 1 | Zr | 0.02 | DMAH-PFPB | TNOAL | 0.5 | 80 | 95 | 101 |
| 2 | Zr | 0.02 | DMAH-PFPB | TNOAL | 0.5 | 80 | 95 | 94 |
| 3 | Zr | 0.02 | DMAH-PFPB | TNOAL | 0.5 | 80 | 95 | 82 |
| 4 | Zr | 0.02 | DMAH-PFPB | TNOAL | 0.5 | 80 | 95 | 260 |
| 5 | Zr | 0.02 | DMAH-PFPB | TNOAL | 0.5 | 80 | 95 | 112 |
| 6 | Zr | 0.02 | DMAH-PFPB | TNOAL | 0.5 | 100 | 135 | 182 |
| 7 | Zr | 0.02 | DMAH-PFPB | TNOAL | 0.5 | 100 | 135 | 371 |
| 8 | Zr | 0.02 | DMAH-PFPB | TNOAL | 0.5 | 100 | 135 | 120 |
| 9 | Zr | 0.04 | DMAH-PFPB | TNOAL | 0.5 | 100 | 135 | 55 |
| 10 | Zr | 0.04 | DMAH-PFPB | TNOAL | 0.5 | 100 | 135 | 52 |
| 11 | Zr | 0.02 | MAO | | | 80 | 95 | 76 |
| 12 | Zr | 0.02 | MAO | | | 80 | 95 | 83 |
| 13 | Zr | 0.02 | MAO | | | 80 | 95 | 80 |
| 14 | Zr | 0.02 | MAO | | | 80 | 95 | 91 |
| 15 | Zr | 0.02 | MAO | | | 80 | 95 | 87 |

TABLE 2-continued

| Example | Catalyst Formula (VII) Zr, Hf | Catalyst (μmol) | Activator | Scavenger | Scavenger (μmol) | T (° C.) | P Setpoint (psi) | rxn time (s) |
|---|---|---|---|---|---|---|---|---|
| 16 | Zr | 0.02 | MAO | | | 100 | 135 | 93 |
| 17 | Zr | 0.02 | MAO | | | 100 | 135 | 111 |
| 18 | Zr | 0.02 | MAO | | | 100 | 135 | 90 |
| 19 | Zr | 0.02 | MAO | | | 100 | 135 | 100 |
| 20 | Zr | 0.02 | MAO | | | 100 | 135 | 105 |
| 21 | Hf | 0.02 | DMAH-PFPB | TNOAL | 0.5 | 80 | 95 | 92 |
| 22 | Hf | 0.02 | DMAH-PFPB | TNOAL | 0.5 | 80 | 95 | 77 |
| 23 | Hf | 0.02 | DMAH-PFPB | TNOAL | 0.5 | 80 | 95 | 90 |
| 24 | Hf | 0.02 | DMAH-PFPB | TNOAL | 0.5 | 80 | 95 | 72 |
| 25 | Hf | 0.02 | DMAH-PFPB | TNOAL | 0.5 | 80 | 95 | 73 |
| 26 | Hf | 0.08 | DMAH-PFPB | TNOAL | 0.5 | 100 | 135 | 22 |
| 27 | Hf | 0.08 | DMAH-PFPB | TNOAL | 0.5 | 100 | 135 | 21 |
| 28 | Hf | 0.04 | DMAH-PFPB | TNOAL | 0.5 | 100 | 135 | 31 |
| 29 | Hf | 0.04 | DMAH-PFPB | TNOAL | 0.5 | 100 | 135 | 30 |
| 30 | Hf | 0.02 | MAO | | | 80 | 95 | 62 |
| 31 | Hf | 0.02 | MAO | | | 80 | 95 | 57 |
| 32 | Hf | 0.02 | MAO | | | 80 | 95 | 63 |
| 33 | Hf | 0.02 | MAO | | | 80 | 95 | 67 |
| 34 | Hf | 0.02 | MAO | | | 80 | 95 | 62 |
| 35 | Hf | 0.02 | MAO | | | 100 | 135 | 55 |
| 36 | Hf | 0.02 | MAO | | | 100 | 135 | 64 |
| 37 | Hf | 0.02 | MAO | | | 100 | 135 | 58 |
| 38 | Hf | 0.02 | MAO | | | 100 | 135 | 57 |
| 39 | Hf | 0.02 | MAO | | | 100 | 135 | 64 |

TABLE 3

| Example | Catalyst Formula (VII) Zr, Hf | yield (g) | activity (kg/mmol/hr) | Mw (kg/mol) | Mn (kg/mol) | Mw/Mn | wt % C8= | Tm (° C.) |
|---|---|---|---|---|---|---|---|---|
| 1 | Zr | 0.056 | 100 | 366 | 209 | 1.8 | 17.8 | 88.1 |
| 2 | Zr | 0.053 | 101 | 381 | 225 | 1.7 | 17.9 | 88.8 |
| 3 | Zr | 0.055 | 121 | 337 | 206 | 1.6 | 16.7 | 91.4 |
| 4 | Zr | 0.044 | 30 | 445 | 263 | 1.7 | 17.5 | 92.2 |
| 5 | Zr | 0.053 | 85 | 406 | 212 | 1.9 | 17.1 | 86.6 |
| 6 | Zr | 0.051 | 51 | 347 | 181 | 1.9 | 15.8 | 95.3 |
| 7 | Zr | 0.051 | 25 | 328 | 190 | 1.7 | 16.3 | 96.0 |
| 8 | Zr | 0.049 | 74 | 337 | 209 | 1.6 | 15.5 | 96.7 |
| 9 | Zr | 0.067 | 111 | 348 | 202 | 1.7 | 15.2 | 95.1 |
| 10 | Zr | 0.067 | 115 | 316 | 170 | 1.9 | 12.9 | 95.7 |
| 11 | Zr | 0.070 | 165 | 289 | 176 | 1.6 | 19.5 | 86.8 |
| 12 | Zr | 0.072 | 155 | 327 | 190 | 1.7 | 17.2 | 88.1 |
| 13 | Zr | 0.073 | 165 | 369 | 215 | 1.7 | 17.8 | 87.8 |
| 14 | Zr | 0.062 | 122 | 314 | 185 | 1.7 | 17.3 | 87.0 |
| 15 | Zr | 0.059 | 122 | 351 | 195 | 1.8 | 18.3 | 85.3 |
| 16 | Zr | 0.041 | 80 | 577 | 348 | 1.7 | 16.0 | 93.4 |
| 17 | Zr | 0.056 | 91 | 589 | 364 | 1.6 | 16.8 | 89.6 |
| 18 | Zr | 0.055 | 110 | 645 | 393 | 1.6 | 14.1 | 94.1 |
| 19 | Zr | 0.053 | 95 | 657 | 458 | 1.4 | 16.3 | 91.6 |
| 20 | Zr | 0.052 | 89 | 647 | 430 | 1.5 | 15.9 | 90.6 |
| 21 | Hf | 0.053 | 104 | 302 | 180 | 1.7 | 17.7 | 92.0 |
| 22 | Hf | 0.060 | 140 | 258 | 143 | 1.8 | 18.6 | 90.4 |
| 23 | Hf | 0.054 | 108 | 270 | 165 | 1.6 | 16.5 | 94.5 |
| 24 | Hf | 0.064 | 161 | 327 | 185 | 1.8 | 17.8 | 90.3 |
| 25 | Hf | 0.063 | 155 | 334 | 199 | 1.7 | 16.9 | 92.3 |
| 26 | Hf | 0.105 | 212 | 202 | 89 | 2.3 | 14.4 | 101.1 |
| 27 | Hf | 0.095 | 207 | 184 | 76 | 2.4 | 14.6 | 102.1 |
| 28 | Hf | 0.083 | 242 | 236 | 103 | 2.3 | 14.8 | 97.6 |
| 29 | Hf | 0.076 | 230 | 180 | 101 | 1.8 | 17.0 | 98.5 |
| 30 | Hf | 0.089 | 260 | 169 | 83 | 2.0 | 17.2 | 91.055 |
| 31 | Hf | 0.078 | 247 | 186 | 104 | 1.8 | 18.9 | 87.91 |
| 32 | Hf | 0.079 | 226 | 191 | 109 | 1.8 | 18.4 | 89.091 |
| 33 | Hf | 0.068 | 183 | 168 | 92 | 1.8 | 19.5 | 86.9 |
| 34 | Hf | 0.071 | 205 | 230 | 134 | 1.7 | 18.8 | 86.3 |
| 35 | Hf | 0.067 | 218 | 268 | 167 | 1.6 | 16.7 | 93.6 |
| 36 | Hf | 0.065 | 184 | 288 | 176 | 1.6 | 15.9 | 94.2 |
| 37 | Hf | 0.064 | 199 | 280 | 147 | 1.9 | 16.7 | 93.1 |
| 38 | Hf | 0.061 | 191 | 302 | 182 | 1.7 | 17.1 | 91.5 |
| 39 | Hf | 0.060 | 168 | 342 | 194 | 1.8 | 16.7 | 95.7 |

Overall, the present disclosure provides catalyst compounds including a nonsymmetric bridged amine bis(phenolate), catalyst systems including such, and uses thereof. Catalyst compounds, catalyst systems, and processes of the present disclosure can provide high comonomer content and high molecular weight polymers having narrow PDI values, contributing to good processability for the polymer itself and for the polymer used in a composition.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A catalyst compound represented by Formula (II):

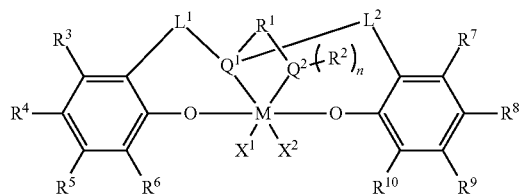

(II)

wherein:
M is a Group 4 transition metal;
each $X^1$ and $X^2$ is independently a substituted or unsubstituted linear, branched, cyclic, polycyclic, or aromatic hydrocarbyl; or $X^1$ and $X^2$ are joined together to form a $C_4$-$C_{62}$ cyclic, polycyclic, heterocyclic, or aromatic group;
$Q^1$ is a Group 15 atom;
$Q^2$ is a Group 15 atom or a Group 16 atom, wherein n is 0 when $Q^2$ is a Group 16 atom or n is 1 when $Q^2$ is a Group 15 atom;
$R^1$ is a substituted or unsubstituted linear, branched, cyclic, polycyclic, heterocyclic, or aromatic $C_1$-$C_{18}$ diyl;
each $R^2$ is independently a hydrogen, a substituted or unsubstituted linear, branched, cyclic, polycyclic, or aromatic $C_1$-$C_{40}$ hydrocarbyl, or a heteroatom-containing group; and
each $R^3$, $R^4$, $R^5$, $R^6$, $R^7$, $R^8$, $R^9$, and $R^{10}$ is independently a hydrogen, a halogen, a substituted or unsubstituted linear, branched, cyclic, polycyclic, or aromatic $C_1$-$C_{40}$ hydrocarbyl, or a heteroatom-containing group; or two or more adjacent $R^3$-$R^{10}$ groups are joined together to form a $C_4$-$C_{62}$ cyclic, polycyclic, heterocyclic, or aromatic group;
$L^1$ is

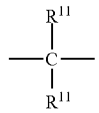

and is not part of an aromatic ring;
$L^2$ is

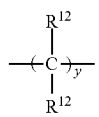

and is not part of an aromatic ring, wherein y is an integer of 2, 3, 4, 5, 6, 7, 8, 9, or 10;
each instance of $R^{11}$ is independently a hydrogen, a halogen, a substituted or unsubstituted $C_1$-$C_{40}$ hydrocarbyl, or a heteroatom-containing group; or two or more adjacent $R^{11}$ groups are joined together to form a $C_4$-$C_{62}$ cyclic, polycyclic, or heterocyclic group that is not aromatic; and
each instance of $R^{12}$ is independently a hydrogen, a halogen, a substituted or unsubstituted $C_1$-$C_{40}$ hydrocarbyl, or a heteroatom-containing group; or two or more adjacent $R^{12}$ groups are joined together to form a $C_4$-$C_{62}$ cyclic, polycyclic, or heterocyclic group that is not aromatic.

2. The catalyst compound of claim 1, wherein M is Hf or Zr.

3. The catalyst compound of claim 1, wherein each $X^1$ and $X^2$ is independently a substituted or unsubstituted $C_1$-$C_8$ alkyl, phenyl, benzyl, naphthyl, or cyclohexyl.

4. The catalyst compound of claim 1, wherein $R^1$ is a substituted or unsubstituted $C_1$-$C_{10}$ diyl.

5. The catalyst compound of claim 1, wherein $R^1$ is selected from methanediyl, ethanediyl, propanediyl, butanediyl, pentanediyl, hexanediyl, heptanediyl, octanediyl, nonanediyl, decanediyl, undecanediyl, dodecanediyl, isomers thereof, halide substitutes thereof, or other substitutes thereof.

6. The catalyst compound of claim 1, wherein $R^1$ is selected from unsubstituted methanediyl, ethanediyl, propanediyl, butanediyl, or pentanediyl.

7. The catalyst compound of claim 1, wherein $L^1$ is an unsubstituted methanediyl and $L^2$ is an unsubstituted 1,2-ethyanediyl.

8. The catalyst compound of claim 1, wherein $Q^2$ is N, n is 2, and each $R^2$ is independently hydrogen or unsubstituted $C_1$-$C_{10}$ hydrocarbyl.

9. The catalyst compound of claim 1, wherein $Q^2$ is N, n is 2, and each $R^2$ is independently methyl or ethyl.

10. The catalyst compound of claim 1, wherein each $R^3$, $R^4$, $R^5$, $R^6$, $R^7$, $R^8$, $R^9$, and $R^{10}$ is independently hydrogen, halogen, methyl, ethyl, ethenyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclohexyl, cyclooctyl, phenyl, benzyl, naphthyl, phenanthryl, anthracenyl, carbazolyl, fluorenyl, adamantyl, indolyl, indolinyl, imidazolyl, indenyl, indanyl, isomers thereof, halide substitutes thereof, or other substitutes thereof.

11. The catalyst compound of claim 10, wherein each of $R^6$ and $R^{10}$ is independently halogen, phenyl, carbazolyl, fluorenyl, adamantyl, indolyl, indolinyl, imidazolyl, indenyl, indanyl, or substitutes thereof.

12. The catalyst compound of claim 11, wherein $R^6$ is carbazolyl or fluorenyl and $R^{10}$ is halogen, phenyl, carbazolyl, or fluorenyl.

13. The catalyst compound of claim 1, wherein $R^4$ and $R^8$ is independently substituted or unsubstituted linear or branched $C_1$-$C_4$ hydrocarbyl.

14. The catalyst compound of claim 1, wherein $Q^1$ and $Q^2$ are N.

15. The catalyst compound of claim 1, wherein M is Hf or Zr; $X^1$ and $X^2$ is independently a substituted or unsubstituted $C_1$-$C_8$ alkyl, phenyl, benzyl, naphthyl, or cyclohexyl, and $R^1$ is a substituted or unsubstituted $C_1$-$C_{10}$ diyl.

16. The catalyst compound of claim 1, wherein M is Hf or Zr; $X^1$ and $X^2$ is independently a substituted or unsubstituted $C_1$-$C_8$ alkyl, phenyl, benzyl, naphthyl, or cyclohexyl, and $R^1$ is selected from methanediyl, ethanediyl, propanediyl, butanediyl, pentanediyl, hexanediyl, heptanediyl, octanediyl, nonanediyl, decanediyl, undecanediyl, dodecanediyl, isomers thereof, halide substitutes thereof, or other substitutes thereof.

17. The catalyst compound of claim 1, wherein $R^1$ is selected from unsubstituted methanediyl, ethanediyl, propanediyl, butanediyl, or pentanediyl, and $L^1$ is an unsubstituted methanediyl and $L^2$ is an unsubstituted 1,2-ethyanediyl.

18. The catalyst compound of claim 1, wherein M is Hf or Zr; $X^1$ and $X^2$ is independently a substituted or unsubstituted $C_1$-$C_8$ alkyl, phenyl, benzyl, naphthyl, or cyclohexyl; $R^1$ is selected from methanediyl, ethanediyl, propanediyl, butanediyl, pentanediyl, hexanediyl, heptanediyl, octanediyl, nonanediyl, decanediyl, undecanediyl, dodecanediyl, isomers thereof, halide substitutes thereof, or other substitutes thereof; each $R^2$ is independently hydrogen or unsubstituted $C_1$-$C_{10}$ hydrocarbyl; $R^6$ is carbazolyl or fluorenyl; $R^{10}$ is halogen, phenyl, carbazolyl, or fluorenyl; $R^4$ and $R^8$ is independently substituted or unsubstituted linear or branched $C_1$-$C_4$ hydrocarbyl; and $Q^1$ and $Q^2$ are N.

19. The catalyst compound of claim 1, wherein the catalyst compound is selected from:

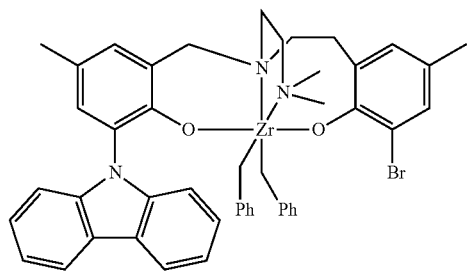

1

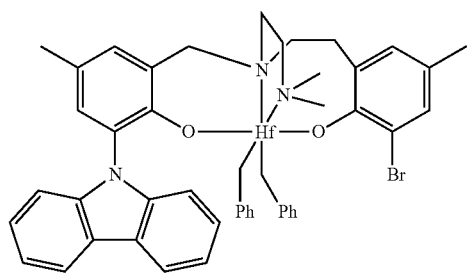

2

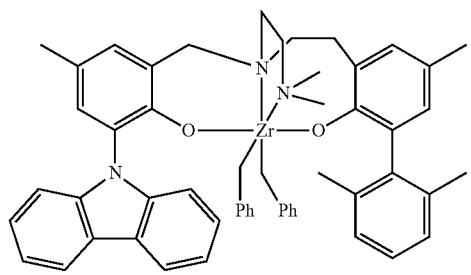

3

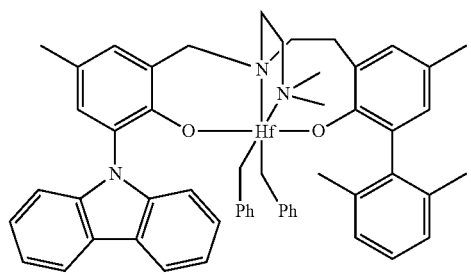

4

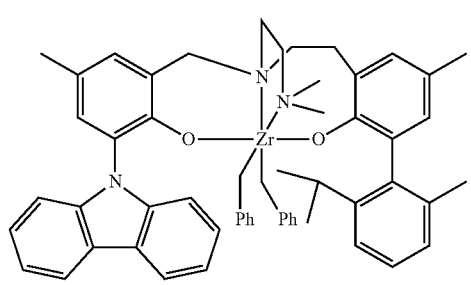

5

-continued
6
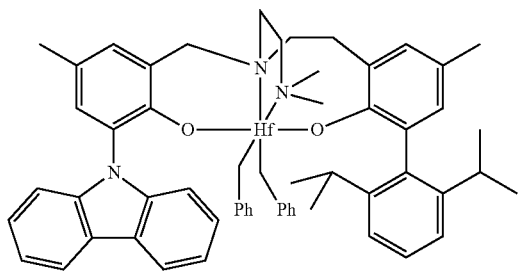
7
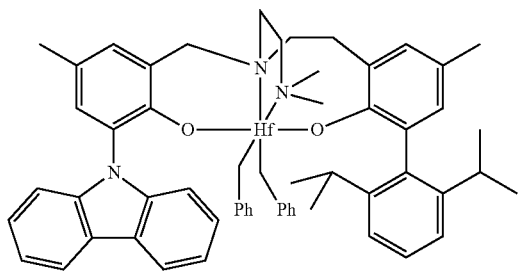
8
9
10
-continued
11
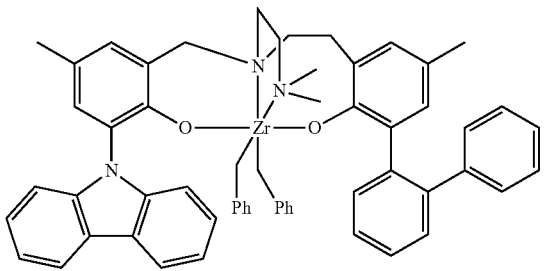
12
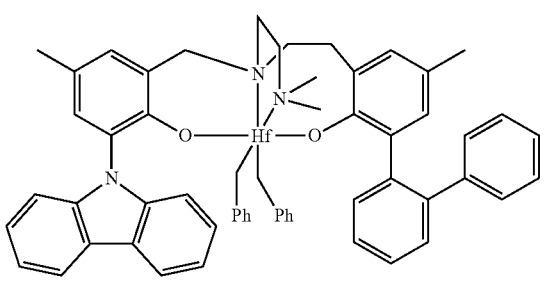
13
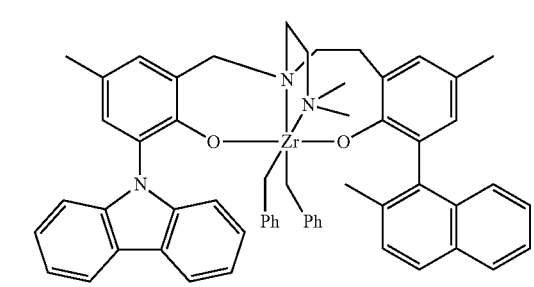
14
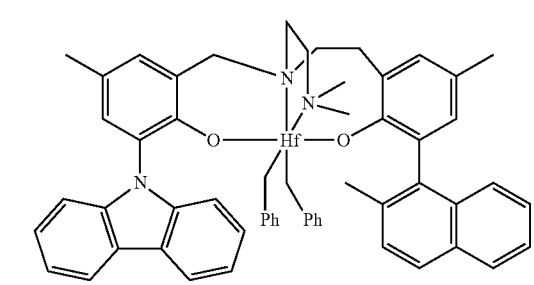
15
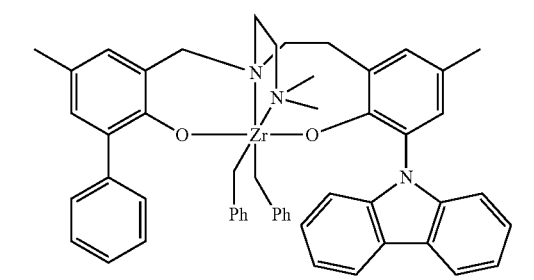

16
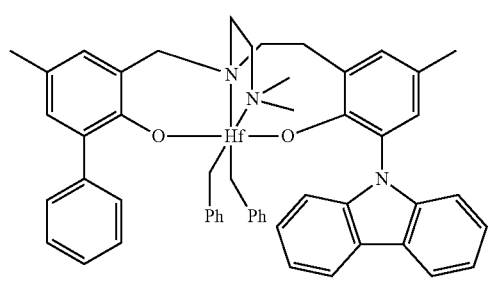
17
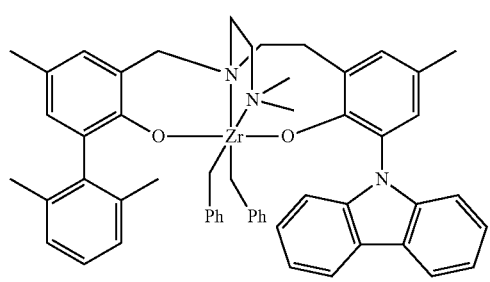
18
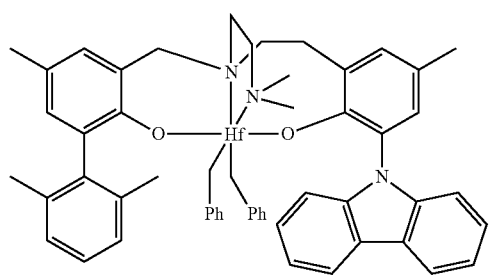
19
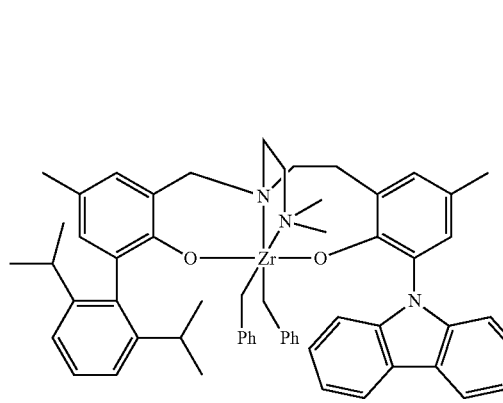
20
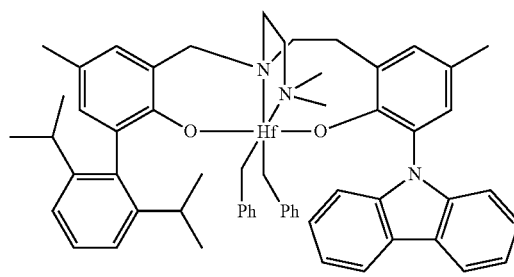
21
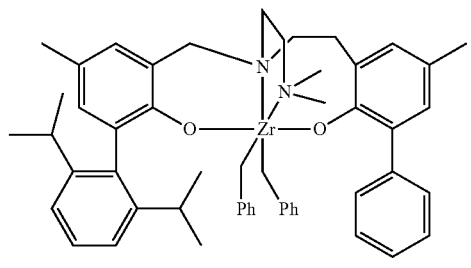
22
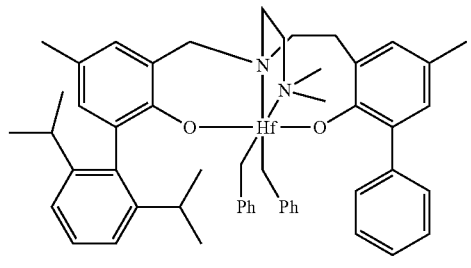
23
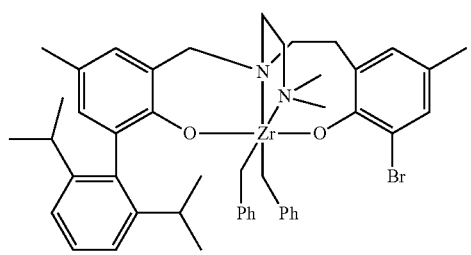
24
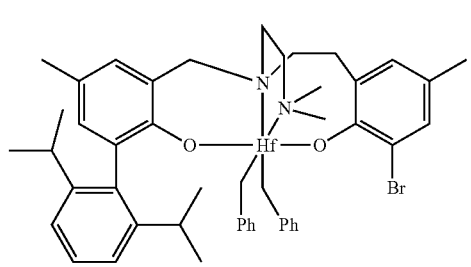
25
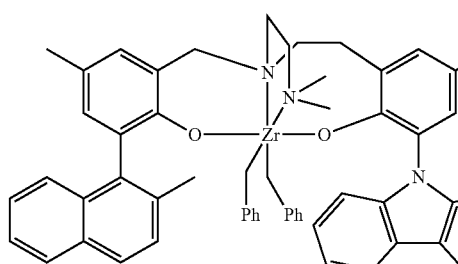
26
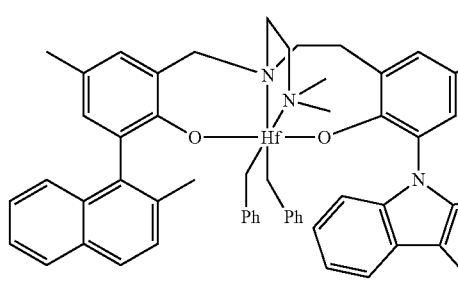

-continued

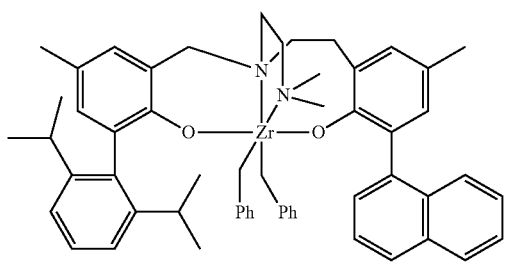
27

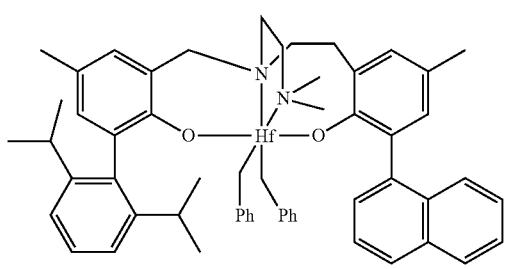
28

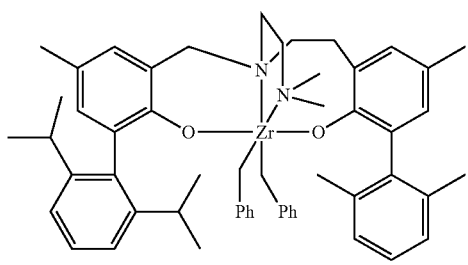
29

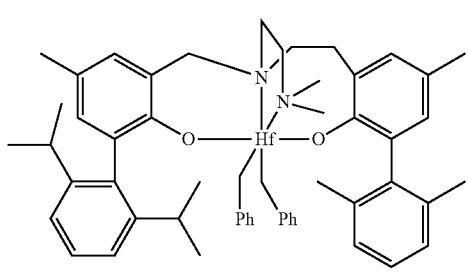
30

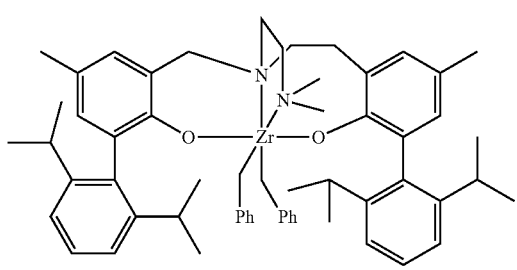
31

-continued

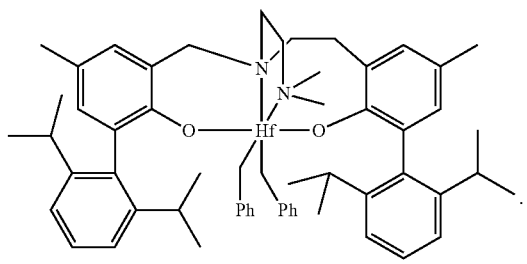
32

20. The catalyst compound of claim 1 wherein the catalyst compound is selected from:

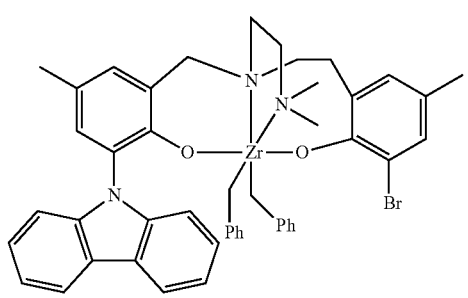
1

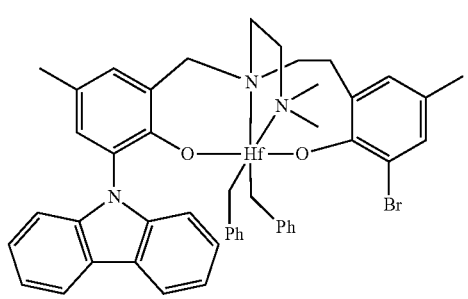
2

21. A catalyst system comprising an activator and the catalyst compound of claim 1.

22. The catalyst system of claim 21, further comprising a support material.

23. The catalyst system of claim 21, further comprising a support material, wherein the support material is $Al_2O_3$, $ZrO_2$, $SiO_2$, $SiO_2/Al_2O_3$, $SiO_2/TiO_2$, silica clay, silicon oxide/clay, or mixtures thereof.

24. The catalyst system of claim 21, wherein the activator comprises an alkylalumoxane or an non-coordinating anion.

25. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with the catalyst system of claim 21 in at least one solution polymerization reactor at a reactor pressure of from 2 MPa to 200 MPa and a reactor temperature of from 10° C. to 250° C. to form the ethylene alpha-olefin copolymer.

26. The process of claim 25, wherein the catalyst system has an activity of 100,000 g/mmol/hr or greater.

27. The process of claim 25, wherein the ethylene alpha-olefin copolymer has an Mw value of from 250,000 to 700,000 g/mol.

28. The process of claim 25, wherein the ethylene alpha-olefin copolymer has an Mw/Mn value of 5 or less.

29. The process of claim 25, wherein the ethylene alpha-olefin copolymer has an Mw/Mn value of from 1 to 2.

30. A catalyst system comprising an activator and the catalyst compound of claim 20.

31. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with the catalyst system of claim 30 in at least one solution polymerization reactor at a reactor pressure of from 2 MPa to 200 MPa and a reactor temperature of from 10° C. to 250° C. to form the ethylene alpha-olefin copolymer.

32. The process of claim 25, wherein the ethylene alpha-olefin copolymer has a comonomer content of 12 wt % or greater.

33. The process of claim 31, wherein the ethylene alpha-olefin copolymer has a comonomer content of 15 wt % or greater.

34. The process of claim 25, wherein the ethylene alpha-olefin copolymer has a comonomer content of 17 wt % or greater.

35. The catalyst compound of claim 1, wherein $L^1$ is a substituted or unsubstituted methanediyl and $L^2$ is a substituted or unsubstituted 1,2-ethyanediyl.

36. The catalyst system of claim 21, wherein $L^1$ is a substituted or unsubstituted methanediyl and $L^2$ is a substituted or unsubstituted ethanediyl.

\* \* \* \* \*